(12) United States Patent
Lambert

(10) Patent No.: US 9,650,145 B2
(45) Date of Patent: May 16, 2017

(54) VEHICLE SEAT

(71) Applicant: Trevor Edouard Lambert, London (GB)

(72) Inventor: Trevor Edouard Lambert, London (GB)

(73) Assignee: Trevor Lambert, London (GB)

(*) Notice: Subject to any disclaimer, the term of this patent is extended or adjusted under 35 U.S.C. 154(b) by 141 days.

(21) Appl. No.: 14/293,081

(22) Filed: Jun. 2, 2014

(65) Prior Publication Data
US 2014/0265513 A1 Sep. 18, 2014

Related U.S. Application Data

(63) Continuation of application No. PCT/GB2012/053141, filed on Dec. 14, 2012.

(51) Int. Cl.
| B64D 11/06 | (2006.01) |
| B60N 2/44 | (2006.01) |
| B60N 2/48 | (2006.01) |
| B60N 2/64 | (2006.01) |
| B60N 2/34 | (2006.01) |
| B60N 2/02 | (2006.01) |

(52) U.S. Cl.
CPC ........ *B64D 11/0639* (2014.12); *B60N 2/0284* (2013.01); *B60N 2/34* (2013.01); *B60N 2/44* (2013.01); *B60N 2/4879* (2013.01); *B60N 2/64* (2013.01); *B64D 11/06* (2013.01)

(58) Field of Classification Search
CPC . B64D 11/06; B64D 11/0639; B64D 11/0641; B60N 2/44; B60N 2/4495; B60N 2/4879; B60N 2/64; B60N 2/4814; B60N 2/34

USPC ........................................................ 297/397
See application file for complete search history.

(56) References Cited

U.S. PATENT DOCUMENTS

| 5,551,750 A * | 9/1996 | Yoshimura ............. B60N 2/286 297/118 |
| 6,203,104 B1 * | 3/2001 | Matsuo ................ B60N 2/3013 297/188.1 |
| 6,474,741 B2 * | 11/2002 | Kamida ............... B60N 2/0292 297/335 |
| 7,156,442 B2 * | 1/2007 | McManus ................ B60N 2/06 296/65.09 |
| 2004/0051003 A1 | 3/2004 | Cheung |
| 2009/0317176 A1 * | 12/2009 | Shimizu ............... B60N 2/4814 403/24 |
| 2011/0025115 A1 * | 2/2011 | Tanaka ..................... B60N 2/36 297/391 |

(Continued)

FOREIGN PATENT DOCUMENTS

JP 58047632 A * 3/1983 .......... B60N 2/3084

*Primary Examiner* — David R Dunn
*Assistant Examiner* — Tania Abraham

(57) ABSTRACT

A vehicle seat such as an aircraft seat 1 comprises a seat pan 2 and a backrest 3. The backrest 3 includes a movable element 16 which is detachable from the backrest and attachable to the seat pan 2 to extend the seat pan surface. The movable element 16 may for example comprise the cushion and supporting structure of the headrest part of the backrest or may comprise just the cushion. Thus, in a row of such seats, an extended bed-like surface may be provided without adding substantially to the weight or bulk of the seat.

19 Claims, 34 Drawing Sheets

(56) References Cited

U.S. PATENT DOCUMENTS

2012/0068516 A1\* 3/2012 Reel ............... B60N 2/4811
297/397

\* cited by examiner

Fig 1
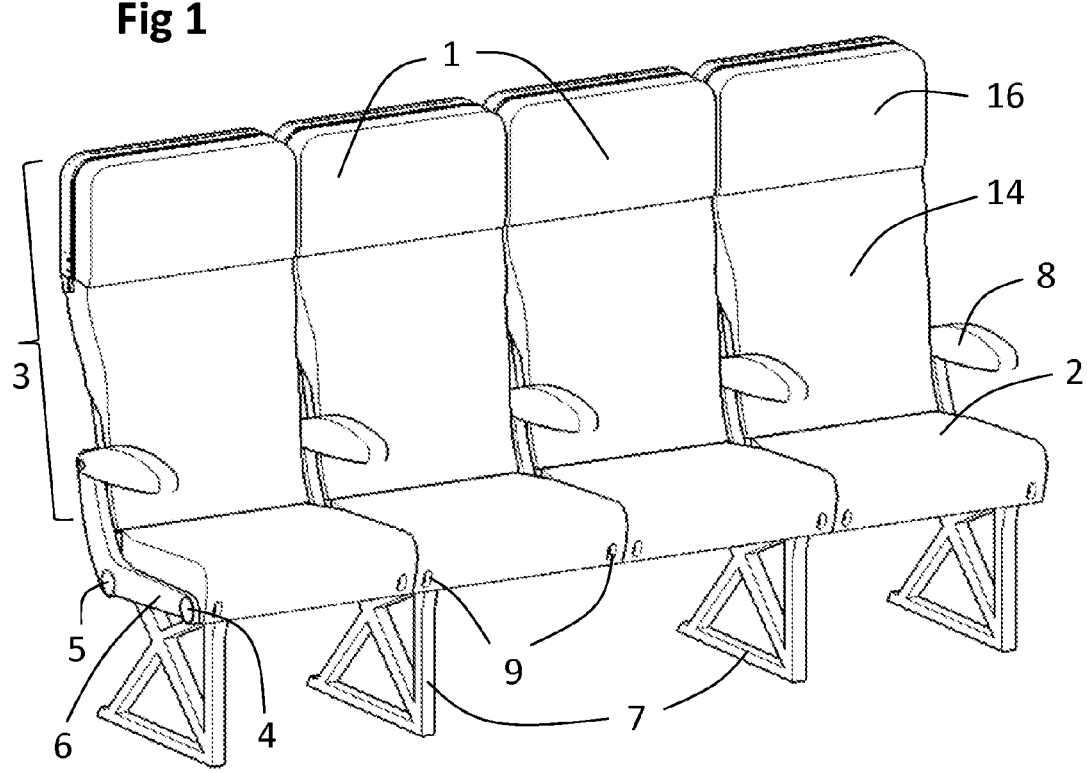
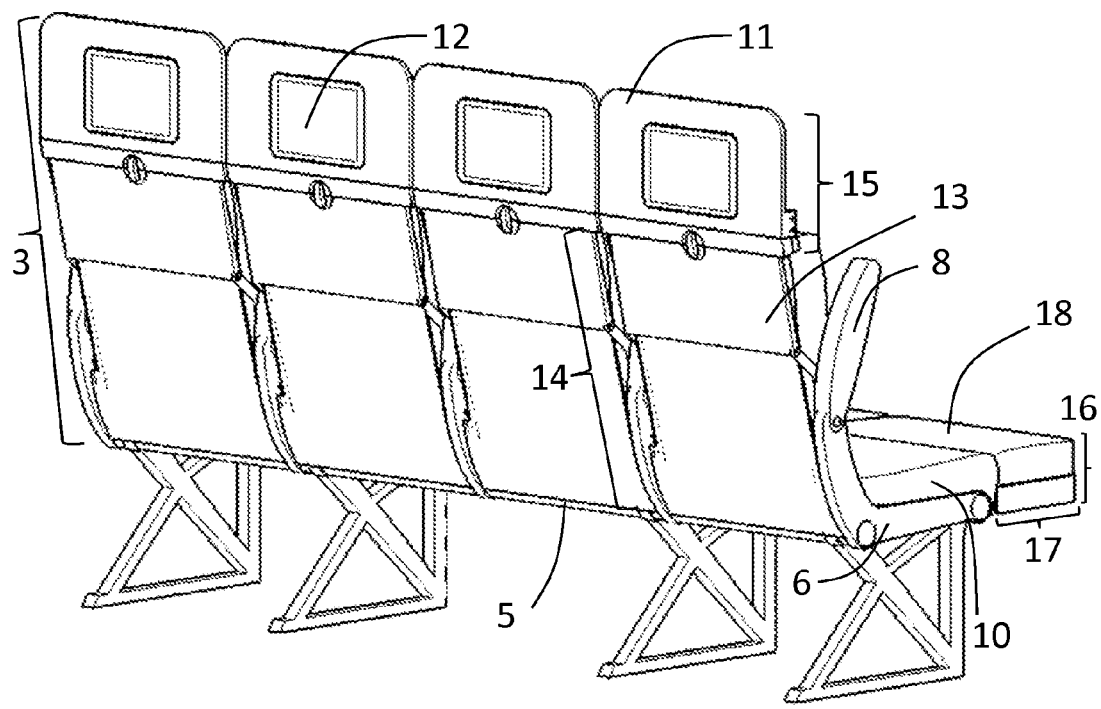
Fig 2

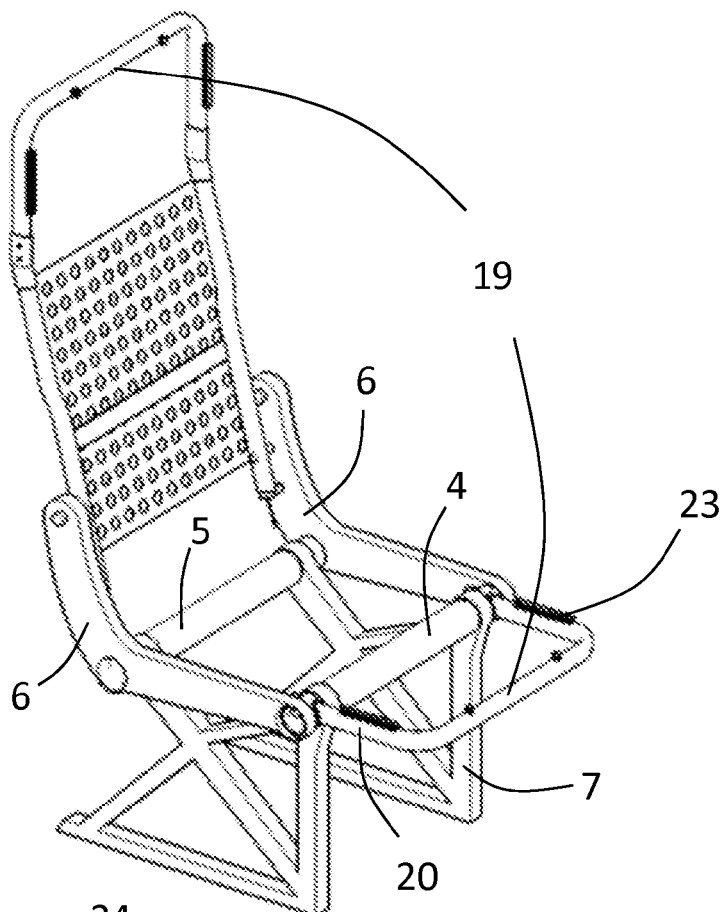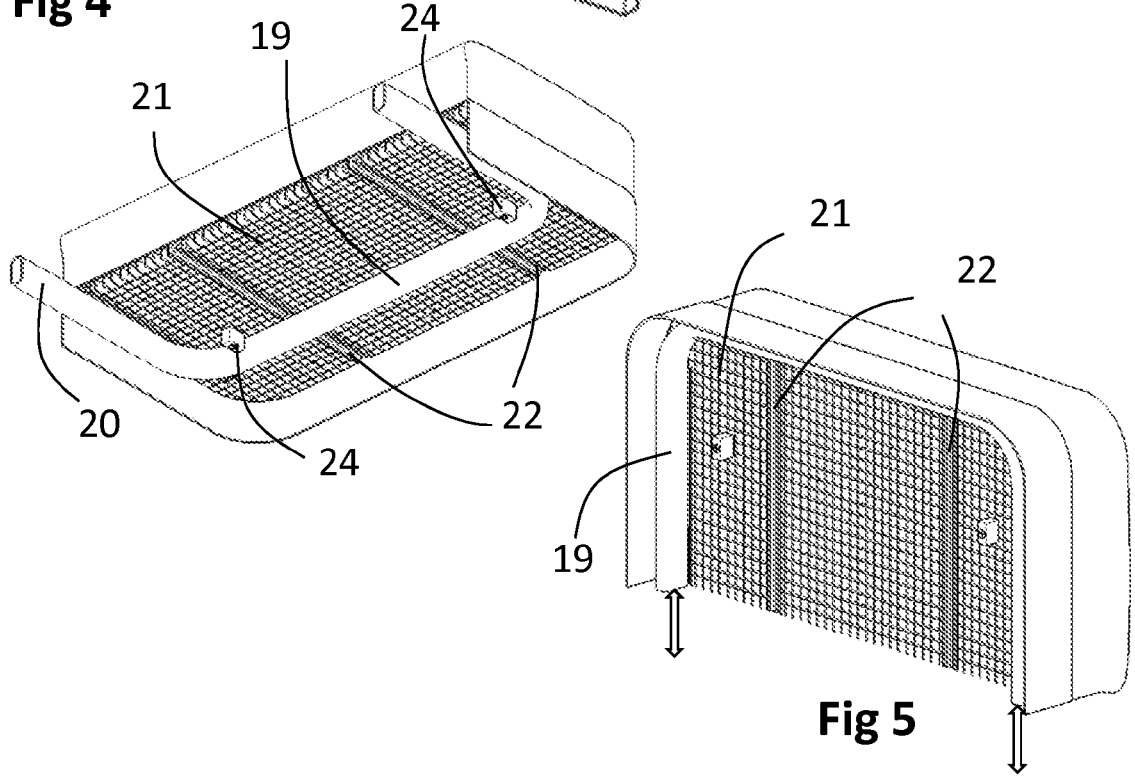

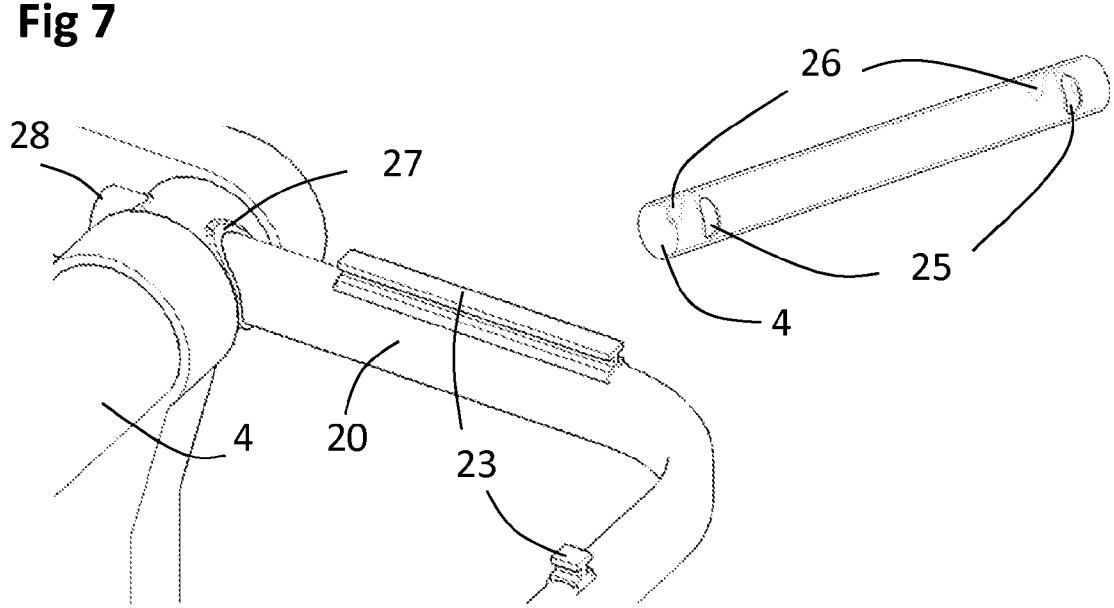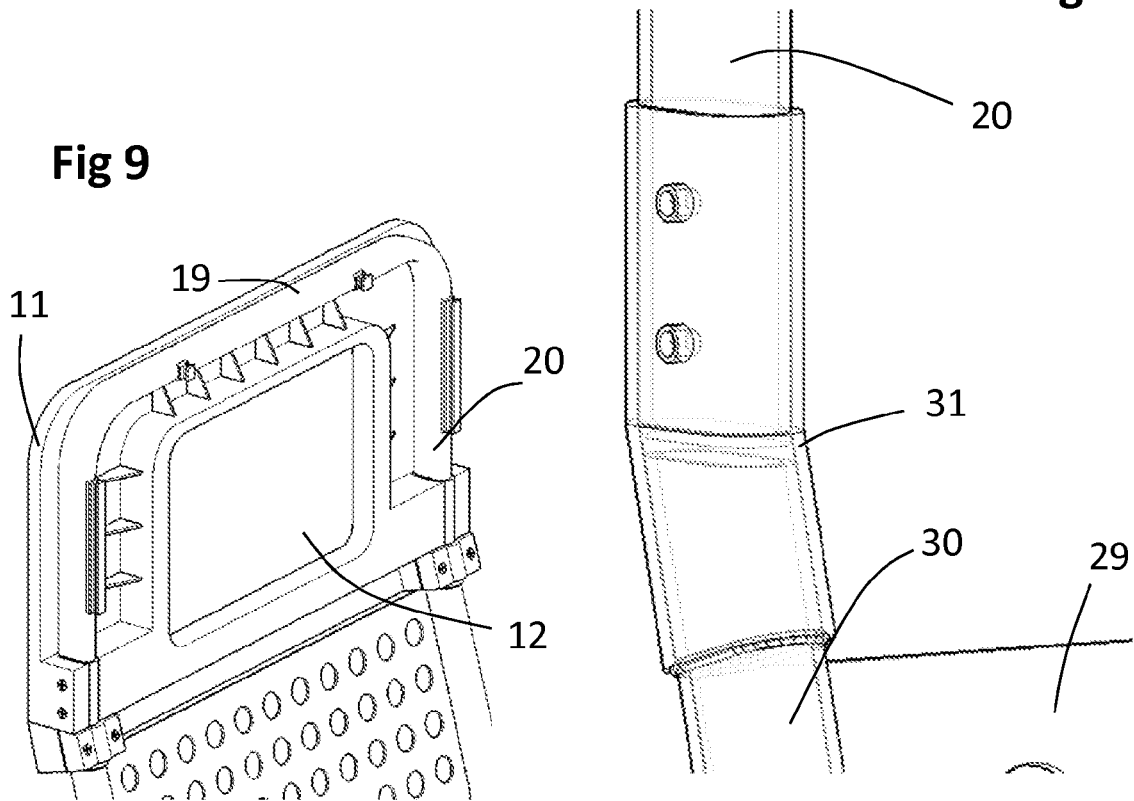

Fig 10
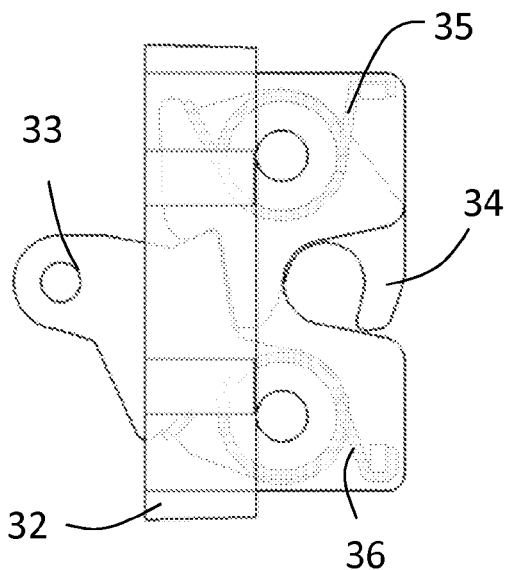
Fig 11
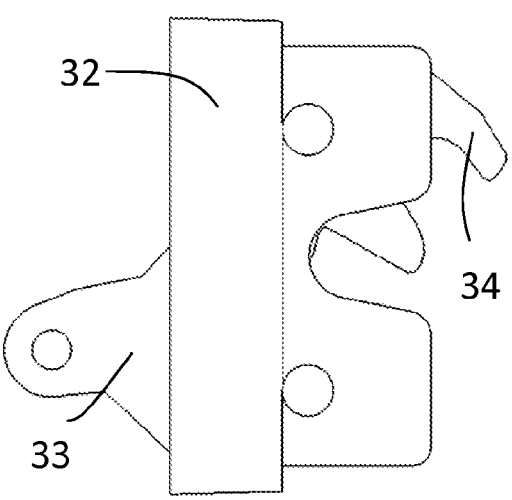
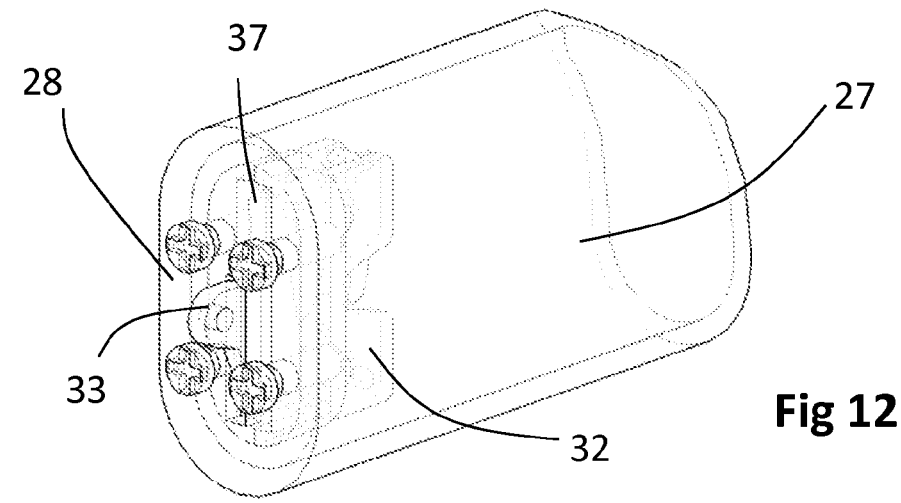
Fig 12
Fig 13
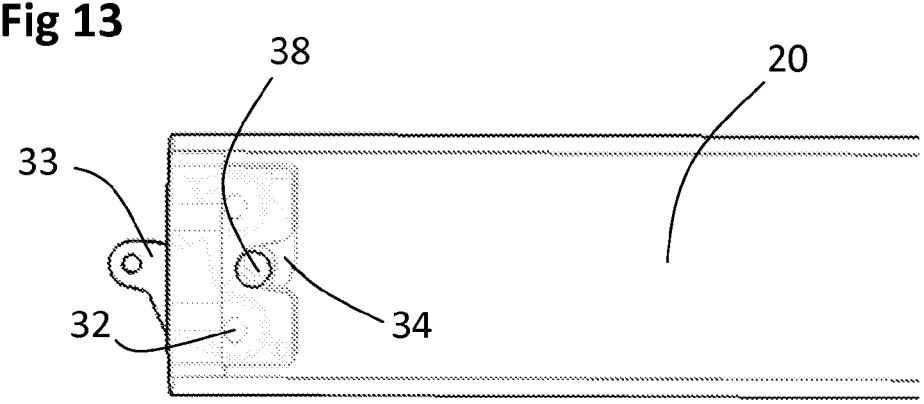

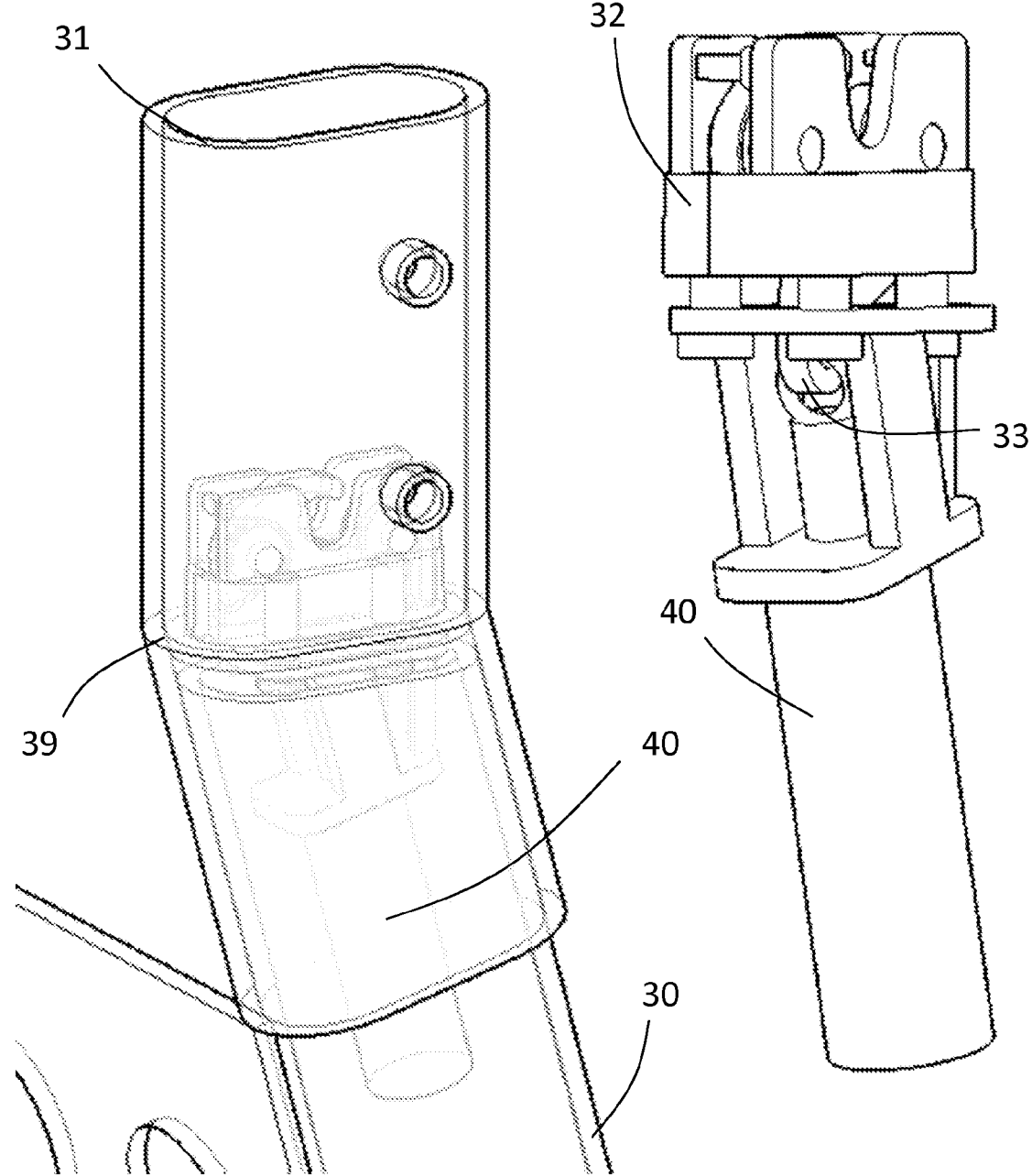

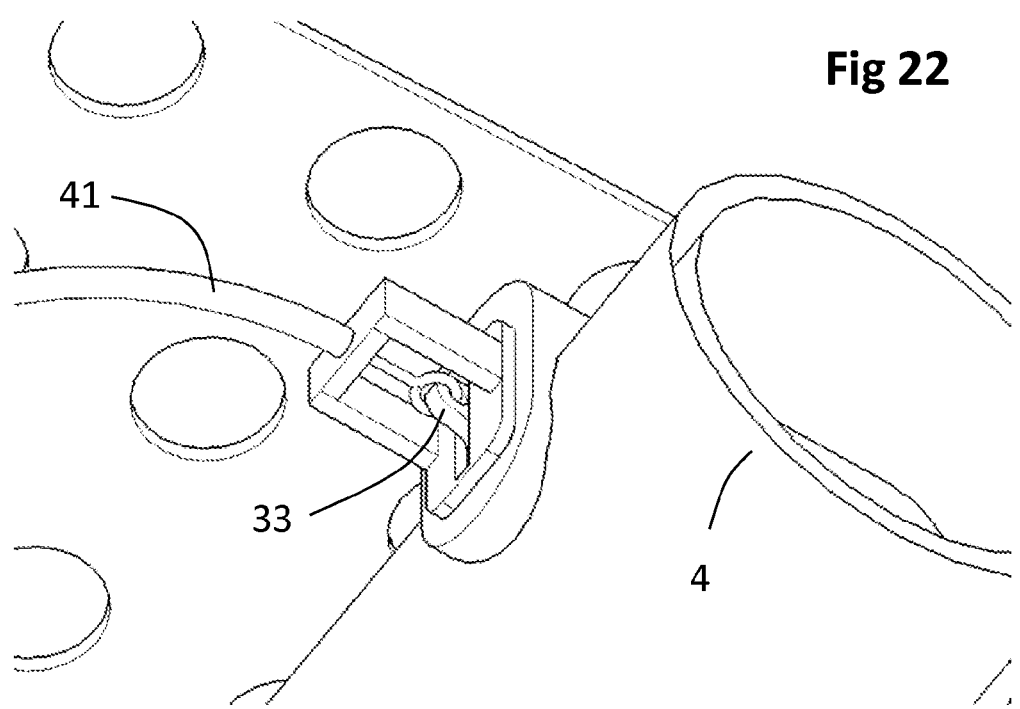
Fig 22
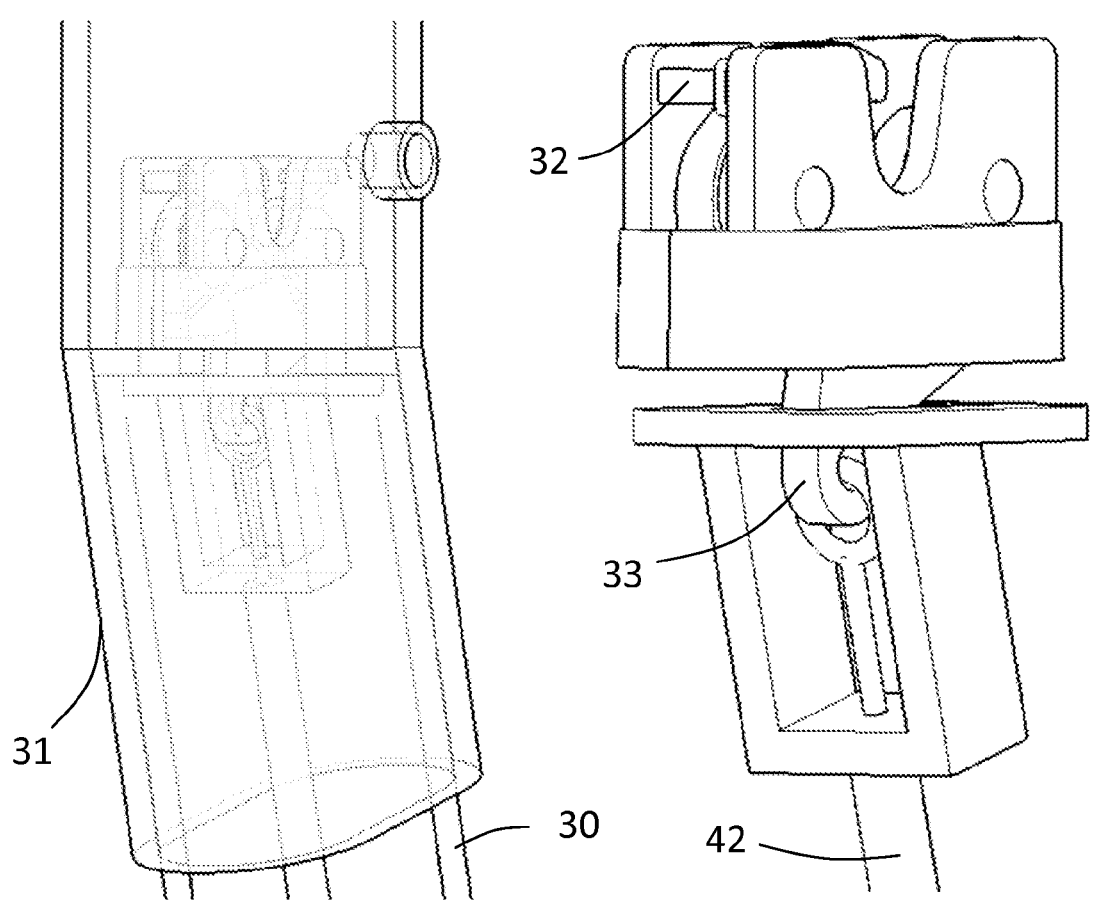
Fig 23
Fig 24

Fig 29
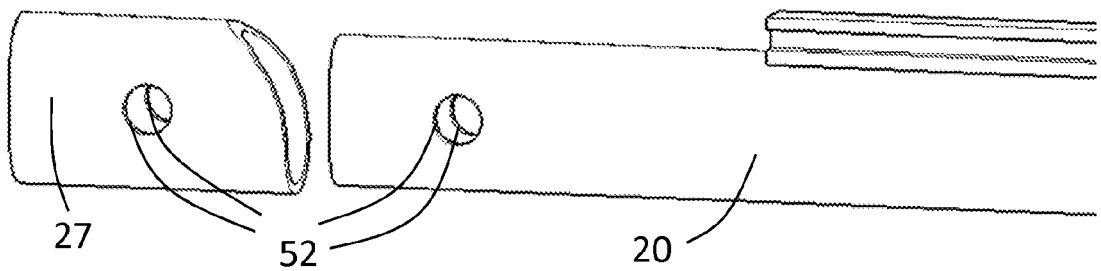
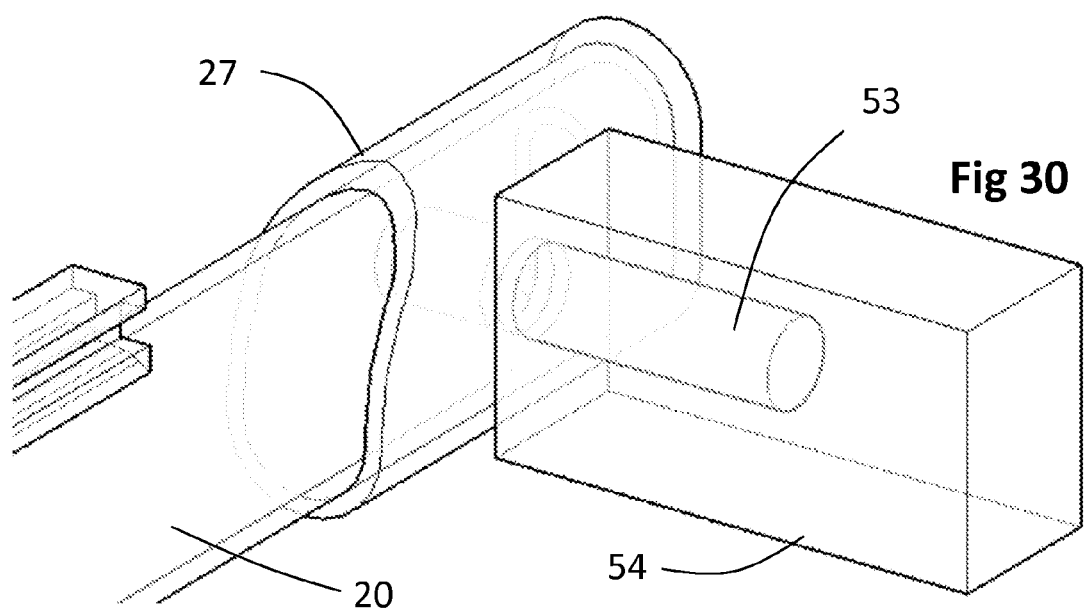
Fig 30
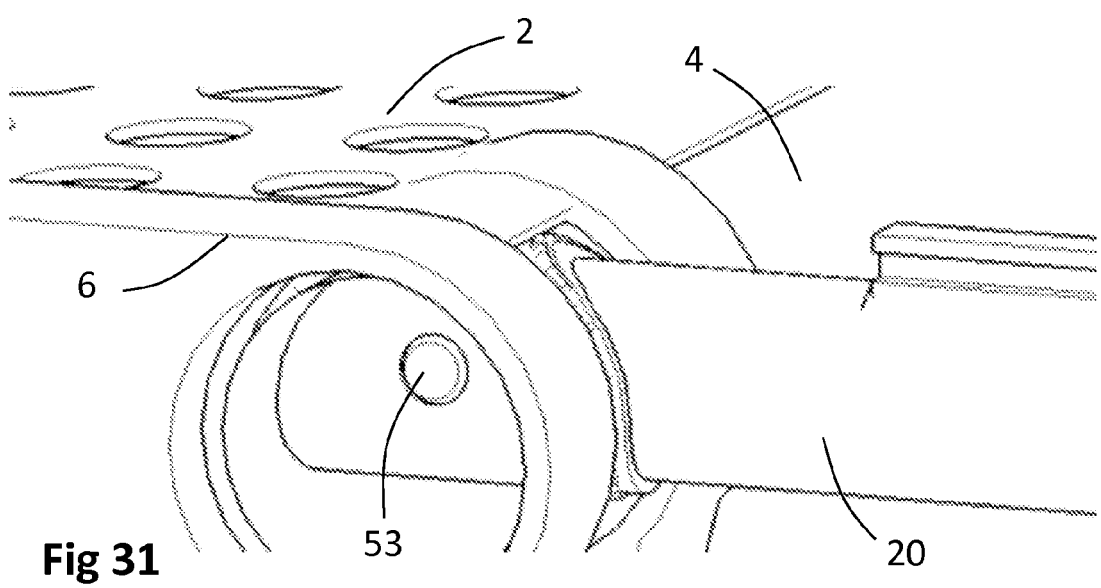
Fig 31

Fig 37
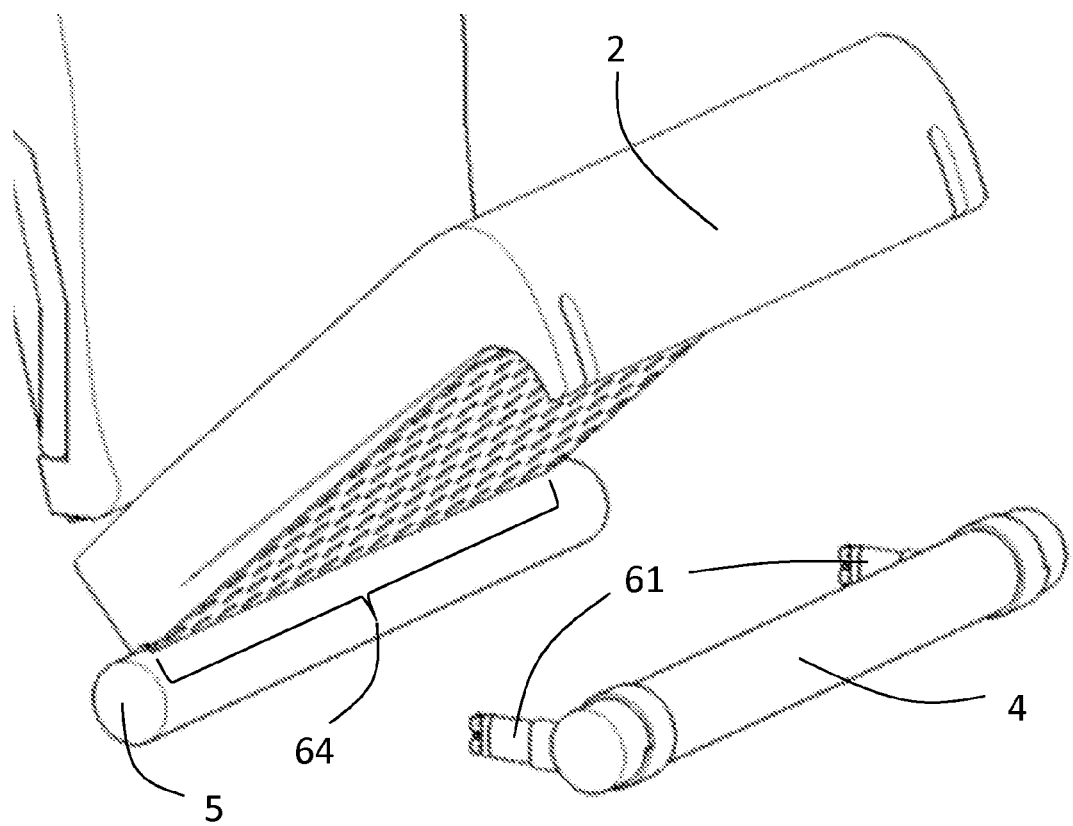
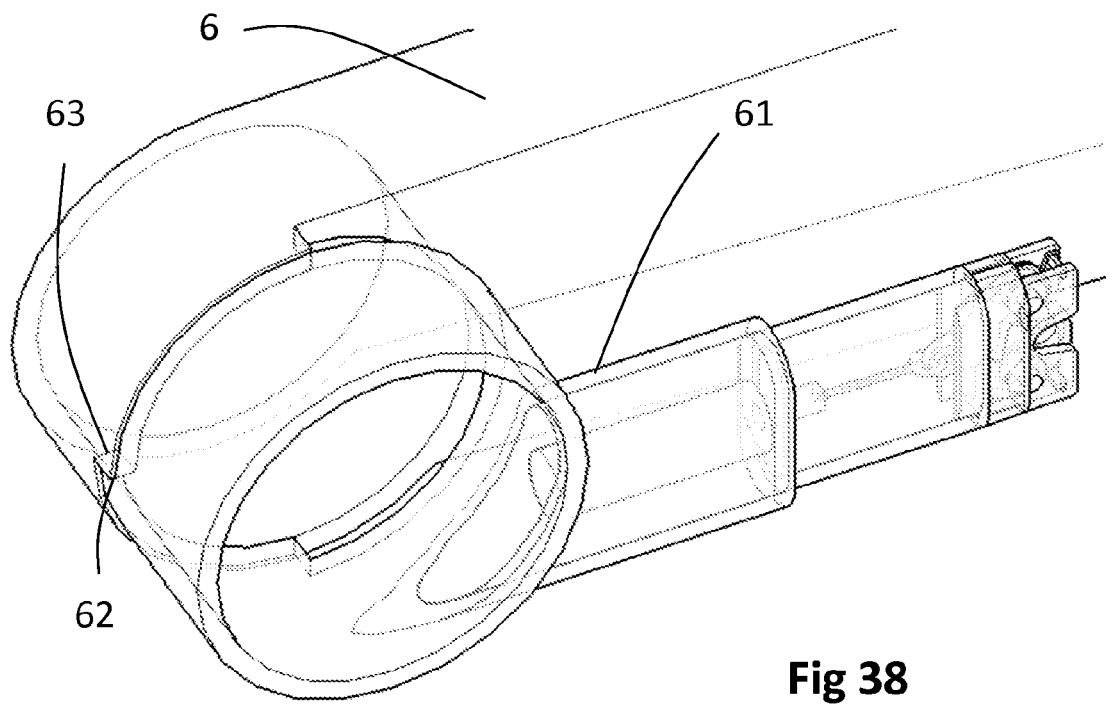
Fig 38

Fig 39
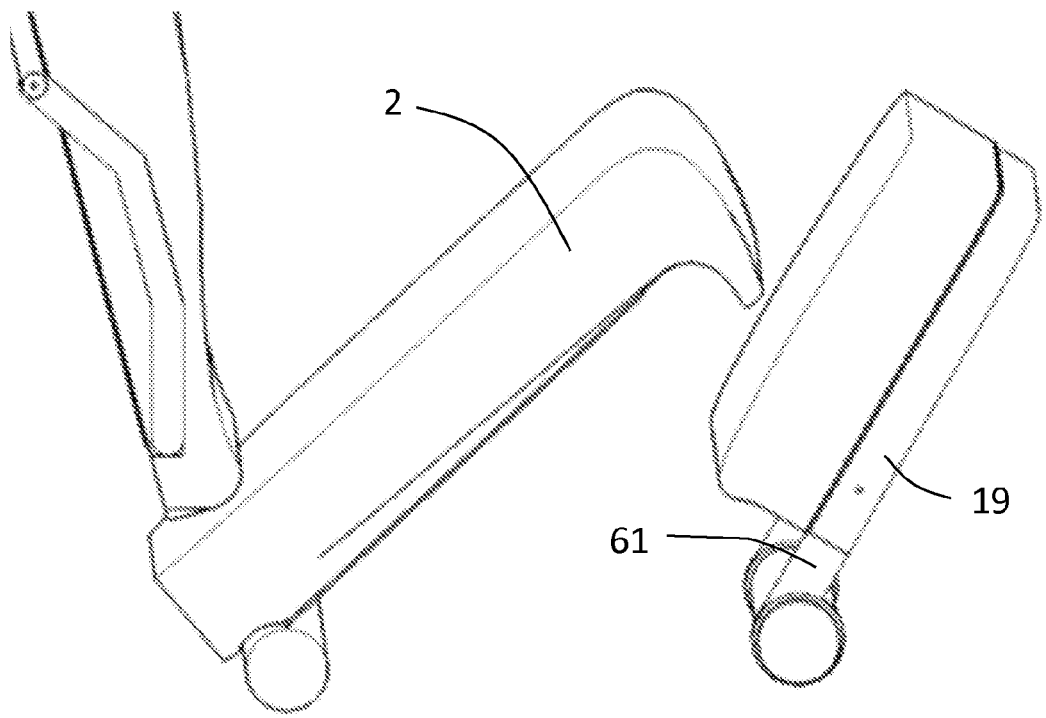
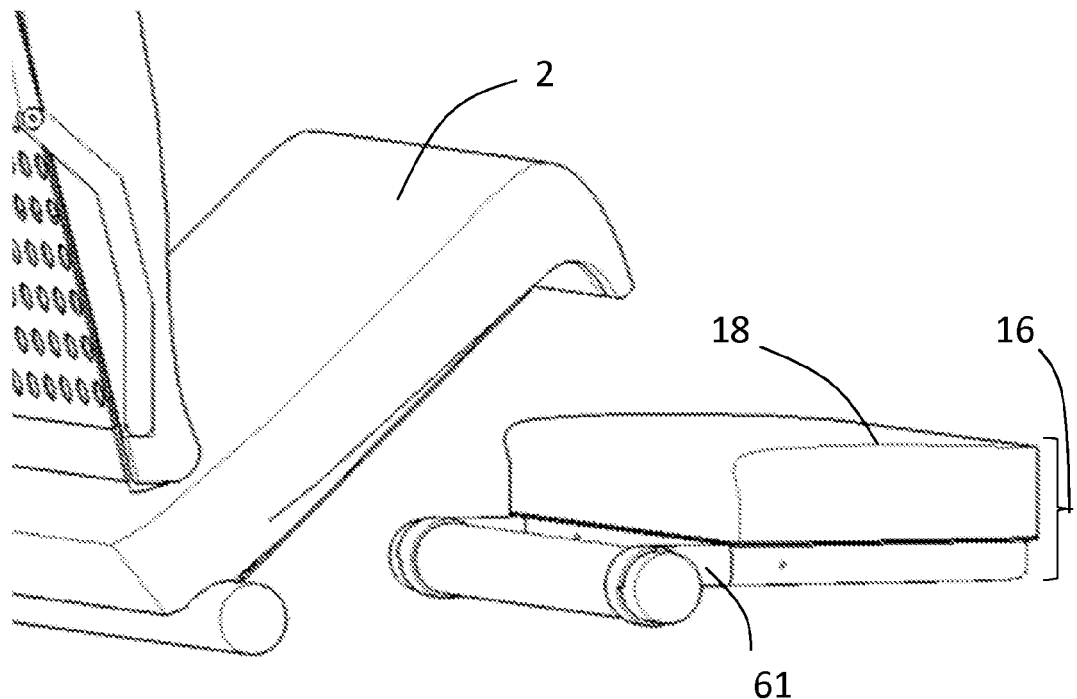
Fig 40

Fig 43
Fig 44
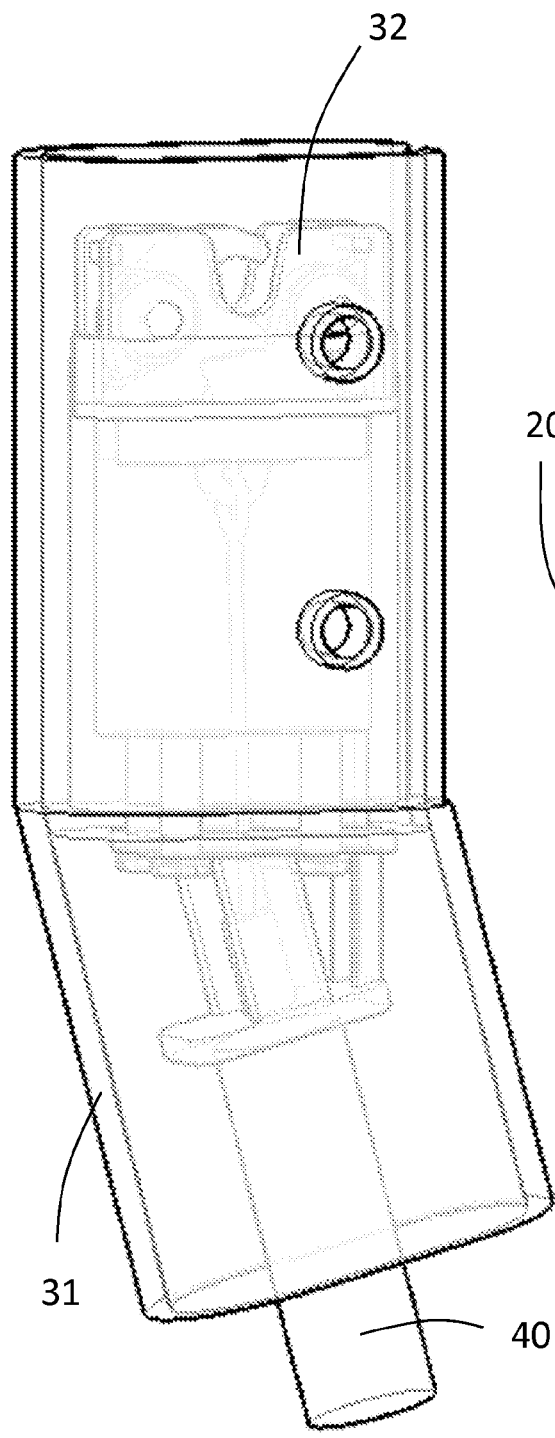
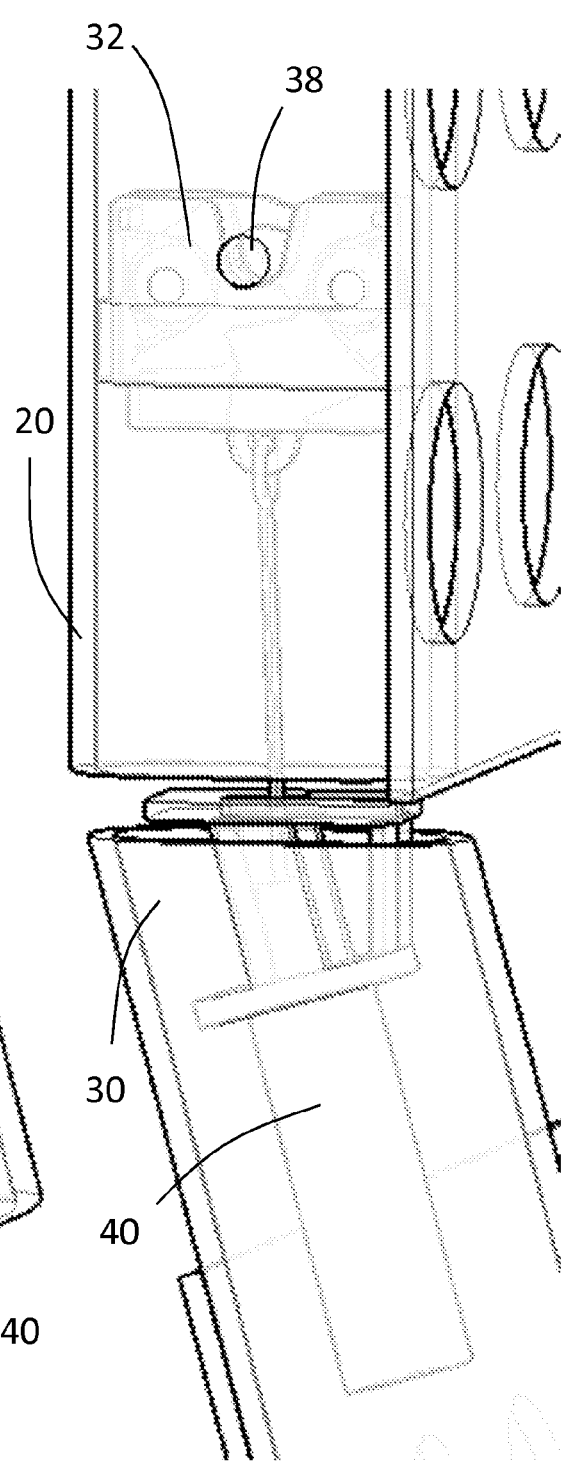

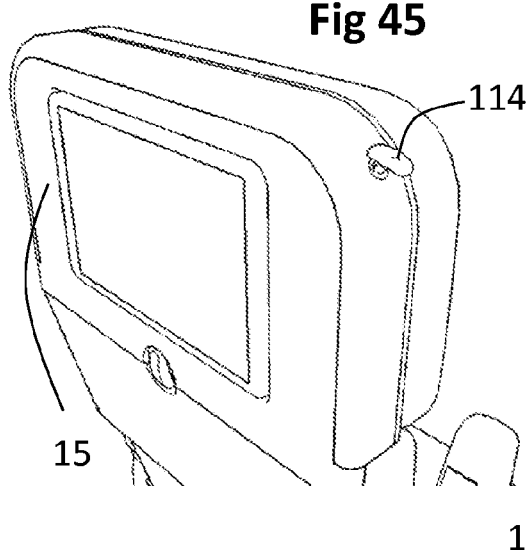
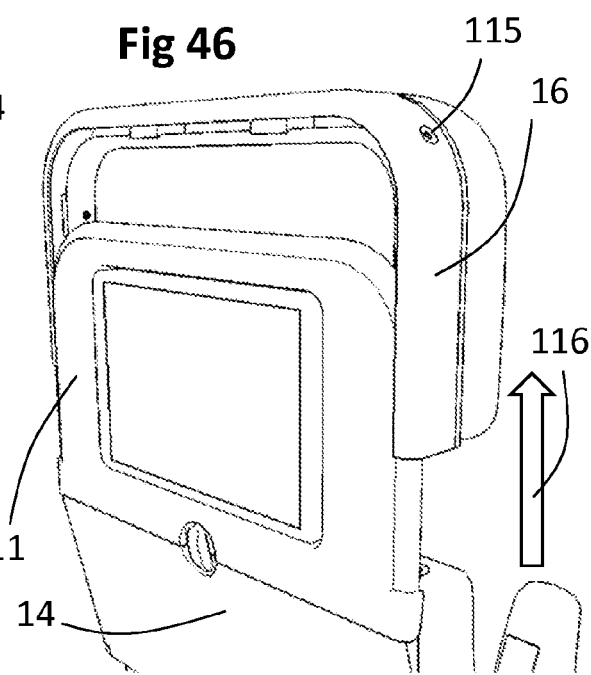
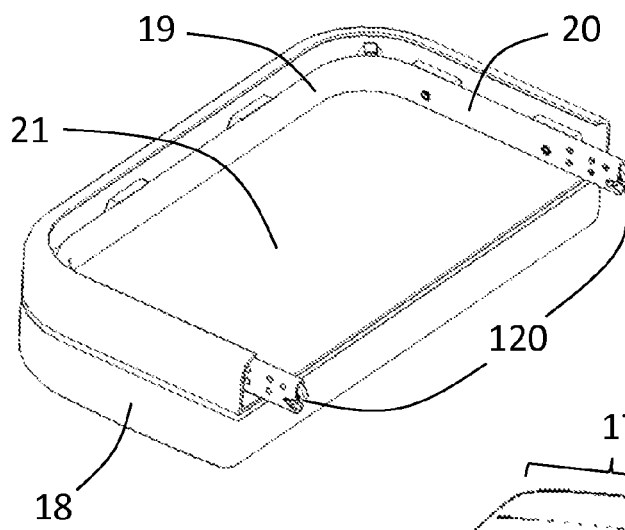
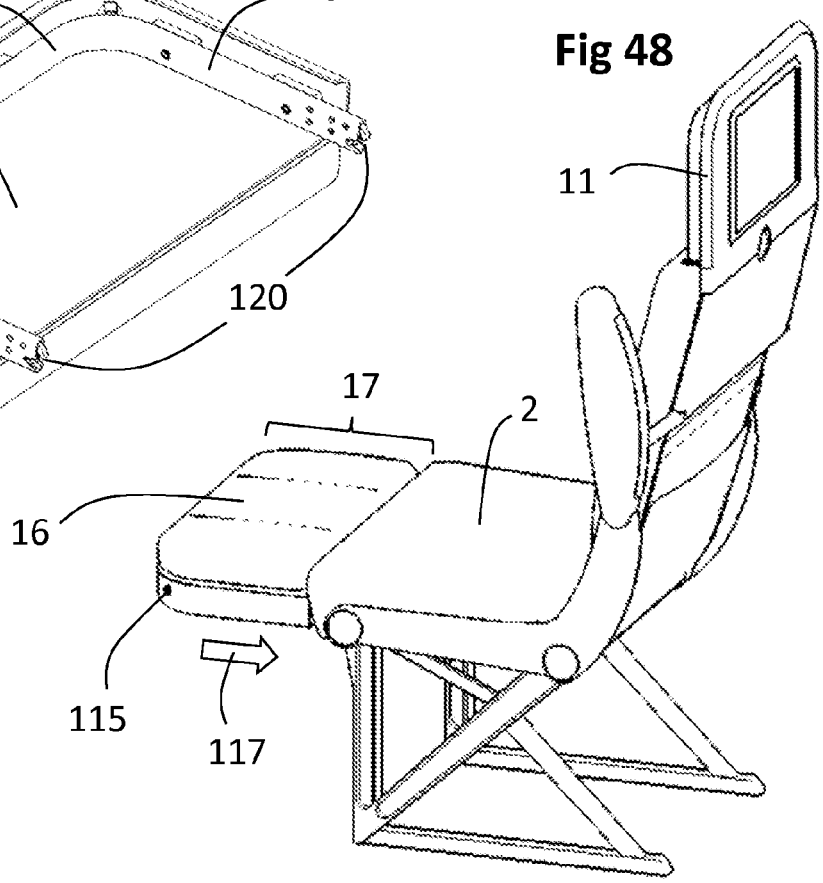

Fig 83
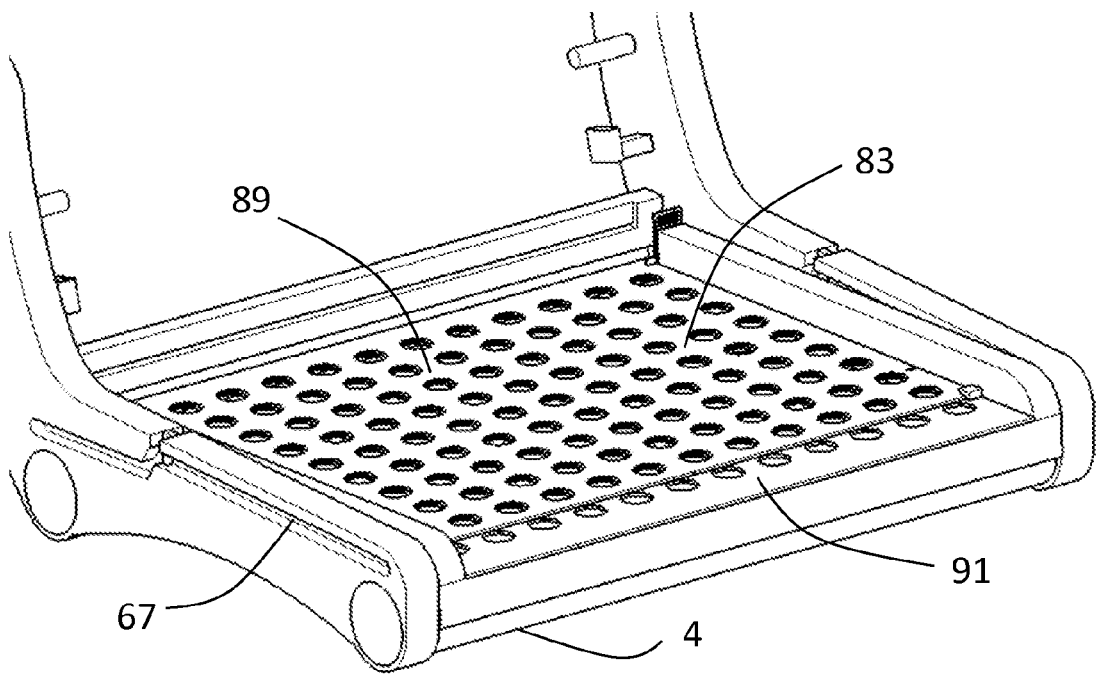
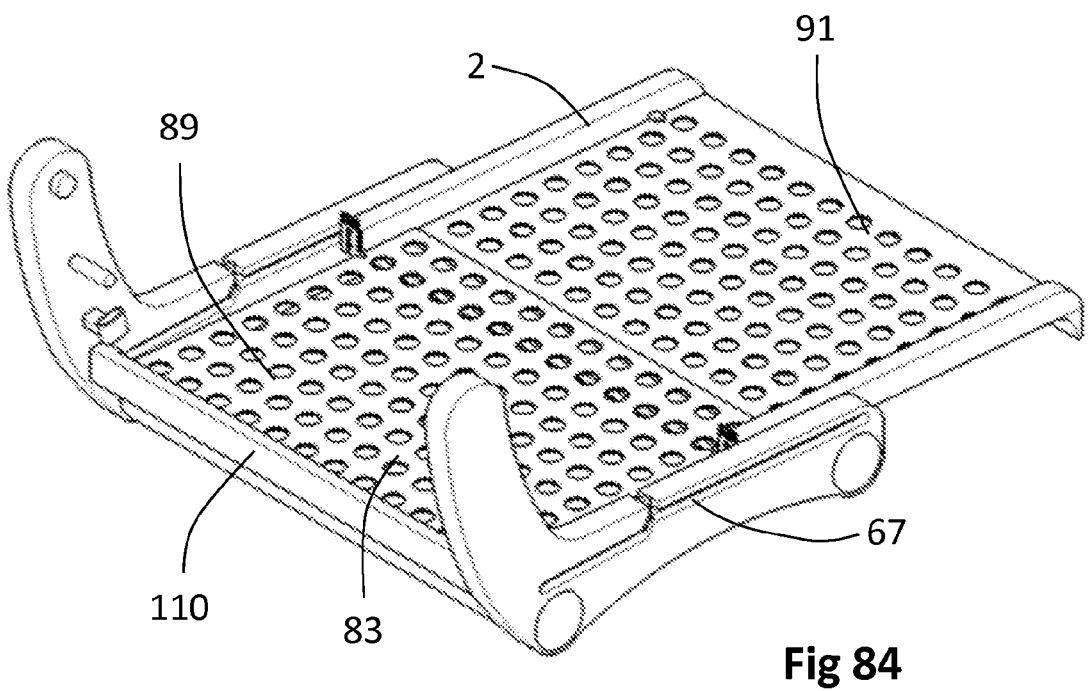
Fig 84

VEHICLE SEAT

CROSS-REFERENCE TO RELATED APPLICATIONS

This application is a continuation of GB1121706.4 filed on Dec. 16, 2011 and PCT/GB2012/053141 filed on Dec. 14, 2012, which are fully incorporated herein by reference in its entirety, and this application, as a continuation of the above captioned application, claims a benefit under 35 U.S.C. §120 to the above referenced applications.

BACKGROUND INFORMATION

Field of the Disclosure

This invention relates to a vehicle seat, and in particular to a seat for an aircraft.

Background

Passenger aircraft on long haul routes usually offer different types of seating at different prices, which offer different levels of comfort and space. The different types of seating are usually each contained in a separate cabin area. For example there may be first class, business class, premium economy, and economy sections of seating. On the one hand, first or business class seats are commonly movable into a fully reclined position, or otherwise convertible to provide a flat bed. For example some such seats have a backrest and footrest which can be moved to a substantially horizontal position in line with the seat pan. This requires a large and heavy seat mechanism, and a substantial amount of cabin floor space is needed for each seat. These seats are therefore costly for the operator to provide and consequently the price to the passenger is relatively high.

On the other hand, economy seats are usually provided closely adjacent each other in rows having a relatively small pitch. Commonly, the backrest of each seat may recline somewhat towards the seat behind, and sometimes also a footrest may be provided under the seat in front. This is in order to provide some comfort for the passenger who wishes to relax or sleep, whilst using a minimum amount of space. Such seats also require a relatively simple recline mechanism and are relatively inexpensive and light. The operator may thus provide such seating to passengers at a relatively low cost.

The price difference between these classes of seat is often very substantial, reflecting the substantially different levels of comfort and privacy. It would be advantageous to airlines to be able to offer a seat which can provide an increased level of comfort over an economy class seat, without adding substantially to the weight or space required for the seat. Such seating could be priced above the economy class fare, whist remaining more affordable than first or business class.

WO 2010/086785 proposes a row of seats such as are found in economy class, in which each seat has a leg rest element pivotally attached to the front edge of the seat, which can be extended to a fully horizontal position to be substantially level with the seat pan, so as effectively to extend the seat pan surface forwardly. The leg rest is sized to extend as far as the back of the seat in front. When the leg rests of a row of adjacent seats are all deployed, this can provide a large substantially flat surface on which it is possible to lie down. The operator may thus provide a service at a level somewhere between economy and business class at a correspondingly intermediate price.

However, the mechanism required to raise and hold the leg rest in the extended position, and the cushion element of the leg rest, which are required to form the extension surface for supporting a passenger, add substantially to the weight of the seat. This is an important consideration in aircraft due to the increased fuel cost caused by extra weight. Such seats are therefore relatively more costly for the operator to provide than a standard economy class seat. The extra mechanism and cushioning also takes up valuable space in the aircraft cabin and reduces the already limited space in the foot well area when seats are not being used in extended mode.

SUMMARY

The present invention provides a seat for a vehicle such as an aircraft, comprising a seat pan and a backrest, in which the backrest includes a movable element which is detachable from the backrest and attachable to the seat pan to extend the seat pan surface.

In preferred embodiments, the present invention provides a seat for a vehicle such as an aircraft, having a seat pan and a backrest, the seat comprising a seat pan extension portion deployable to extend the seat pan surface in a direction forwardly of the seat, in which the backrest comprises a movable element deployable to form at least a part of the seat pan extension portion. The movable element may be attached removably to the backrest.

Thus according to the invention, the seats in a row may all be converted to a bed mode by deploying the extension portion, thus providing an extended bed-like surface, using an existing element of the backrest which is not needed when the seats are being used in the extended configuration. The term backrest is used here to mean that part of seat for supporting the upper body of a seated person. In aircraft seating, the backrest normally supports both the back and the head of the passenger. For example, the moveable element may comprise a headrest part of the backrest, since passengers lying or lounging on the converted bed surface will not require a headrest. It is therefore possible with this invention to provide a bed-like surface without the need for additional large or heavy elements, and so to provide a convertible seat at a minimum weight and space premium. This provides a significant advantage to the aircraft operator in terms of the reduced cost of providing the seat and to the passengers in terms of increased comfort.

In a seating system where the seats are provided adjacent each other in rows, the extension portion may be arranged to extend the seat pan surface to a position adjacent the back of the seat in the row in front, so as to provide a bed surface of maximum size. The seat normally has a substantially constant width, and thus the movable element may have substantially the same width as the seat pan. When it is required to convert the seats, all of the extension portions may be deployed so that seats in the row may be converted together to provide a substantially continuous surface. This is preferably done by authorised personnel. It will be appreciated that a seat may optionally be converted using a movable element from another neighbouring seat, for example a seat which is empty, and leaving the movable element of the converted seat in place.

It will be understood that, when the extension portion is not deployed, the seat will be referred to as being in a seat mode or seating position, and when the extension portion is deployed, the seat will be referred to as being in a bed or couch mode, or an extended position. It will further be understood that the rear edge of the extended seat pan surface preferably remains in substantially the same position as the rear edge of the seat pan in seat mode.

The movable element of the backrest may comprise both a subframe and a cushion having a substantially rigid backing plate, such that is it capable of supporting a passenger. Thus the extra structure required to provide the seat according to the invention may be substantially limited to the engaging parts necessary to attach the movable section either to the seat pan or alternatively to the top of the mainframe of the backrest. In this case the seat pan extension portion is mostly made up of the movable element.

Where the movable element includes a subframe, this may for example be a U-shaped subframe supporting a backing plate carrying the cushion, with fixing parts at the free ends of the side arms of the subframe. These may be used to attach the subframe to the seat pan frame, or alternatively to the main frame of the backrest as required.

Where the seats are mounted on a transversely extending spar which is positioned adjacent the front edges of the seat pans, the free ends of the subframe may pass through reinforced apertures in the spar. The side arms of the subframe may be extendable to allow the movable element to be placed in front of the seat before extending the side arms to engage with the seat pan frame. For example one of the side arms and the backing plate may be provided with rails, and the other may be provided with corresponding channels so as to allow sliding movement of the side arms relative to the backing plate. However, in a variation of this arrangement, the side arms may be fixed to the backing plate without a relative sliding movement in order to simplify the mechanism and reduce weight.

The free ends may be detachably fixed to the seat pan frame for example with corresponding rotor latches located at the point where the free ends abut against the reinforced spar apertures. Such rotor latch locking mechanisms are commonly used to keep car doors shut and are also found in some child seat restraint systems such as "Isofix" ®. The rotor latches may be released either manually or with remotely controlled electromechanical actuators such as solenoids or servo motors. A similar fixing arrangement may be provided to fix the movable element to the top of the main backrest frame.

Alternatively the free ends may be fixed in place for example with a retractable bolt mechanism fixed to the seat frame or spar in which the bolt passes through apertures in the free ends of the subframe. The bolts may be spring loaded, or may be electronically operated for example by a remote control unit carried by cabin crew. A similar fixing arrangement may be provided to fix the movable element to the top of the main backrest frame.

Alternatively the free ends may be fixed in place for example by a pin and hole type of lock mechanism as commonly found on extendable suitcase handles wherein within the free ends of subframe are located retractable pins which when extended, engage with the seat pan frame or spar. Much like extendable suitcase handles, the pins may be retracted by operating a pushbutton located on the subframe.

In an alternative embodiment the subframe may be in a fixed position relative to the backing plate and the free ends of the subframe may engage with receiving arms pivotally attached to the seat pan frame or spar for supporting the movable element. When in seat mode the receiving arms may be rotated in a rearward direction such that they are stored under the seat pan. When the seats are being converted to bed mode, the seat pan may pivot about a hinge located in a rearmost position on the seat pan such that the front of the seat pan may move upwards to allow the receiving arms to rotate in a position such that the receiving arms can engage with the subframe. The final extended surface is achieved by rotating the movable element fixed to the receiving arms such that the upper surface of the movable element lies in a position substantially coplanar with the seat pan upper surface.

In a similar way to that described above, the free ends of the subframe may be detachably fixed to the receiving arms by means of rotor latches fixed to the ends of the receiving arms. The release of the latches may also be operated manually or electromechanically using a remote control.

In a further embodiment the seat may alternatively be extended by the seat pan itself moving forwardly, and an extension portion fitting in the gap between the back of the seat pan and the lower end of the backrest. Optionally the seat pan frame may comprise lugs provided at the sides thereof for extending into channels in the seat pan frame side members. The channels may be angled such that the seat pan upper surface is substantially horizontal when the seat pan reaches its forwardmost position.

The movable element may comprise a subframe and backing plate in addition to a cushion, and may simply be placed in the gap left by the seat pan sliding forwardly. Optionally the movable element may comprise lugs provided at the sides of the subframe for extending into apertures in the seat pan frame side members to locate the extension surface in the correct position.

The backrest may comprise an outer shell surrounding the rear of the headrest part of the backrest and is commonly a moulded plastics shell. The outer shell may be fixed. Thus when the movable element is removed, the shell remains in position such that the appearance of the seat from behind remains substantially unchanged. This allows the passenger behind to use the in-flight entertainment unit or other services provided by the back of the seat, whilst maintaining privacy for the passengers using the converted seats.

According to a further type of embodiment of the invention, the seat pan extension portion may comprise a movable element which may be just a cushion element, and a deployable extension frame comprising a backing plate and optionally a subframe for supporting the cushion element. The deployable extension frame may be deployable from the seat pan to support the cushion. It will be appreciated that with this type of embodiment the movable element cushion may not be purely made from cushioning material and that there may also be for example some backing structure in order for the cushion to keep its shape as it is moved to and from the backrest and seat pan.

For this type of embodiment of the invention, the seat pan may include a deployable extension frame, for example which can be extended from the front edge of the seat. This may comprise a subframe, preferably carrying a backing plate. The subframe may for example be mounted within or under the seat pan for example to be slidable out of the front edge thereof. In these cases the movable element of the backrest may not require a frame and may simply be a cushion element or a cushion with a backing plate as appropriate which may be fixed onto the deployable extension frame for example using a fastener such as a hook and loop type fastener like "Velcro" ®.

Alternatively the subframe of the deployable extension frame may for example be mounted to the front edge of the seat pan for rotation from a position below the seat to a substantially horizontal position.

In an alternative embodiment, the subframe of the deployable extension frame may for example be pivotally attached to the front edge of the seat pan for rotation from a stored position within or under the seat pan when in seat mode. When the seats are being converted to bed mode, the seat pan may pivot about a hinge located in a rearmost position on the seat pan such that the front of the seat pan may move upwards to allow the extension frame to pass under the seat pan as it is rotated forward. The final extended surface is achieved by rotating the extension frame to its forwardmost position such that the frame lies in a position substantially coplanar with the seat pan upper surface and then placing the movable element which may be a cushion on top of the extension frame.

Alternatively the deployable extension frame may for example slide out in a backwards direction from within a seat pan which is movable forwardly such that the extension frame lies between the base of the backrest and the rear edge of the seat pan. In a variation of this arrangement, the extension frame could be fixed in relation to the seat and simply revealed when the seat pan is moved forwards. As described above, with this arrangement it is possible to change the angle of the seat pan as it moves forwardly into the extended position. Seat pans generally tilt upwardly to provide a comfortable seating position, and this can be changed to a substantially horizontal position when in the bed mode so as to be contiguous with the extension surface to provide a level bed surface.

As described previously the seat pan may be supported at the sides by seat pan side frame members, and one of the seat pan frame sides and the seat pan side frame members may be provided with a channel, whilst the other is provided with lugs accommodated in the channel. The channel may be shaped to guide the seat pan to a more horizontal position as it extends forwardly. The movable element of the backrest may be a cushion to be placed on the backing plate to provide the cushioned extension surface behind the seat pan.

Once the extension surfaces of the seats have been deployed, the resulting bed surface may be covered by a sheet or thin mattress to improve the appearance and comfort thereof. Pillows and blankets, which are normally provided on long haul flights, may also be used to improve comfort.

The invention will now be described, by way of example, with reference to the accompanying drawings, in which:

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 shows a row of seats according to one embodiment of the invention;

FIG. 2 shows the seats of FIG. 1 with the movable headrest elements moved to the front of the seat pans;

FIG. 3 shows one of the seats showing the key structural elements;

FIGS. 4 and 5 are underneath perspective views of the movable headrest element, showing the subframe in extended and retracted positions respectively;

FIG. 6 is a front perspective view of the front spar with apertures at each end;

FIG. 7 is a front perspective view showing the cooperating fixing parts of the headrest subframe and the seat pan spar;

FIG. 8 is a semi-transparent front perspective view showing the headrest subframe and the main backrest frame joined together by the joining sleeve;

FIG. 9 shows the parts of FIG. 8 and the outer shell containing the IFE display;

FIG. 10 is a semi-transparent side view showing the rotor latch in the locked position;

FIG. 11 is a side view showing the rotor latch in the open position;

FIG. 12 is a semi-transparent rear perspective view showing the rotor latch fixed to the end wall of the reinforcement sleeve;

FIG. 13 is a semi-transparent view showing how a rotor latch fits inside the side arm of the movable element subframe and how it engage with the side arm pin;

FIG. 20 is a semi-transparent rear perspective view showing the position of the solenoid inside the backrest side member and the joining sleeve;

FIG. 21 shows the solenoid and the rotor latch shown in FIG. 20;

FIG. 22 is a rear underneath perspective view showing how the lower cable is joined to the seat pan rotor latch and the reinforcement sleeve;

FIG. 23 is a semi-transparent rear perspective view showing how the upper cable is joined to the backrest rotor latch and the joining sleeve;

FIG. 24 shows the parts of FIG. 23 without the joining sleeve;

FIG. 29 shows the apertures in the reinforcement sleeve and side arms;

FIG. 30 is a semi-transparent front perspective view showing the side arm inside the reinforcement sleeve with the extended bolt and associated mechanism housing;

FIG. 31 is a front perspective view showing the parts of FIG. 30 with the front tube, seat pan backing plate and the seat pan side member;

FIG. 37 is a front perspective view of a seat according to another embodiment of the invention in which the receiving arms are shown in the retracted position;

FIG. 38 shows the receiving arm of FIG. 39 in more detail;

FIG. 39 is a side perspective view showing the seat pan and movable element in an intermediate position during deployment;

FIG. 40 shows the parts of FIG. 41 with the movable element in its bed position;

FIG. 43 shows the rotor latch and solenoid inside the joining sleeve;

FIG. 44 is a semi-transparent front perspective view showing the rotor latch and solenoid inside the side arm and backrest member respectively;

FIG. 45 is a rear perspective view of the key inside the movable element key hole according to another embodiment of the invention;

FIG. 46 is a rear perspective view of the movable element sliding upwards and away from back portion;

FIG. 47 shows the underside of the movable element

FIG. 48 shows the movable element sliding and locking into the seat pan

FIG. 83 is a front perspective view showing the invention according to another embodiment in which the deployable extension frame is in the stored retracted position;

FIG. 84 shows the deployable extension frame deployed with the seat pan in the forwardmost position;

Figure 14:
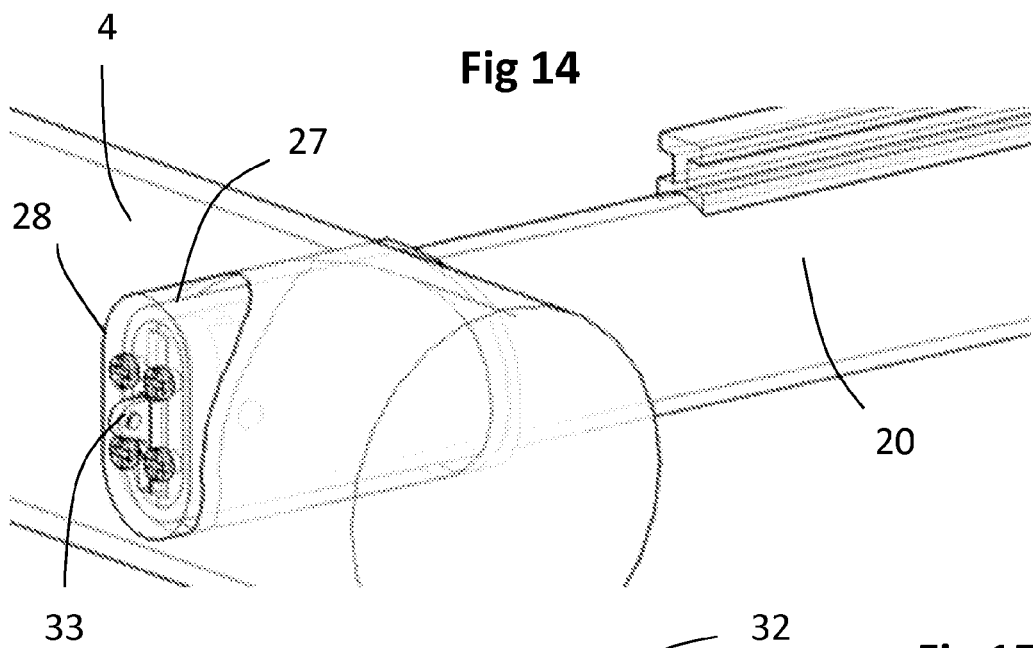
FIG. 14 shows the parts of FIG. 13 with the front spar and the reinforcement sleeve.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

Referring firstly to FIG. 1, according to a first embodiment of the present invention in which the seat pan extension portion comprises a movable element comprising both a subframe and a cushion, a row of aircraft seats 1 is shown, such as are found in the economy section of an aircraft. Each seat 1 comprises a seat pan 2 and a backrest 3. The backrest is arranged to support the upper body of the passenger including the head. The seats are joined by a pair of transverse spars 4, 5 extending the length of the row under the seat pans 2, one 4 at the front and the other 5 at the rear as shown in FIG. 3. As shown in FIG. 3, the spars 4, 5 pass through seat pan side frame side members 6 which are provided between adjacent seats and at the ends of the row, and serve to mount each seat frame structure onto a plurality of legs 7. When the seats 1 are fitted to an aircraft, the legs 7 are secured to longitudinally extending floor rails of the aircraft, and are positioned along the spars accordingly. The seats 1 also comprise moveable armrests 8 between adjacent seats, pivotally attached to the seat frame side members 6 so that they can be deployed as shown in the FIG. 1, or may be folded upwardly to be stowed between the seats as shown in FIG. 2.

As can be seen in FIGS. 1 and 2 the seat pans each include apertures 9 adjacent each side of the front edge of a cushion 10 of the seat pan 2. These provide access to corresponding apertures in the front spar 4 as will be described below. As can be seen in FIG. 2, the backrests 3 each comprise an outer shell 11, which mounts an in flight entertainment unit 12, for example in the form of a display screen, near the upper edge thereof, for use by a passenger sitting in a seat behind. A movable tray table 13 may also be mounted to the seat frame side members 6, shown here in a stowed position.

Each backrest 3 comprises a lower back portion 14 and a headrest portion 15. The headrest portion 15 comprises a movable element 16 which can be removed and attached to the front edge of the seat pan 2, as shown in FIG. 2. It can be seen in this embodiment that the movable element 16 constitutes the seat pan extension portion 17. The movable element comprises a cushion 18 and a subframe for supporting the cushion 18 and for securing the movable element to the seat frame as will be described below. The movable element 16 has a width which is substantially similar to the width of the seat pan 2. It can be seen that, with the movable elements deployed to provide an extension surface to the seat pan of each seat, a substantially continuous bed-like surface may be formed. The movable elements 16 may be sized to substantially fill the gap between the front edge of the seat pans and the back of the seats in the row in front to maximise the size of the bed surface.

With the movable elements removed, the outer shells 11 remain in place maintaining access to the IFE unit or other services for the passenger behind, and also maintaining the privacy of the passengers using the converted seats.

Referring now to FIGS. 3 to 9, the cooperating fixing parts of the seat pan frame and the movable element are shown. A U-shaped subframe 19 in the form of a tubular member having a pair of side arms 20 adjacent to the edges of the movable element is mounted to a cushion backing plate 21 by means of longitudinally extending channels 22 in the backing plate 21, and corresponding rails 23 on the subframe 19.

In order to place the movable element in the gap at the front of the seats, the subframe 19 is retracted as shown in FIG. 5. In order to attach the movable element to the seat to form an extension surface, the subframe 19 slides along the channels 22 such that the side arms 20 extend outwardly until the subframe 19 abuts against a pair of stops 24 provided on the backing plate, as shown in FIG. 4.

Referring to FIGS. 6 and 7, when aligned with the front of the seat, the side arms 20 enter aligned apertures 25, 26 provided in the front seat spar 4 adjacent the edges of each seat pan behind the seat pan cushion apertures 9. The spar apertures 25, 26 may accommodate a reinforcement sleeve 27 so as not to deter from the strength of the spar 4. As shown in FIG. 7, the rear part of the reinforcement sleeve 27 may be in the form of a blind hole so that the side arm abuts an end wall 28 of the sleeve.

Referring now to FIGS. 8 and 9, the cooperating fixing parts of the main backrest frame and the movable element are shown. The position of the subframe 19 relative to the main backrest frame 29 and how the two are fixed together are also shown. The backrest frame comprises of two side tubular members 30 which have fixed at their top ends joining sleeves 31 for detachably receiving the side arms 20 of the movable element. The subframe 19 is in the retracted position relative to the backing plate as shown in FIG. 5 when the movable element is fixed to the main backrest frame 29.

The outer shell 11 which carries the display screen 12 is fixed to the joining sleeves 31 as shown in FIG. 9. FIG. 9 also shows how the subframe 19 fits around the outer shell 11 and screen 12 such that the outer shell does not interfere with the subframe as it is deployed.

The movable element 16 may be fixed detachably to the seat pan frame and the main backrest frame using the above mentioned first embodiment using a variety of ways, some of which are described by way of example below and with reference to FIGS. 10 to 34.

A first detachable fixing approach for the movable element of the above mentioned first embodiment involves the use of rotor latches, some of which are described by way of example below and with reference to FIGS. 10 to 28. FIGS. 10 and 11 show a typical rotor latch 32, a part which is commonly found in car door locks and child seat restraint mechanisms such as "Isofix" ®. The latch in its locked position is shown in FIG. 10 and in its open position in FIG. 11. It can be seen how a simple pull on the control rotor 33 causes the strike rotor 34 to open automatically by the action of the strike springs 35. Upon release of the control rotor, the control rotor returns to its original location by the action of the control springs 36. A pushing action against the strike rotor will cause it to lock automatically and return to its original locked position shown in FIG. 10.

The rotor latch may be bolted to the end wall 28 of the reinforcement sleeve 27 as shown in FIG. 12 and the end wall may have an aperture 37 through which the control rotor 33 may be actuated. FIG. 13 shows how both side arms 20 of a subframe may accommodate corresponding rotor latches 32. A locking pin 38 located near the end of the side arm positioned transversely within the arm section strikes the strike rotor 34 of the rotor latch 32 and is locked in place until further actuation of the control rotor 33. FIG. 14 shows the arrangement described in FIG. 13 together with the reinforcement sleeve 27 and the front spar 4.

Figure 15:
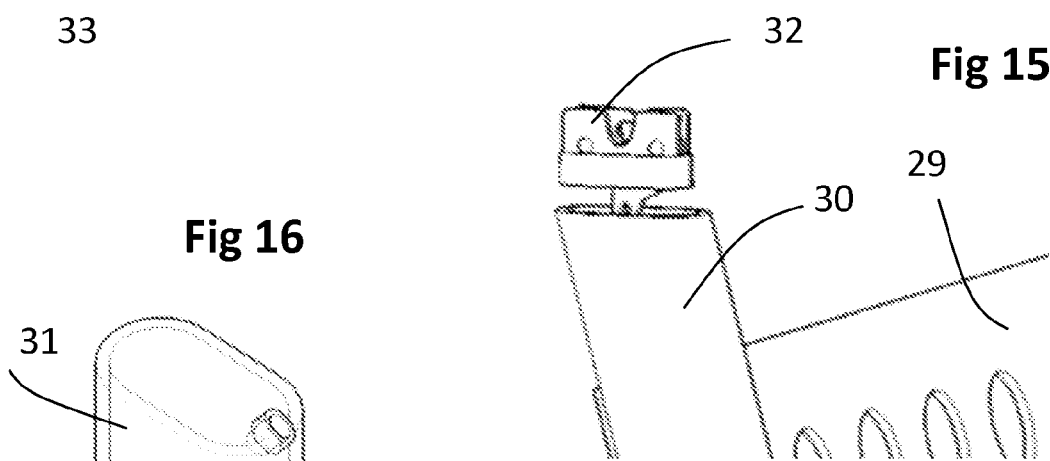
FIG. 15 shows the location of the rotor latches relative to the main backrest frame.
Figure 16:
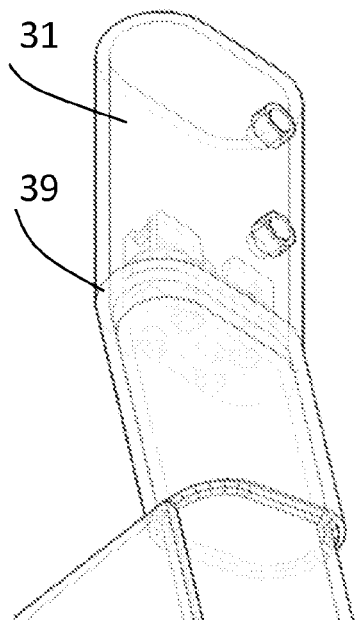
FIG. 16 shows the parts of FIG. 15 with the joining sleeve.
Figure 17:
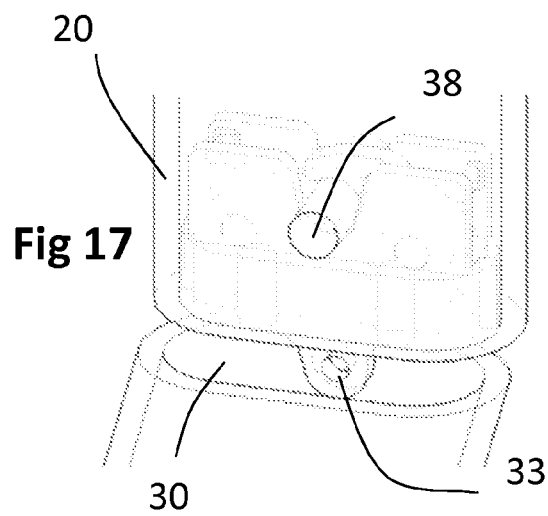
FIG. 17 shows the parts of FIG. 15 with the movable headrest element side arm.

Rotor latches may also be used to detachably fix the side arms 20 of movable element to the top of the main backrest frame 29 as shown in FIGS. 15, 16 and 17. A rotor latch 32 may be bolted to the middle section 39 of a joining sleeve 31 as shown in FIG. 16 such that it engages correspondingly with a side arm pin 38 as shown in FIG. 17 when the subframe 19 is pushed into the final headrest position. Access to the control rotor 33 is possible from inside the backrest side frame members 30 of the main backrest frame as shown in FIG. 15.

Different ways in which the control rotor 33 may be actuated are described below and with reference to FIGS. 18 to 28.

Figure 18:
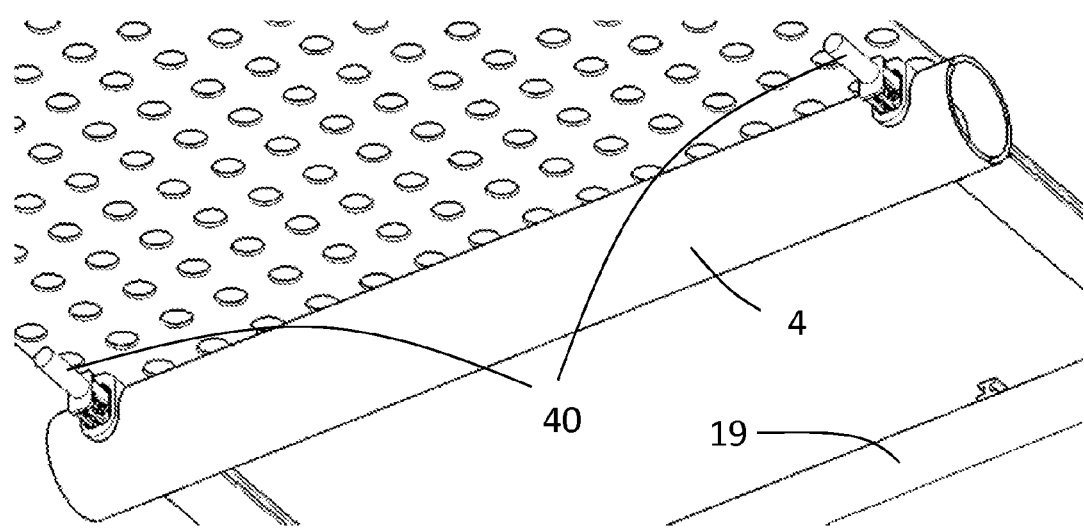
FIG. 18 is an underneath perspective view showing the location of the two solenoids on the front spar.
Figure 19:
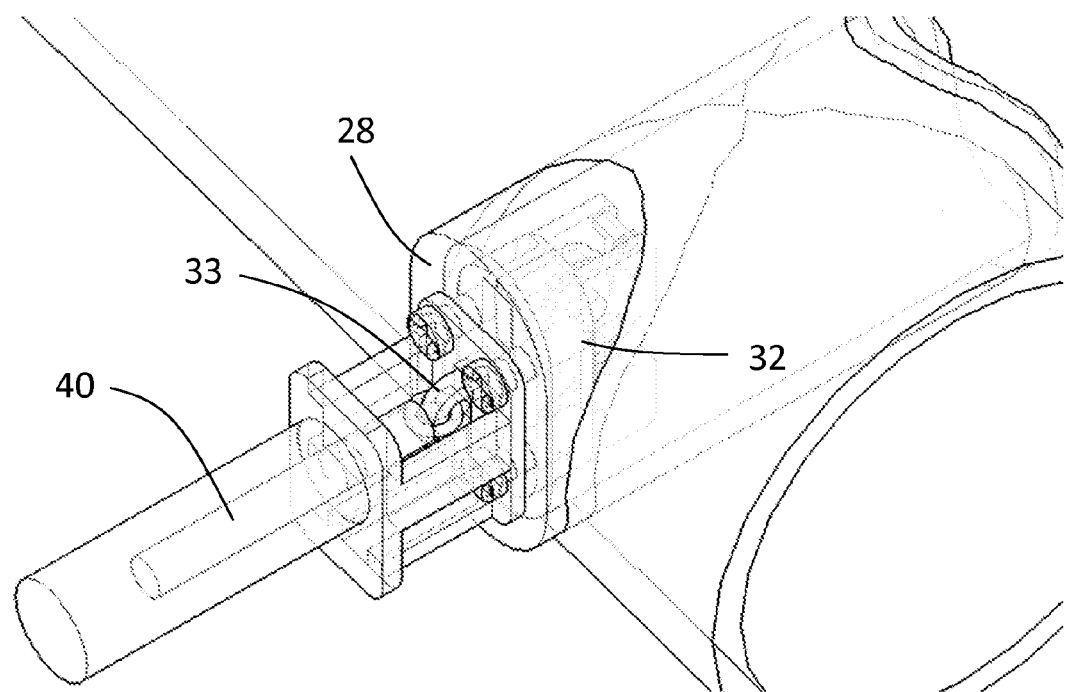
FIG. 19 is a semi-transparent rear perspective view showing the position of the solenoid relative to the reinforcement sleeve and the rotor latch.

Referring now to FIGS. 18 to 21, in a preferred way, the control rotor 33 is operated by a locally positioned electro-mechanical actuator such as a solenoid 40. For the seat pan rotor latches the solenoids may be bolted to the back of the reinforcement sleeve end walls 28 and into the rotor latches 32 as shown in FIGS. 18 and 19. In a similar way, for the backrest rotor latches, the solenoids 40 may be bolted through the middle section 39 of the joining sleeve 31 and into the rotor latches 32 as shown in FIGS. 20 and 21. The solenoids may be mounted at an angle to the rotor latches such that the body of the solenoid is in line with and fits within the backrest side frame members 30. The electrical operation of the solenoids means that they can be operated quickly and easily from a remote control which for example only authorised cabin crew may have access to.

Another way of actuating the control rotor 33 is shown in FIGS. 22 to 28. In this way the control rotor is actuated from a central location where force is generated and connected to the control rotor by means of cables, as commonly found in aircraft seat reclining systems. These cables transmit the force from the central location to the control rotor. FIG. 22 shows how a lower cable 41 may be connected to a seat pan rotor latch control rotor 33 while FIGS. 23 and 24 show how an upper cable 42 may be connected to a backrest rotor latch control rotor 33 with the cable passing through the inside of a backrest side frame members 30.

Figure 25:
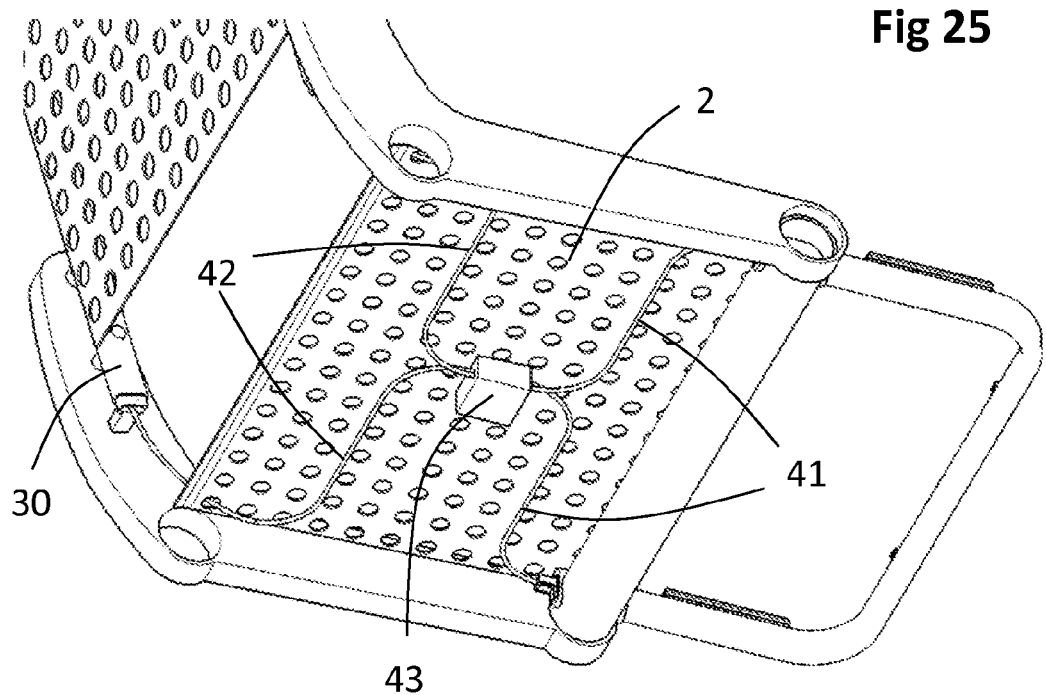
FIG. 25 shows the location of the central servo relative to the seat.
Figure 26:
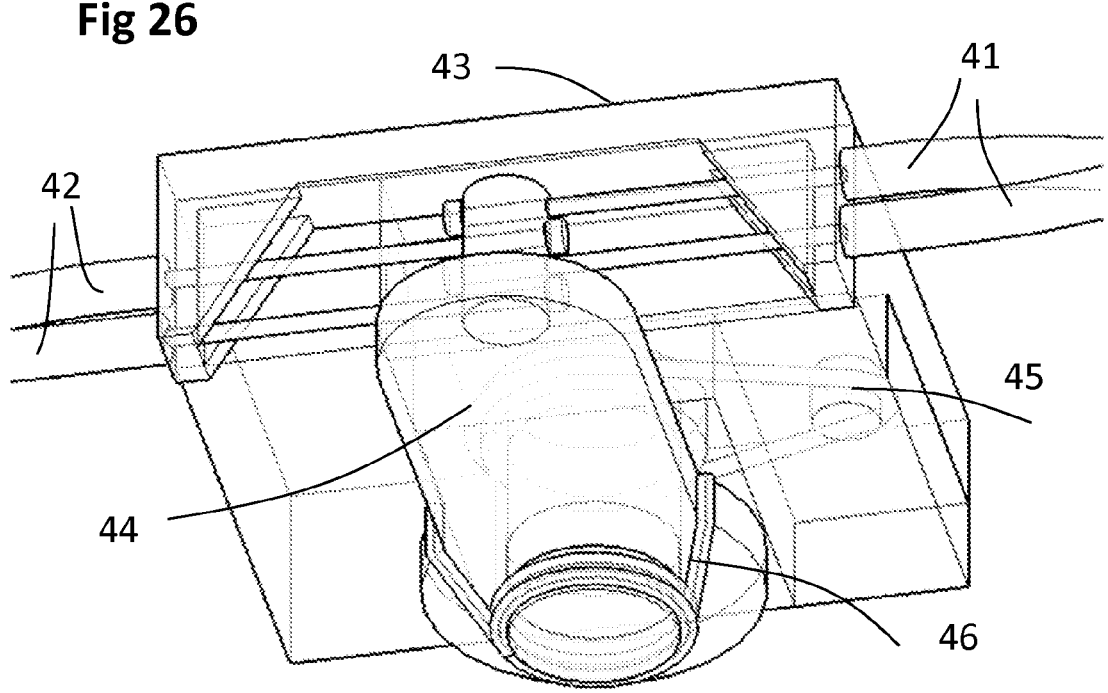
FIG. 26 is a semi-transparent perspective view showing the central servo of FIG. 25 in more detail.
Figure 27:
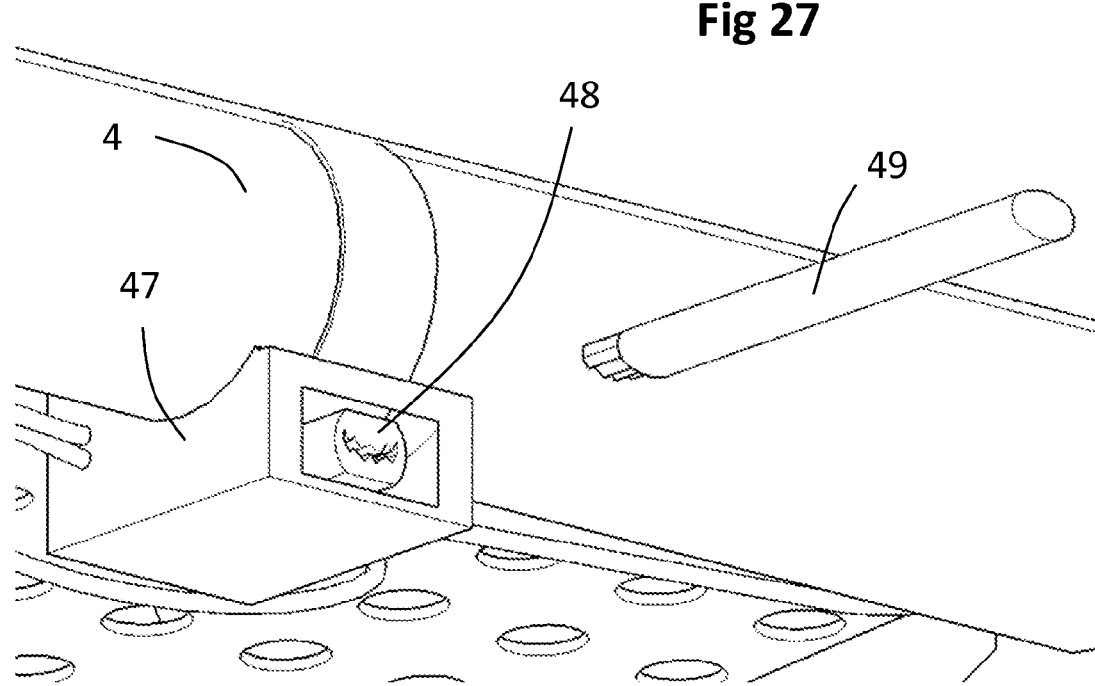
FIG. 27 is a front perspective view showing the location of the central manual unit with corresponding handle.
Figure 28:
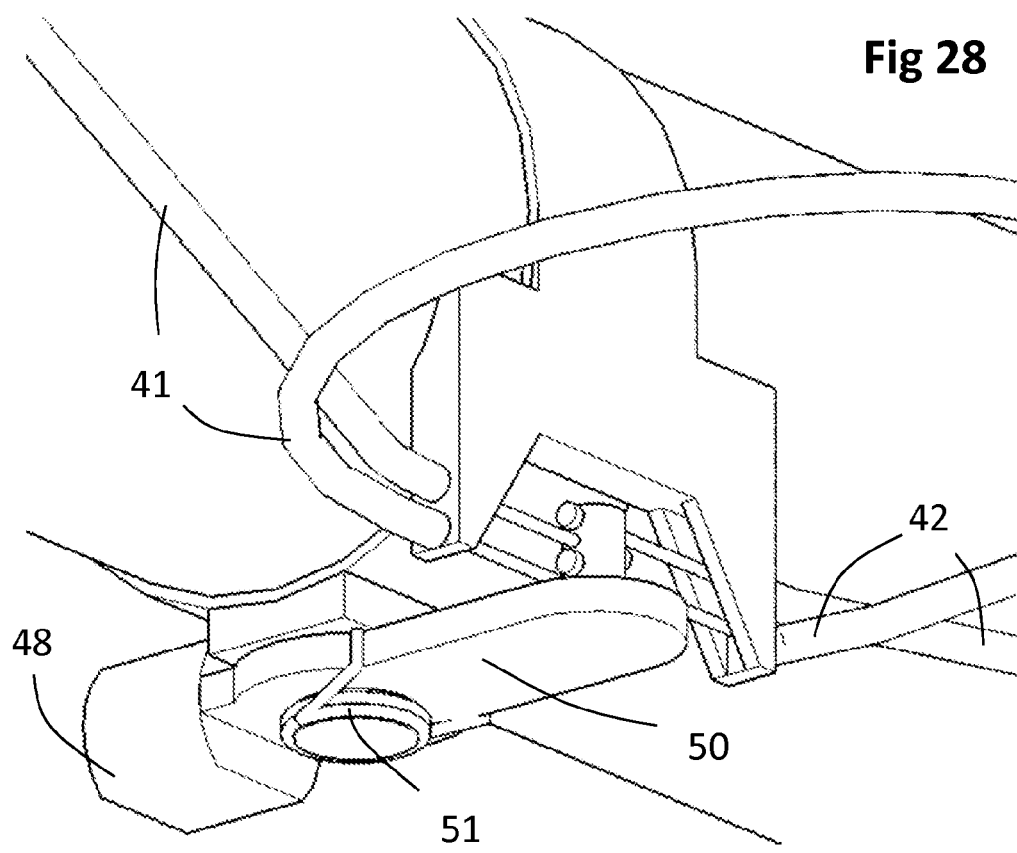
FIG. 28 shows the central manual unit of FIG. 27 in more detail.

The force may be generated electromechanically from a central servo as shown in FIGS. 25 and 26, or it may by generated manually as shown in FIGS. 27 and 28.

Referring now to FIGS. 25 and 26 the location of a central servo 43 fixed to a seat pan 2 is shown with a pair of lower cables 41 and a pair of upper cables 42 passing through the inside of the backrest side frame members 30. A more detailed view of the central servo 43 is shown in FIG. 26. In the arrangement shown an arm 44 is pivotally attached to a servo motor 45 and is under the constant force of springs 46 which provide a force to return the arm to a central position as shown. Looking from below the central servo as shown in FIG. 30 it can be seen that when the arm moves in a clockwise direction from centre, the upper cables 42 are pulled causing the backrest rotor latches to open and when the arm moves anticlockwise from centre the lower cables 41 are pulled causing the seat pan rotor latches to open.

Referring now to FIGS. 27 and 28 the location of a central manual unit 47 fixed to a front spar 4 is shown. Just below the spar is located a socket 48 in which the opening faces the front such that it may receive a handle 49. The parts of the socket and handle which engage may have a corresponding pattern as shown such that the handle also acts as a key. This allows only designated personnel who are in possession of the handle or key to operate the central manual unit. A more detailed view of the central manual unit 47 is shown in FIG. 28 in which it can be seen that the socket 48 sits at one end of a pivotally attached arm 50. At the other end of the arm are attached the ends of the lower cables 41 and the upper cables 42. In similar way to that described with the central servo example the arm 50 is under the constant force of springs 51 which provide a force to return the arm to a central position as shown. Looking from under the unit as shown in FIG. 28, when the handle is operated such that the arm rotates clockwise or anticlockwise the seat pan or backrest rotor latches respectively are opened.

A second detachable fixing approach for the movable element of the above mentioned first embodiment is described by way of example below and with reference to FIGS. 29 to 34. Referring now to FIGS. 29, 30 and 31, transversely aligned bolt apertures 52 in the side arms 20 and the reinforcement sleeve 27 are in register with a bolt 53 provided in the spar 4 adjacent the spar apertures. The bolts may be coupled to an electromechanically operated mechanism 54 located inside the front spar 4 to extend or retract the bolt so as to secure the movable element in position, or to release it.

Figure 32:
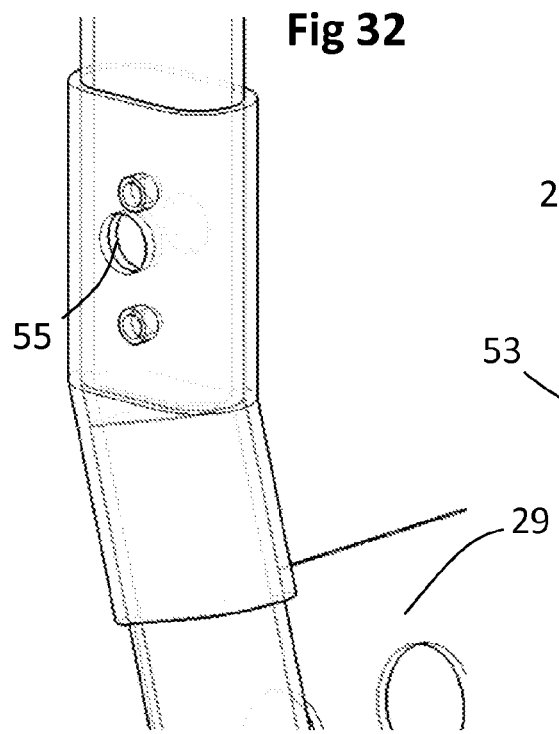
FIG. 32 shows the apertures in the side arm and joining sleeve.
Figure 33:
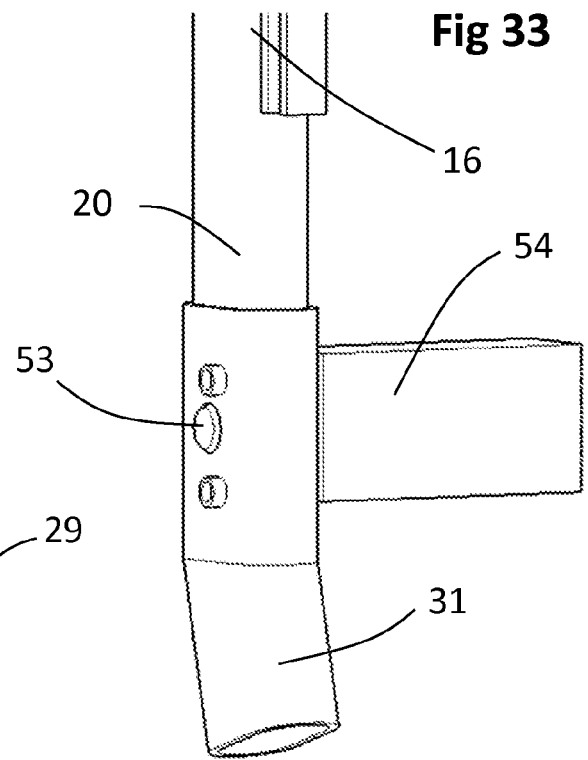
FIG. 33 shows the parts in FIG. 32 with the extended bolt and mechanism housing.
Figure 34:
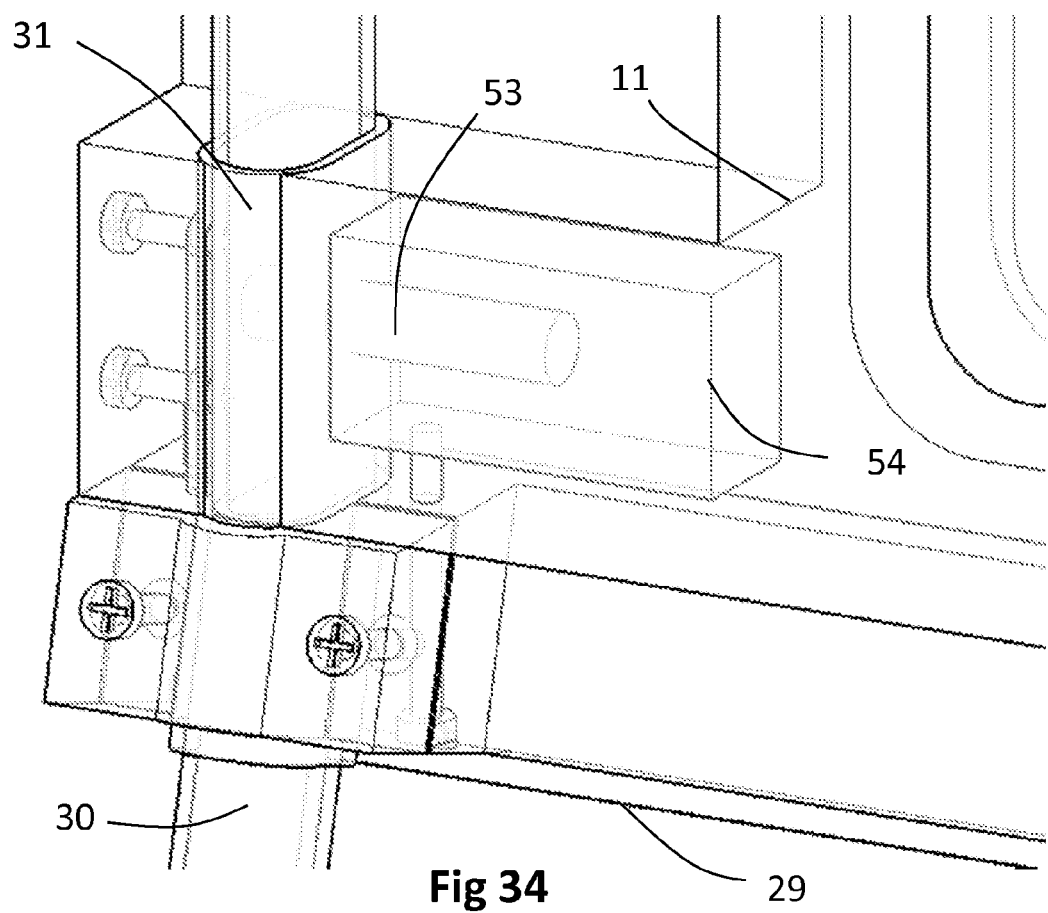
FIG. 34 is a semi-transparent front perspective view showing the parts of FIG. 33 and how they fit in and around the outer shell.

A similar arrangement may be used detachably to fix the movable element to the main frame 29 of the backrest as shown in FIGS. 32, 33 and 34. Here, backrest side frame members 30 have attached at their ends joining sleeves 31 in the form of tubular members which include at least one bolt aperture 55 adjacent a top edge thereof. The joining sleeves 31 are sized to receive the side arms 20 of the movable element subframe. A bolt 53 is provided with a mechanism 54 located inside the outer shell 11 for extending or retracting the bolt as described above.

Figure 35:
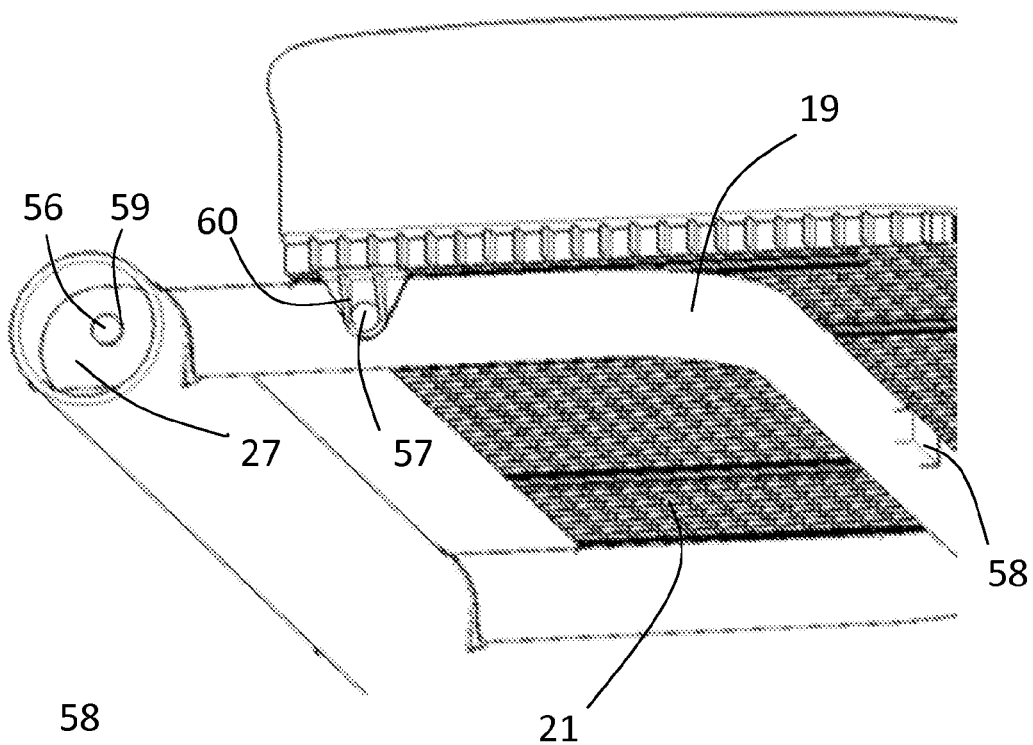
FIG. 35 shows the movable element with the subframe in the extended position attached to the front spar with the pin and hole locking mechanism.
Figure 36:
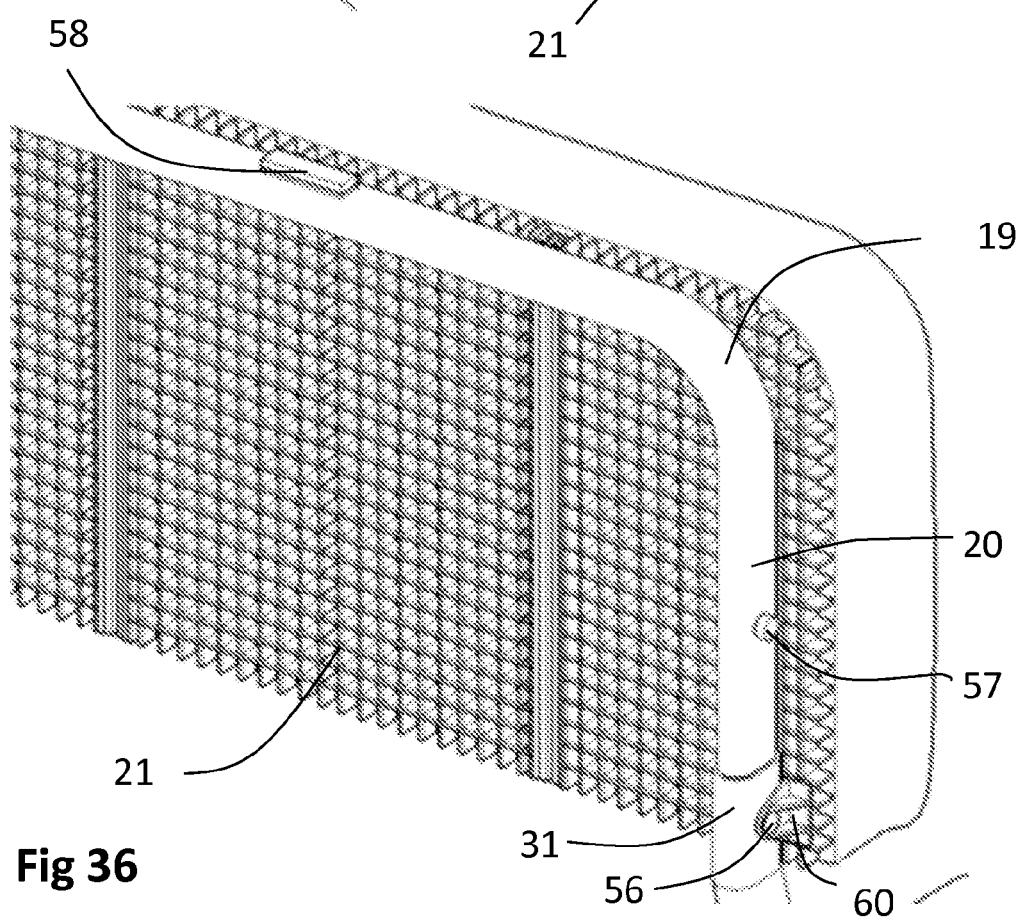
FIG. 36 is a rear perspective view showing the movable element with the subframe in the retracted position attached to the backrest with the pin and hole locking mechanism.

A third detachable fixing approach for the movable element of the above mentioned first embodiment is described by way of example below and with reference to FIGS. 35 to 36. In this example, the side arms 20 accommodate a rearmost pin 56 adjacent the side arm ends and a frontmost pin 57 both retractable into the side arm by operating a pushbutton 58. This type of lock/release mechanism is commonly found on extendable suitcase handles to release the extension or retraction of the handle at the touch of a button. In this arrangement when the subframe 19 is in the extended bed mode position as shown in FIG. 35 the rearmost pin 56 engages with pin apertures 59 of the reinforcement sleeve 27 and the frontmost pin 57 engages with the aperture of a bracket 60 attached to the backing plate 21 to lock the subframe 19 in the extended position relative to the backing plate. When the subframe 19 is retracted and fixed to the backrest as shown in FIG. 36, the rearmost pin 56 engages with both the pin apertures of the joining sleeve 31 and with the aperture of the bracket 60 to lock the subframe 19 in the retracted position relative to both the joining sleeve 31 and the backing plate 21.

In a second embodiment in which the seat pan extension portion comprises a movable element comprising both a subframe and a cushion, the subframe may be in a fixed position relative to the backing plate and the free ends of the subframe may engage with receiving arms pivotally attached to the front spar 4 as shown in FIGS. 37 to 44.

Figure 41:
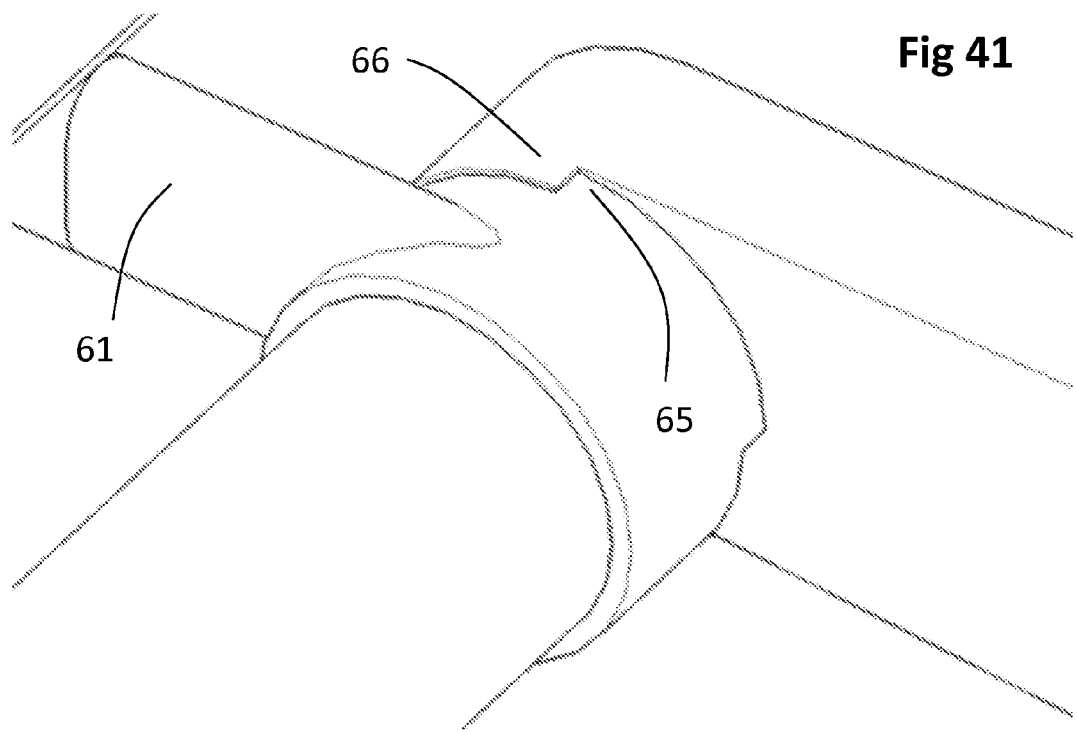
FIG. 41 is a rear perspective view showing the mechanism which holds the movable element in a horizontal position in front of the seat pan when in bed mode.

Referring now to FIGS. 37 and 38, in seat mode receiving arms 61 may be rotated about the front spar 4 in a rearward direction such that they are stored under the seat pan 2 and out of sight. As shown in FIG. 38, the receiving arms 61 when in the stored position are prevented from rotating any further under the seat pan due to a side protrusion 62 on the receiving arms which abut against a corresponding protrusion 63 on the seat pan frame side member 6. As shown in FIG. 37, when the seats are being converted to bed mode, the seat pan may pivot about a hinge 64 fixed on the rear spar 5 such that the front of the seat pan 2 may move upwards. With the front of the seat pan lifted up sufficiently, the receiving arms 61 may rotate under the seat pan 2 in a position such that the receiving arms can engage with the subframe 19 as shown in FIG. 39. The final extended surface is achieved by rotating further the movable element 16 fixed to the receiving arms 61 until it reaches a position in which the top surface of the cushion 18 of the movable element lies substantially horizontal as shown in FIG. 40. The movable element in its deployed position is prevented from rotating any further due to another side protrusion 65 on the receiving arm 61 which abuts against another protrusion 66 on the seat pan frame side member 6 as shown in FIG. 41.

Figure 42:
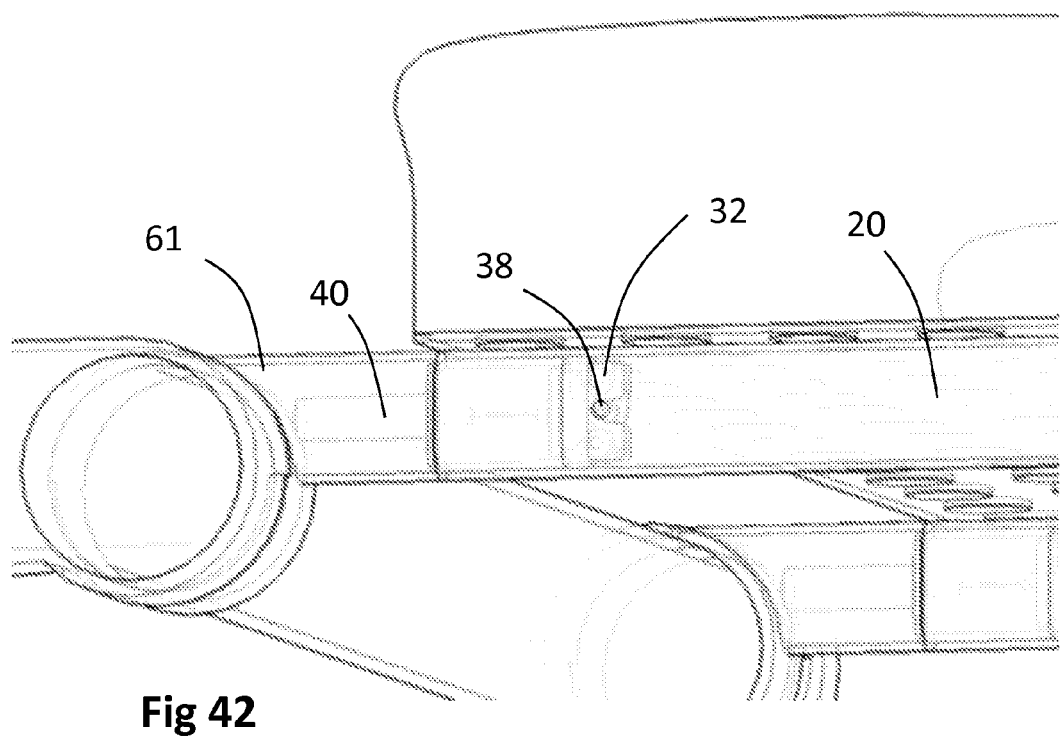
FIG. 42 is a semi-transparent view showing the movable element in bed mode and the solenoid body inside the receiving arm and the rotor latch inside the side arm.

In a similar way to that described in the first embodiment, the side arms 20 of the subframe may be detachably fixed to the seat pan frame as shown in FIG. 42 and to the main backrest frame as shown in FIGS. 43 and 44 by means of rotor latches 32. As shown in FIG. 42, the rotor latches are fixed to the end of the receiving arms 61 and are sized to fit within the side arms 20. Similarly to the first embodiment a pin 38 located in the side arm strikes the rotor latch 32 when the movable element 16 is pushed accordingly and locks the side arm 20 in position relative to the receiving arm 61. Also in a similar way to the first embodiment, the release of the latches may be operated manually or electromechanically using a remote control. An arrangement using solenoids 40 located within the receiving arms 61 is shown in FIGS. 42, 43 and 44 by way of example.

The backrest rotor latches 32 are mounted within the upper part of the joining sleeve 31 as shown in FIGS. 43 and 44 and the solenoids 40 are fixed to the lower part of the joining sleeve 31. The movable element side arm 20 may slide between the rotor latch 32 and the joining sleeve 31 until side arm pin 38 strikes the rotor latch and locks in position. It will be understood by a person skilled in the art that as a variation to the above second embodiment of the invention, rotor latches 32 may for example be located within the subframe side arms 20 and the above mentioned locking pins 38 located within the reinforcements sleeves 31.

Figure 49:
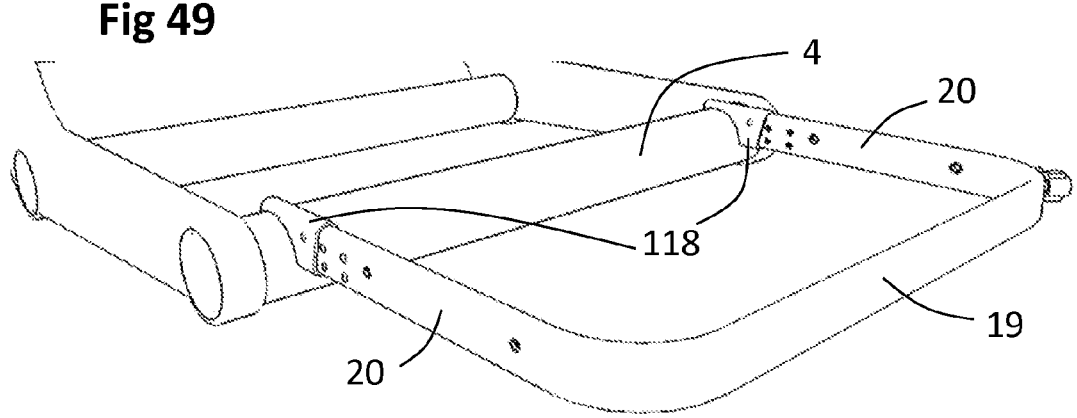
FIG. 49 is a front perspective view of subframe side arms relative to seat pan sockets
Figure 50:
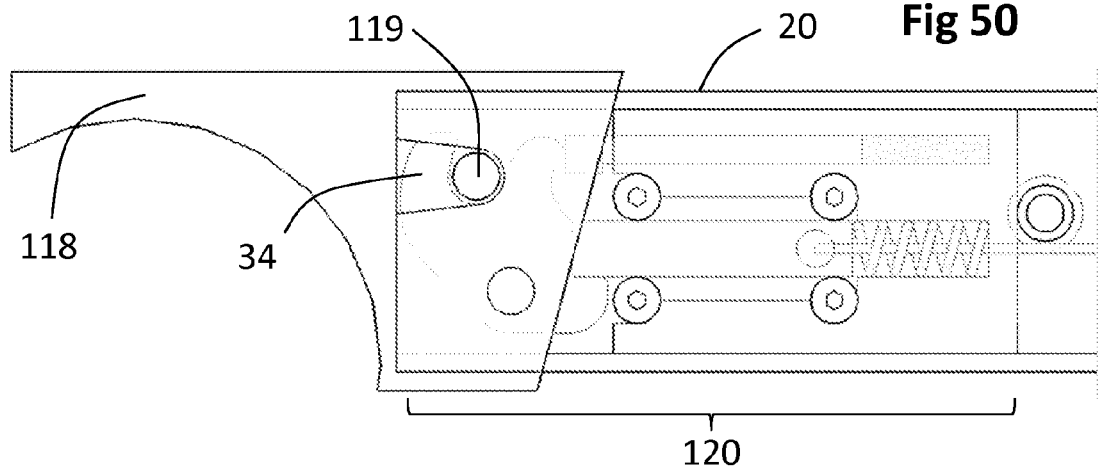
FIG. 50 is a side view of a side arm locked inside a seat pan socket

FIGS. 45 to 56 show a third embodiment in which the seat pan extension portion comprises a movable element comprising both a subframe and a cushion. This embodiment is similar to the one described in FIGS. 1 to 17 except that as shown in FIG. 47, the U-shaped subframe 19 is fixed to a cushion backing plate 21 without a mechanism for relative sliding. The other key difference is that rotor latches 120 are located within the subframe side arms 20 as shown in FIG. 47 and locking pins 119 are located within seat pan sockets 118 as shown in FIG. 50. The benefits are a simplified mechanism and two sets of rotor latches per seat instead of four.

Referring to FIGS. 45, 46 and 48, a movable element key 114 is inserted into a movable element key hole 115 and turned. This releases the movable element rotor latches 120 allowing the movable element 16 to slide upwards as shown by arrow 116 along the outer shell 11 and off of the headrest portion 15 of the backrest. As shown in FIG. 48 the movable element 16 can then be fixed to the front of the seat pan 2 by aligning the rotor latches 120 with the seat pan sockets 118 and moving the movable element against the seat pan in a direction as shown by arrow 117. FIG. 49 shows the subframe 19 engaged inside the seat pan sockets 118 and FIG. 50 shows how the strike rotor 34 of the rotor latch 120 has latched around the locking pin 119 thereby fixing the movable element 16 to the seat pan.

Figure 51:
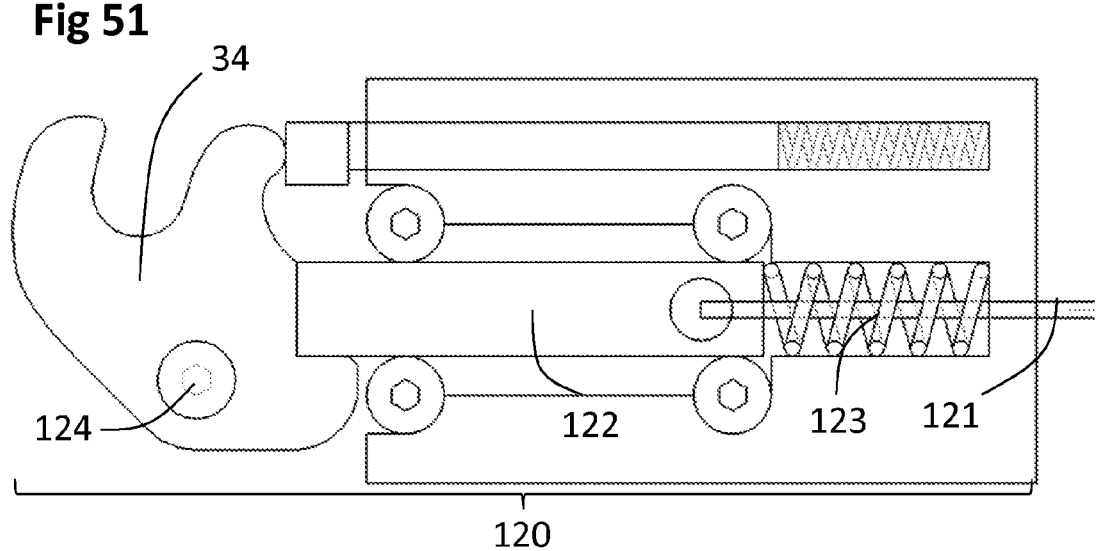
FIG. 51 shows detail of the linear release rotor latch mechanism in locked position

FIG. 51 shows in more detail the mechanism of the rotor latch 120 in the locked position. A latch release cable 121 is attached to a latch control bar 122 which pushes against the strike rotor 34 as a result of the force provided by a latch control bar spring 123. The action of the latch control bar 122 against the strike rotor 34 stops the strike rotor from rotating about its centre of rotation 124 thus locking the rotor latch 120.

Figure 52:
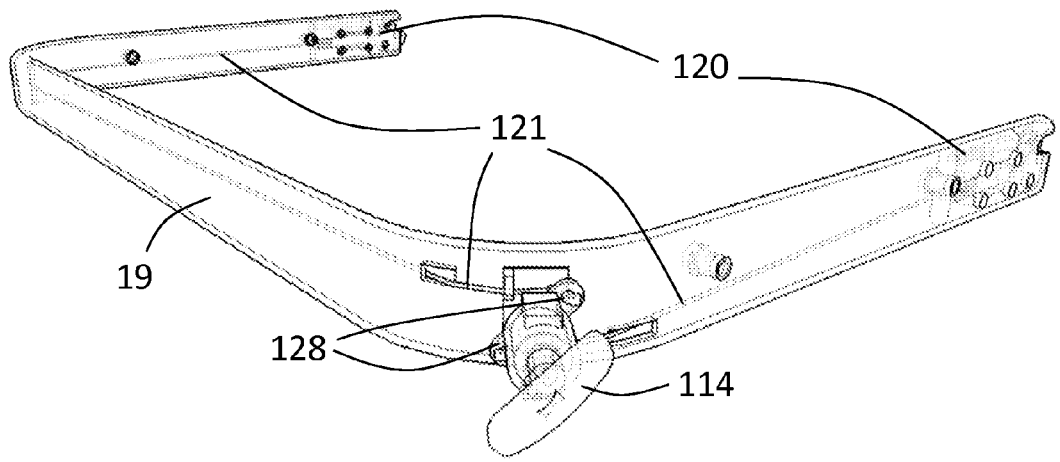
FIG. 52 shows latch release cables inside subframe and how they are actuated by key
Figure 53:
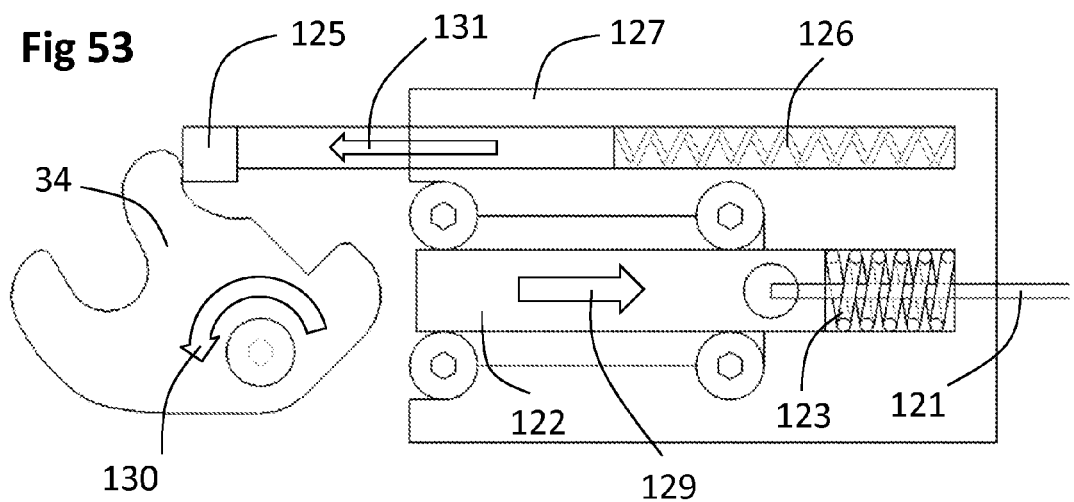
FIG. 53 shows the mechanism of FIG. 53 in the open position
Figure 54:
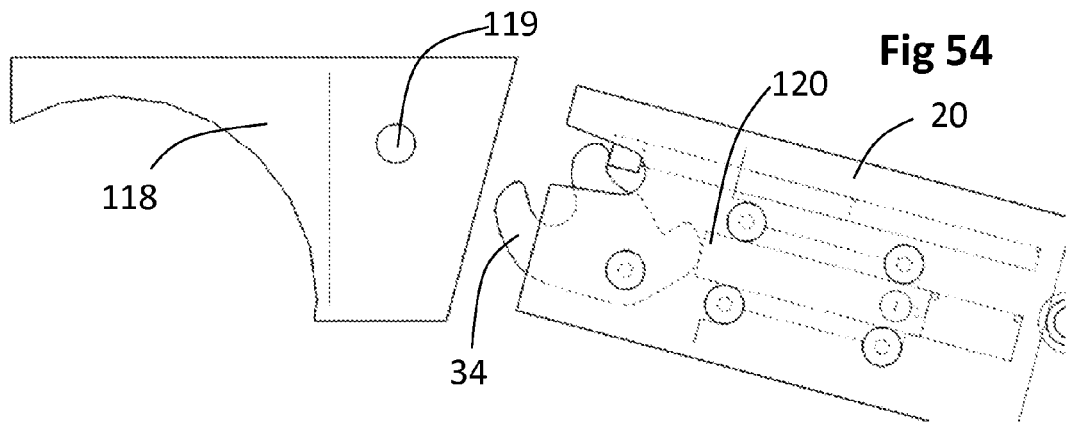
FIG. 54 shows a side arm with rotor latch assembly next to seat pan socket

As shown in FIG. 52 the two rotor latches 120 of the movable element are released by a turn of the key 114 which rotates the cable actuator arms 128 which in turn pulls on both latch release cables 121 which run through the tubing of the subframe 19. This causes the latch control bar 122 to move away from the strike rotor 34 as shown by the arrow 129 in FIG. 53 thereby allowing the rotor to rotate open as shown by arrow 130 under the action of a strike rotor opening pusher 125 being pushed by opening pusher spring 126 in a direction shown by arrow 131. FIG. 54 shows how a side arm 20 containing a rotor latch 120 in its open position can then be easily pulled away from a seat pan socket 118 and pin 119.

Figure 55:
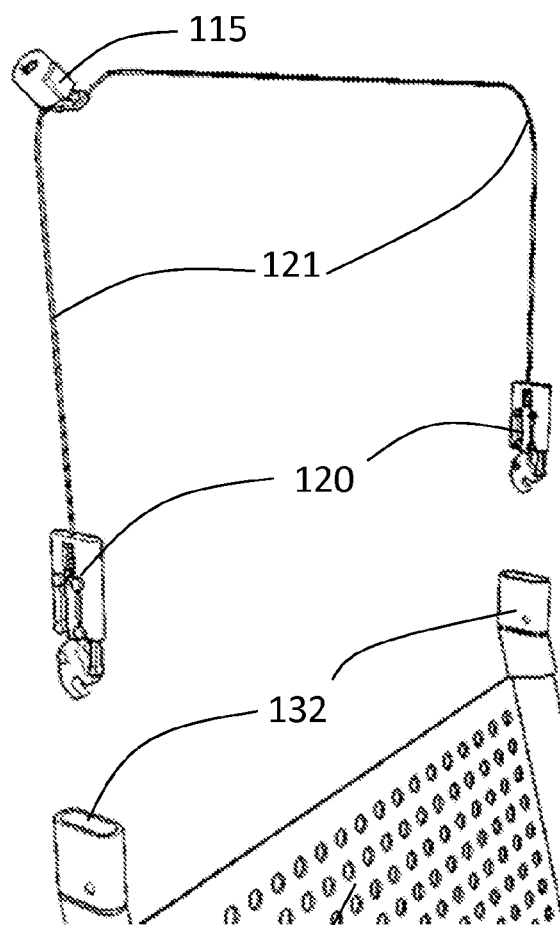
FIG. 55 is a front perspective view of the whole release/lock mechanism relative to the seat back sockets
Figure 56:
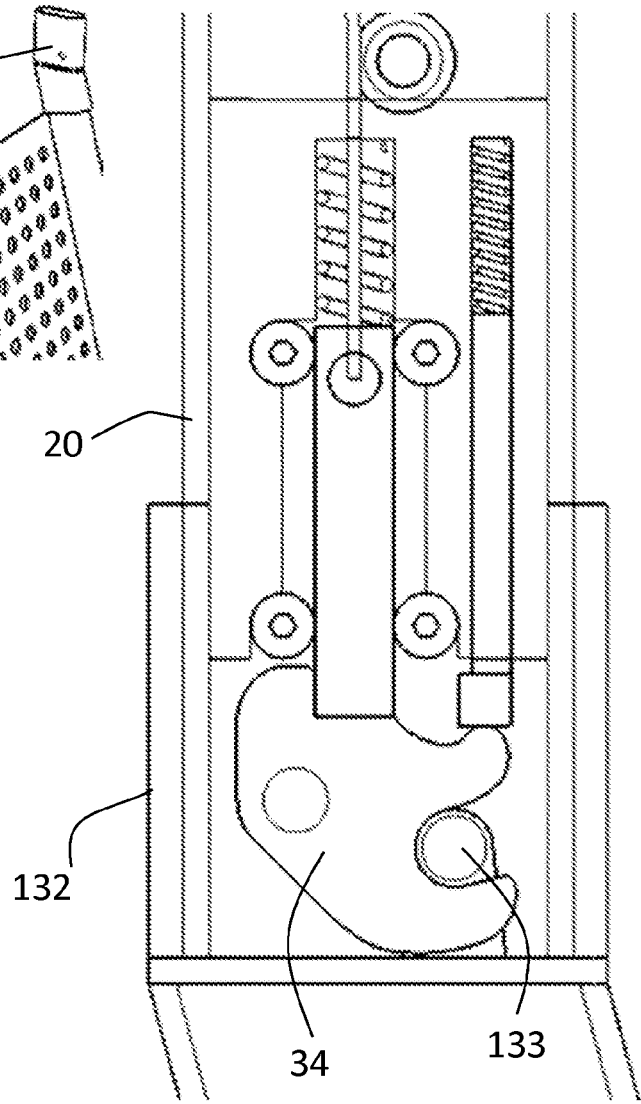
FIG. 56 is a side section view of a side arm with rotor latch assembly inside a seat back socket in its locked position

FIG. 55 shows a stripped movable element with rotor latches 120 still in open position ready to engage with seat back sockets 132. When the movable element is lowered back into the headrest position onto the seat back sockets, the action of the seat back socket pins 133 on the strike rotor 34 causes the rotor latch to automatically lock again as shown in FIG. 56.

In a fourth embodiment in which the seat pan extension portion comprises a movable element comprising both a subframe and a cushion, the seat may alternatively be extended by the seat pan itself moving forwardly, with a movable element fitting in the gap between the back of the seat pan and the lower end of the backrest. Such an embodiment is shown in FIGS. 57 to 65.

Figure 57:
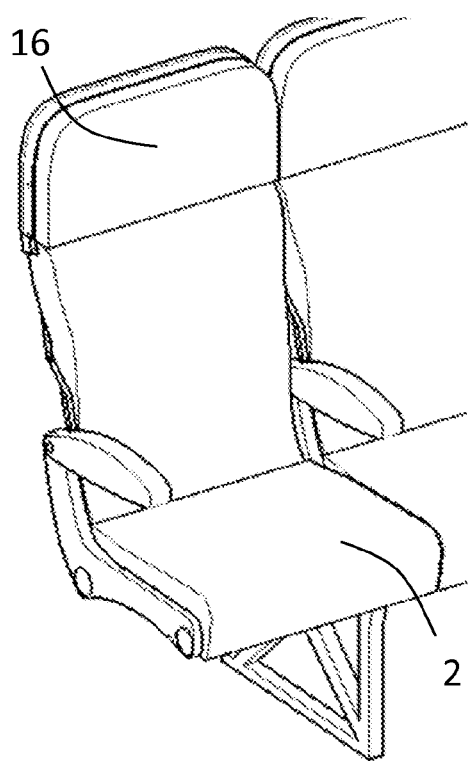
FIG. 57 is a front perspective view of a row of three seats shown in seat mode according to yet another embodiment of the invention.
Figure 58:
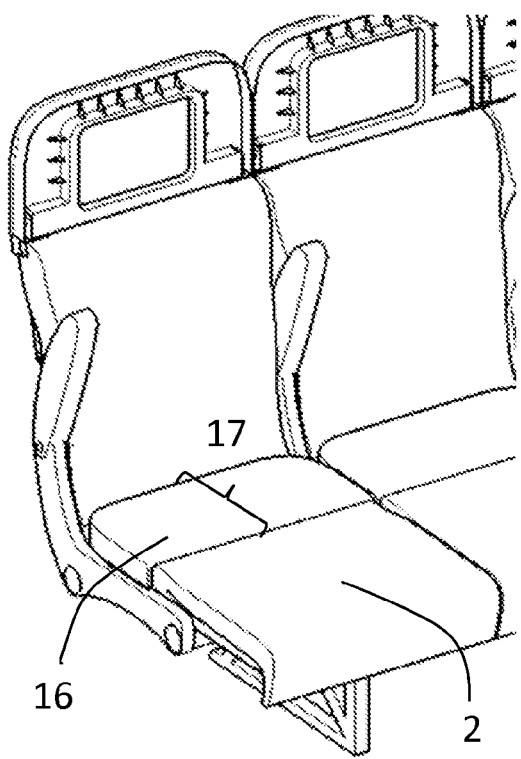
FIG. 58 is a front perspective view of the seats of FIG. 59 shown in bed mode.

FIGS. 57 and 58 show a triple seat unit in normal seat mode and extended mode respectively. The movable element 16 is shown acting as a headrest in FIG. 57 and as a seat pan extension portion 17 behind the seat pan 2 in FIG. 58.

Figure 59:
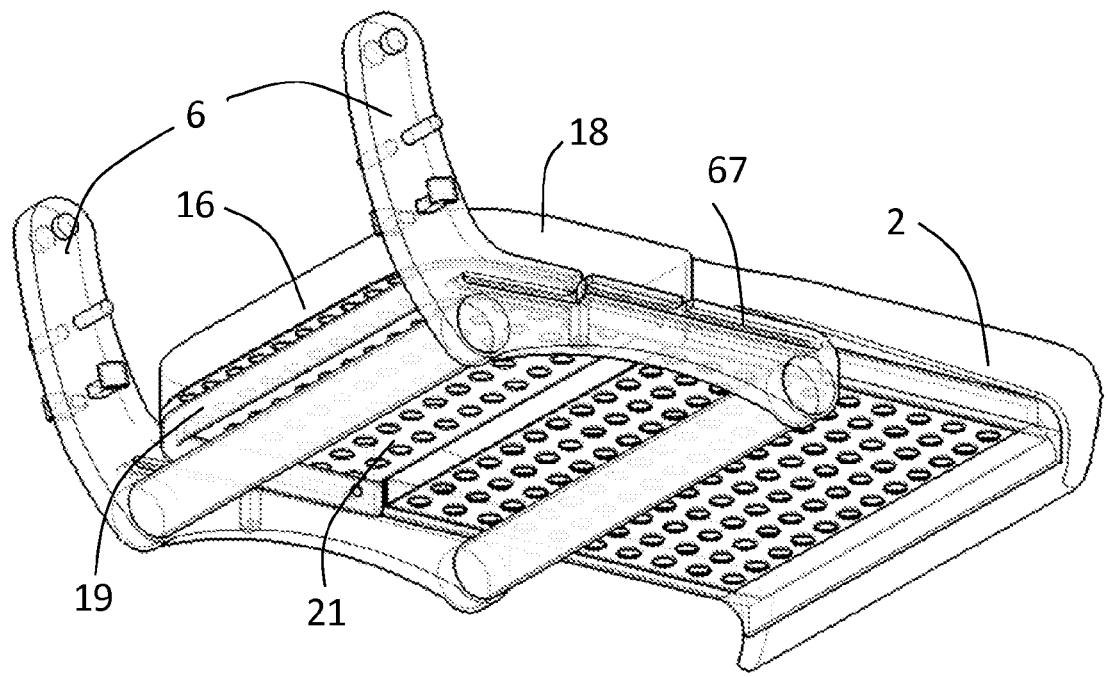
FIG. 59 is a front perspective view showing the seat pan in its forwardmost position with the movable element deployed.
Figure 60A:
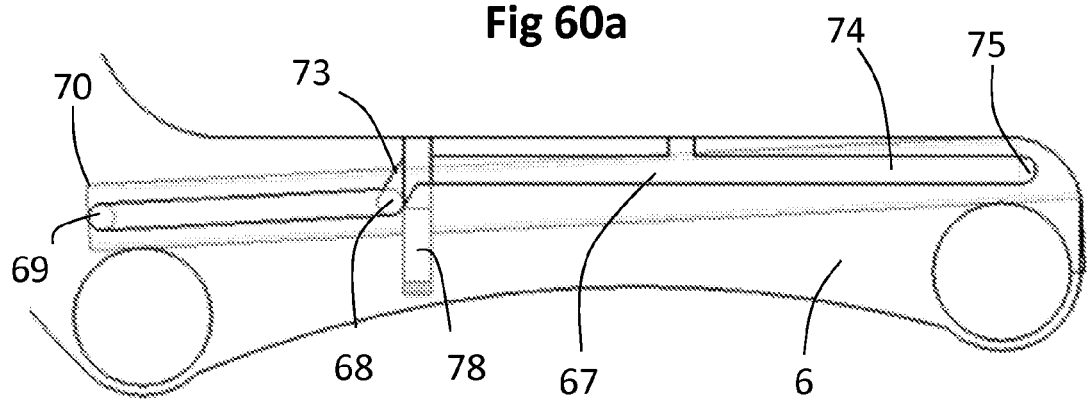
FIGS. 60a, b and c show the seat pan frame side members and the movement of the seat pan from the retracted rearmost position to the deployed forwardmost position; its forwardmost position with the movable element deployed.
Figure 60B:
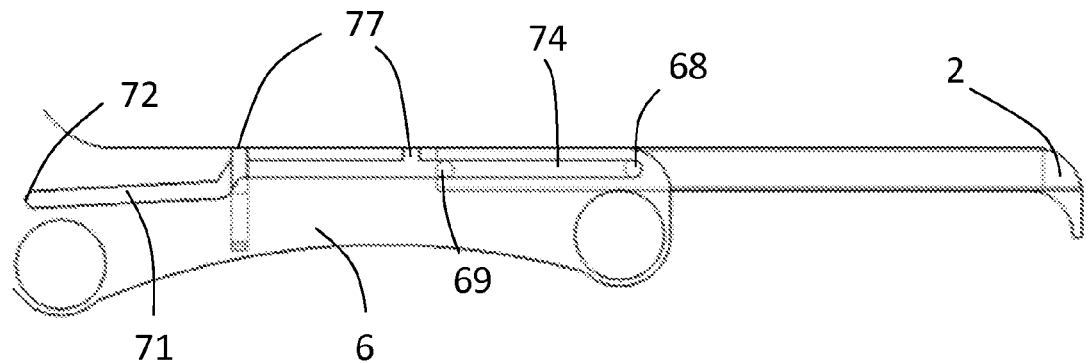
Figure 60C:
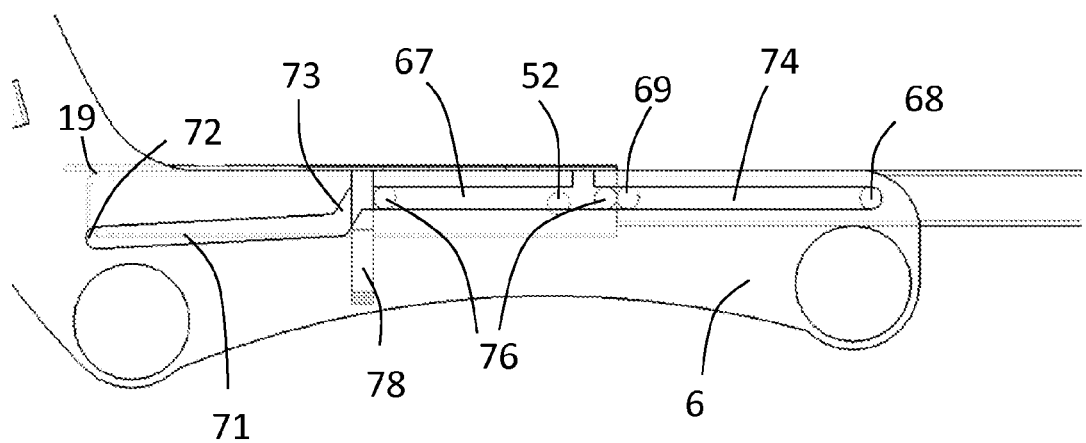

Referring to FIG. 59, the side frame members 6 of the seat pan 2 are provided with angled channels 67. FIGS. 60a to 60c show the seat pan frame with a pair of sideways extending spaced apart lugs, a forwardmost pair 68, and a rearmost pair 69 towards the rear of each side, adjacent the side frame members 6 and extending into the channels 67. The front edge of the seat pan 2 may thus be pulled forwardly, moving the seat pan frame forwardly with the lugs 68, 69 running in the channels 67. As shown in FIG. 60a, in the seat position, the seat pan tilts slightly upwardly such that the front edge is slightly higher than the rear edge 70, so as to provide a comfortable seating position. The channels thus have a rear part 71 which tilts correspondingly slightly upwardly from back to front. The rearmost lugs 69 on each side bear against a rear blind end 72 at the rear of the channel. The channels have a central part 73 which kinks upwardly to a front part 74 which is a little higher and is substantially horizontal or level, terminating in a front blind end 75. Thus when the seat pan it pulled fully forward as shown in FIG. 60b, with the forwardmost lugs 68 bearing against the front blind end 75 of the channel, the seat pan acquires a more horizontal orientation so as to form part of a substantially flat bed surface. The horizontal or level position may take account of the cruising angle of the aircraft, and may for example be about 3 degrees away from true horizontal.

Referring to FIG. 60c the movable element subframe 19 comprises a pair of sideways extending lugs 76 similar to the lugs of the seat pan. The seat pan side frame members 6 are provided with upwardly facing apertures 77 communicating with the channels 67 for receiving the lugs 76 of the movable element into the channels. The extension portion may thus be dropped into the gap so that the lugs 76 enter the channels, and moved a little forwardly so that the lugs engage in the channels as shown in FIG. 60c.

Figure 61:
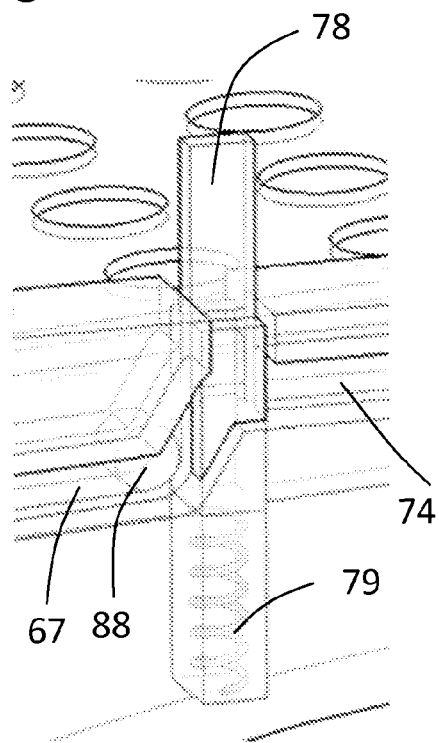
FIGS. 61 and 62 are semi-transparent rear perspective views showing the movable locking tab in the upper locked position and the lower open position respectively.
Figure 62:
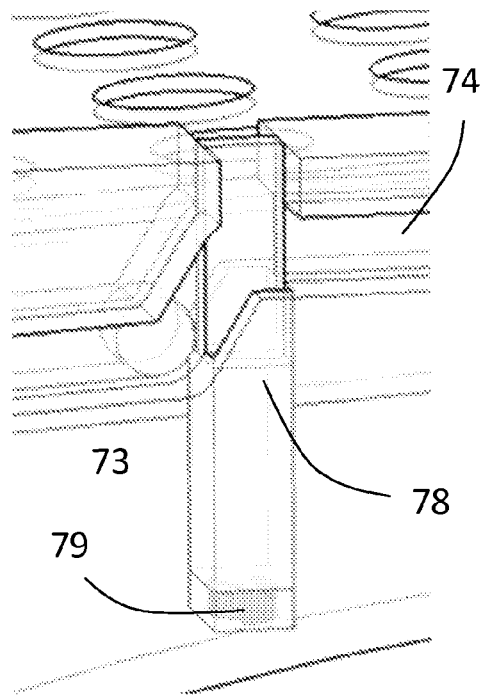

FIGS. 61 and 62 show a movable locking tab 78 located just behind the horizontal front part of channel 74 at the point of the channel kink. The locking tab is moveable between an upper position which blocks the channels 67 as shown in FIG. 61 and a lower position which removes the blockage in the channels as shown in FIG. 62. The locking tab may be spring loaded as shown by spring 79, and may operate in a pushbutton fashion wherein each consecutive push either locks the tab 78 into the lower position or releases it to the upper position. Such pushbutton mechanisms are commonly found for example in power on/power off vacuum cleaner pushbuttons.

Referring back to FIGS. 60a to 60c the movable locking tabs 78 are shown in a lower position. When the seat pan 2 is in the extended position with the movable element 16 deployed as shown in FIG. 60c, in the upper locked position the locking tab 78 serves to prevent the movable element from moving backwards and in so doing also locks the seat pan 2 in its forwardmost extended position. When the seat pan 2 is in the retracted seating position as shown in FIG. 60a, in the upper locked position the locking tab 78 also serves to block the seat pan in its rearmost inclined position.

Figure 63:
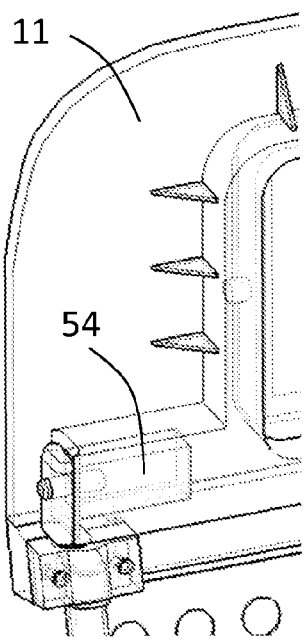
FIG. 63 shows the location of the bolt and mechanism housing relative to outer shell.
Figure 64:
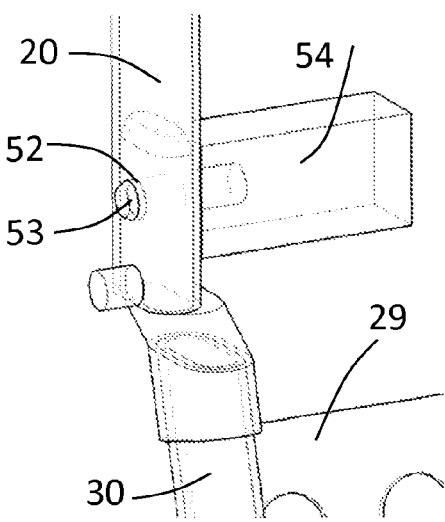
FIG. 64 is a front perspective view showing the joining sleeve aperture.
Figure 65:
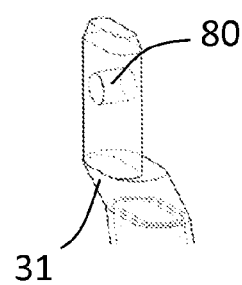
FIG. 65 shows the parts of FIG. 64, the bolt mechanism housing and the side arm.

FIGS. 63 to 65 show how retractable bolt mechanisms 54 located within the outer shell 11 as described previously may be used to fix the movable element to the top of the main backrest frame 29. A modified joining sleeve 31 fixed to the top end of a backrest side frame member 30 has a top end which fits inside side arms 20 and comprises an aperture 80 located in line with the side arm apertures 52. The movable element is locked in position when the bolt 53 moves through both the joining sleeve aperture 80 and the side arm apertures 52 as shown in FIG. 64.

A first embodiment in which the seat pan extension portion comprises a movable element comprising just a cushion is shown in FIGS. 66 to 71, in which the seat pan 2 includes a deployable extension frame which is extendable in a linear manner out of the front edge of the seat pan.

Figure 66:
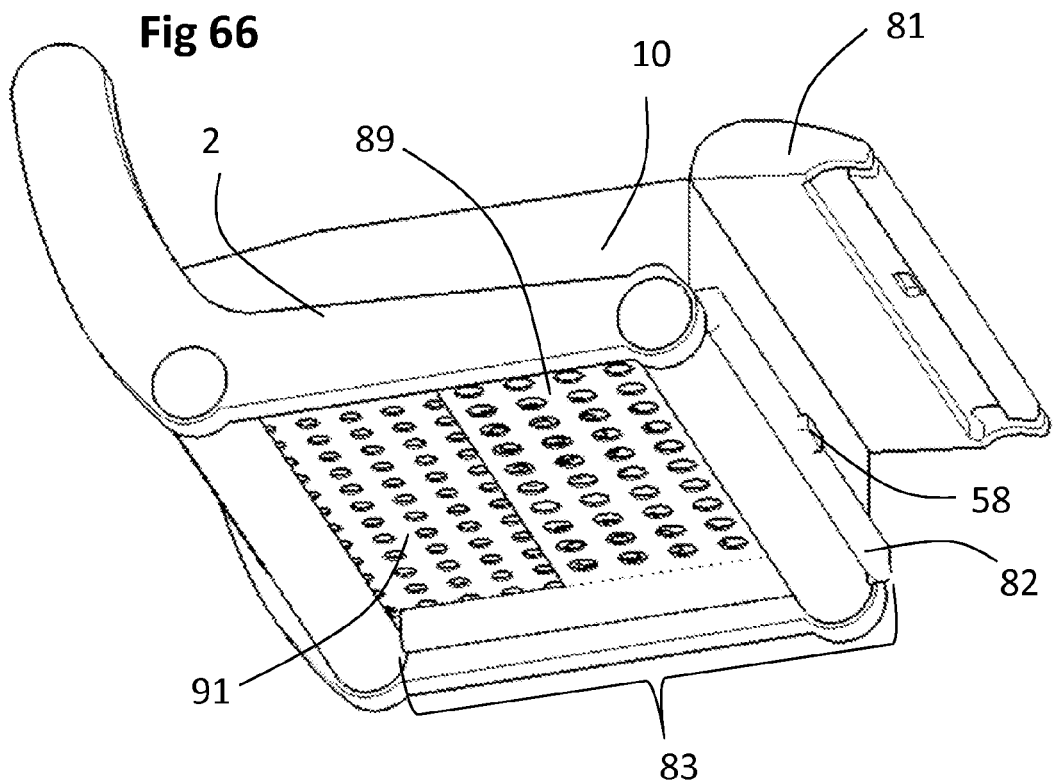
FIG. 66 shows another embodiment of the invention in which the front part of the seat pan cushion is raised to reveal the deployable extension frame.
Figure 69A:
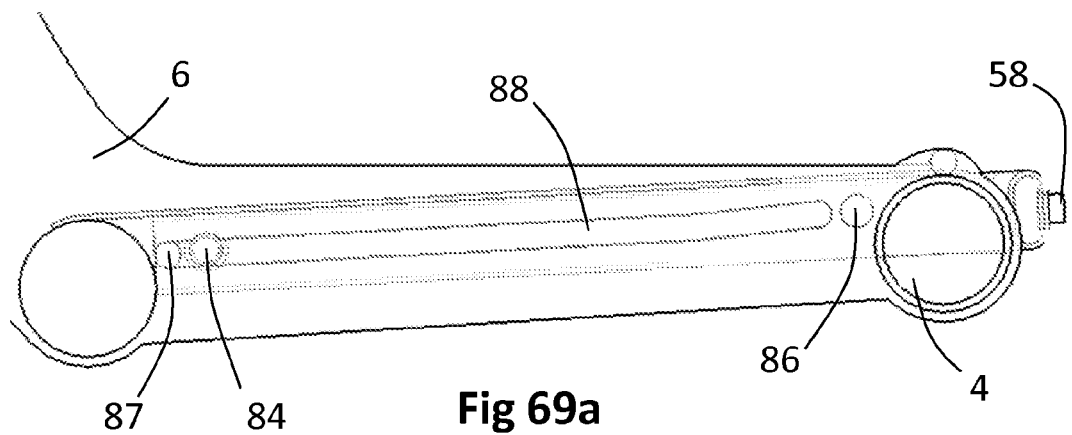
FIGS. 69a, b and c are side views showing the movement of the deployable extension frame from a stored retracted position to a deployed extended position.
Figure 69B:
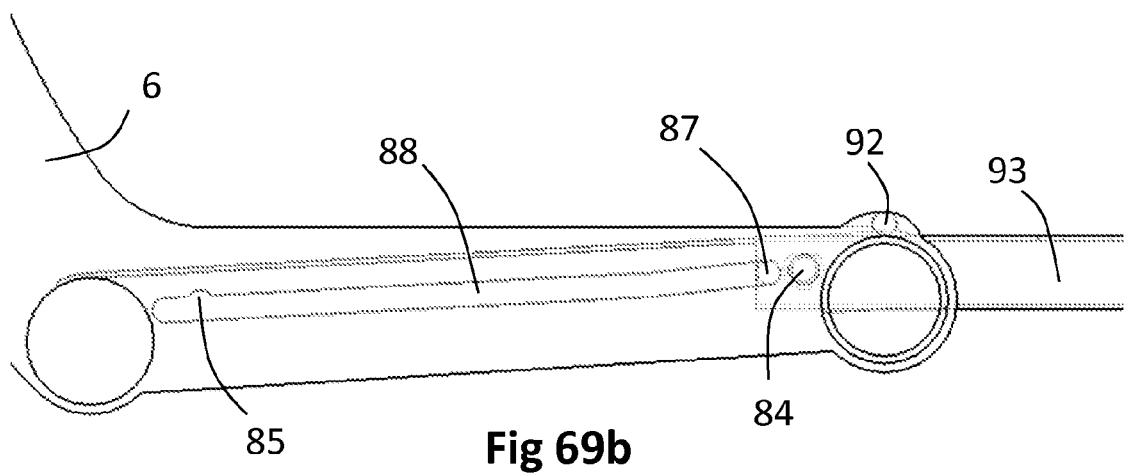
Figure 69C:
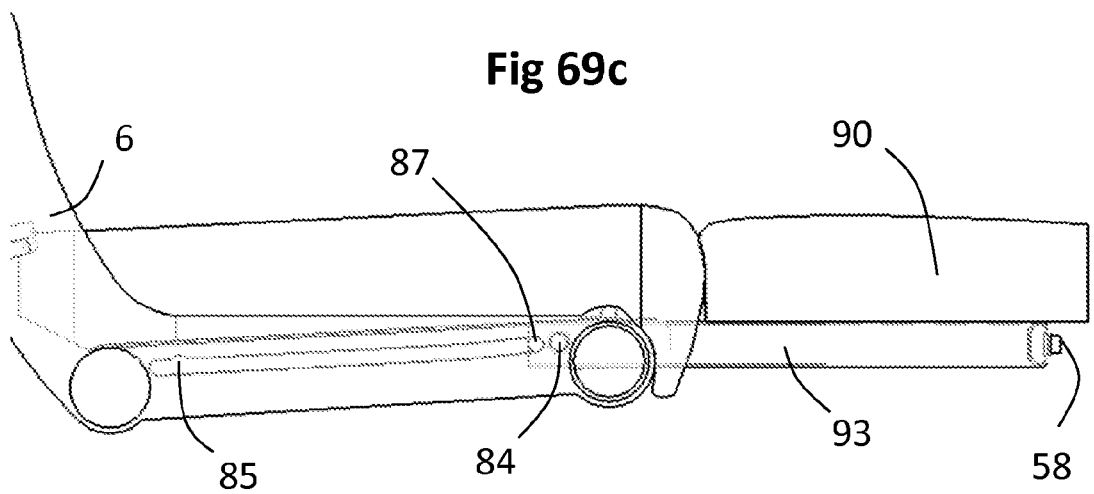
Figure 70:
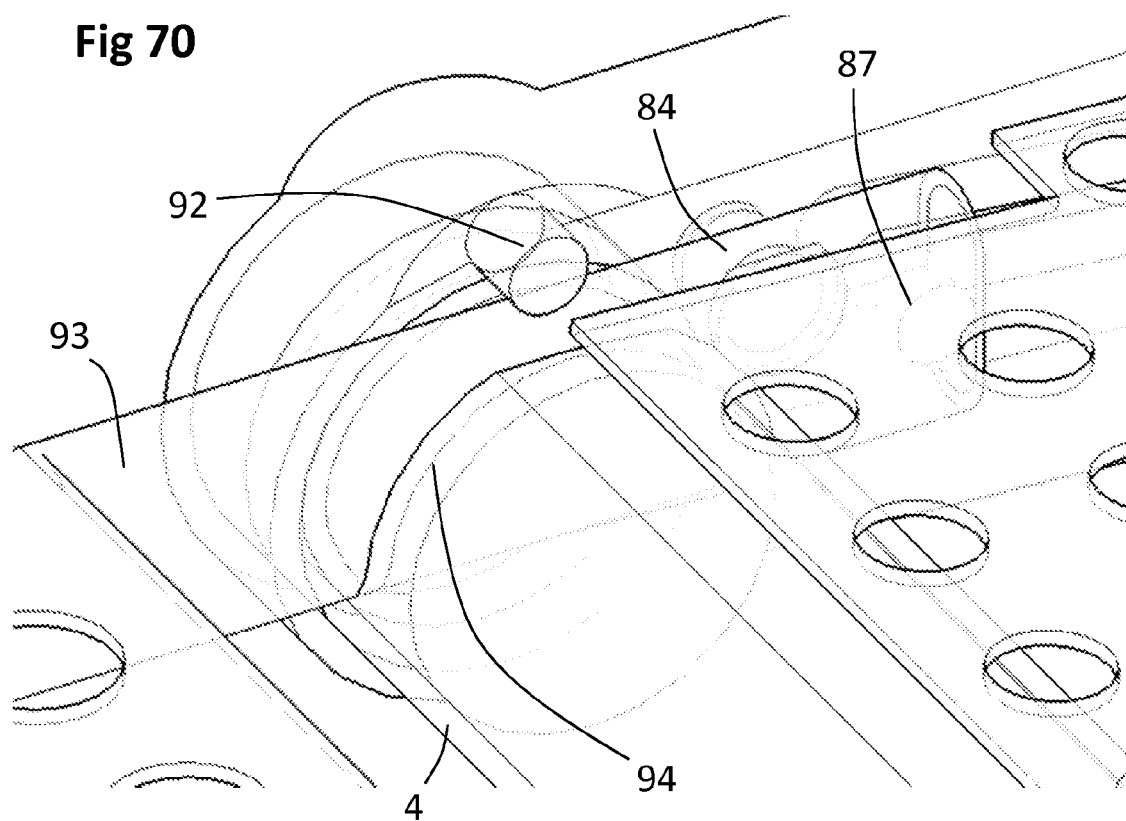
FIG. 70 shows the interaction between the deployable extension frame and seat pan.

The seat pan cushion 10 may include a front portion 81 which is flexibly connected to the top front edge of the remaining cushion portion as shown in FIG. 66. The front portion can be lifted to expose a front bar 82 of a deployable extension frame 83, having a pushbutton 58 for releasing the extension frame 83 much like the suitcase handle system described previously. Referring to FIGS. 69a to 69c, in the retracted mode shown in FIG. 69a, pushing the pushbutton 58 causes locking pins 84 to retract into side members 93 of the deployable extension frame 83 from within the rearmost channel pin aperture 85 located within the seat pan side frame members 6 such that the extension frame 83 may move in a forwardly direction towards the extended position as shown in FIG. 69b. When in the extended position a release of the pushbutton 58 causes the locking pins 84 to engage with forwardmost channel pin apertures 86 located within the seat pan side frame members 6. The side members 93 have lugs 87 towards the rear thereof for running in guide channels 88 in the inner surfaces of the seat pan side frame members 6. The channel 88 may be shaped so that the extension frame 83 can move out forwardly and may come to rest with the lugs 87 locating at the forwardmost end of the channels 88.

Figure 68:
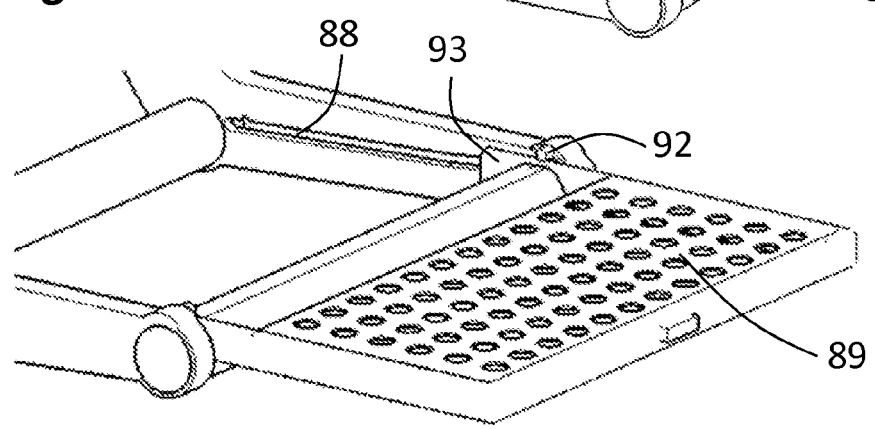

The extension frame 83 comprises a backing plate 89 as shown in FIG. 68 for supporting a deployable extension frame cushion 90 as shown in FIG. 69c. In the retracted seating position the extension frame backing plate 89 lies immediately under the seat pan cushion backing plate 91. Similarly to the above fourth embodiment of the invention described above, the channels 88 are angled such that in the extended position, the top surface of the seat pan extension portion lies substantially horizontally.

Figure 67:
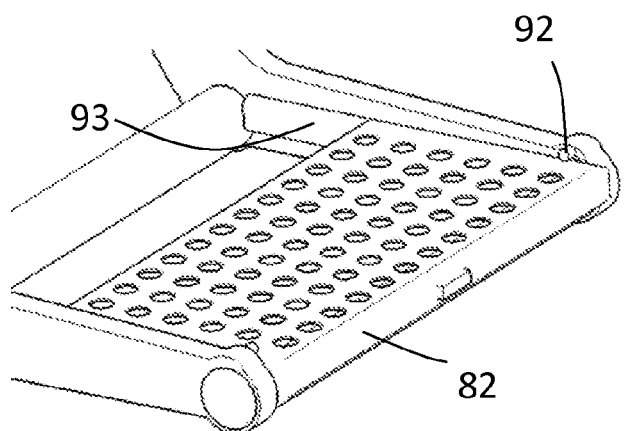
FIGS. 67 and 68 are front perspective views showing the deployable extension frame in retracted and extended positions respectively.
Figure 71:
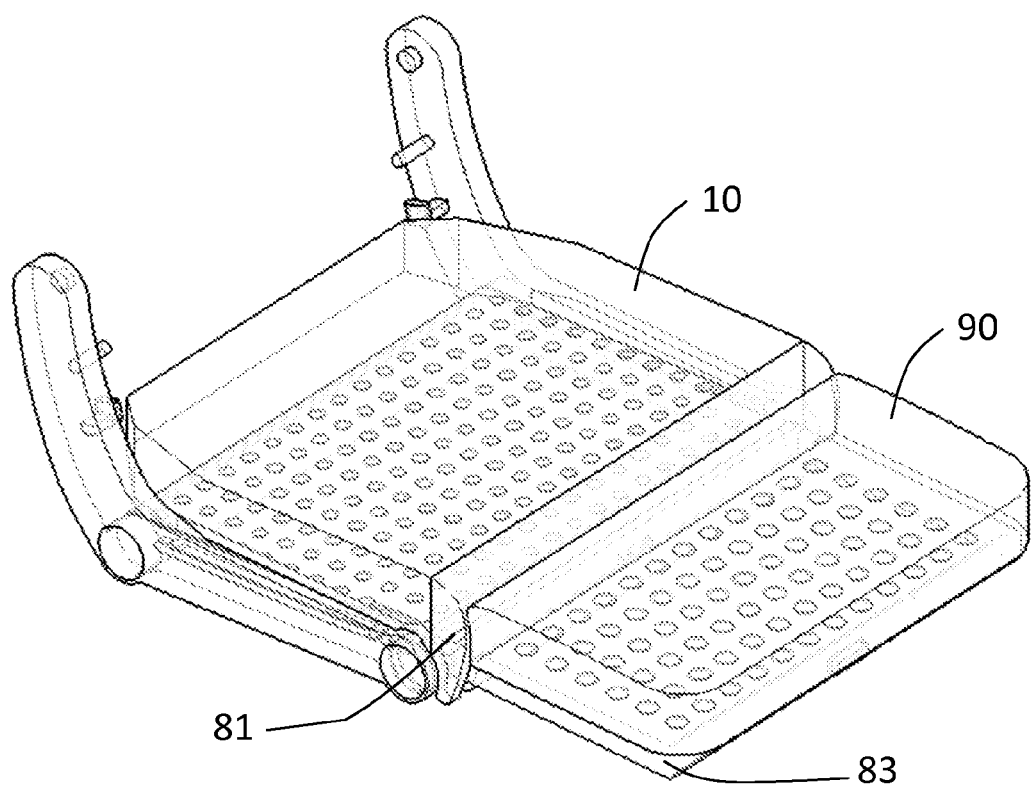
FIG. 71 is a semi-transparent front perspective view showing the deployable extension frame in its deployed position with the cushion mounted on it.

The front bar 82 may be used to pull the extension frame 83 from a rearmost position as shown in FIG. 67 to a forwardmost position out from under the seat pan cushion to an extended position shown in FIG. 68. It can be seen from FIGS. 68, 69a,b,c and 70 that a small protrusion 92 on the seat pan side frame member 6 prevents the front of the deployable extension frame 83 from flipping up when retracted and provides a cantilever force allowing the extension frame 83 to stay horizontal and bear a load when extended. It can be seen from FIG. 70 that the side members 93 rest on reinforced cut-outs 94 in the front spar 4. The front portion 81 of the cushion 10 may be returned to the front of the seat pan before the extension cushion 90 is placed on the extended extension frame 83 as shown in FIG. 71.

In this embodiment as with the following three embodiments, the extension cushion 90 may be attachable either to the extension frame backing plate 89 or to the backing plate of where it came from on the headrest part 15 of the backrest 3 by means of for example a hook and loop fastening material like "Velcro" ®.

A second embodiment in which the seat pan extension portion comprises a movable element comprising just a cushion is shown in FIGS. 72 to 76. In this embodiment, the deployable extension frame 83 of the seat is hinged around a front spar 4 and comprises a U-shaped extension subframe 95 carrying a backing plate 89 for supporting a cushion in use.

Figure 72:
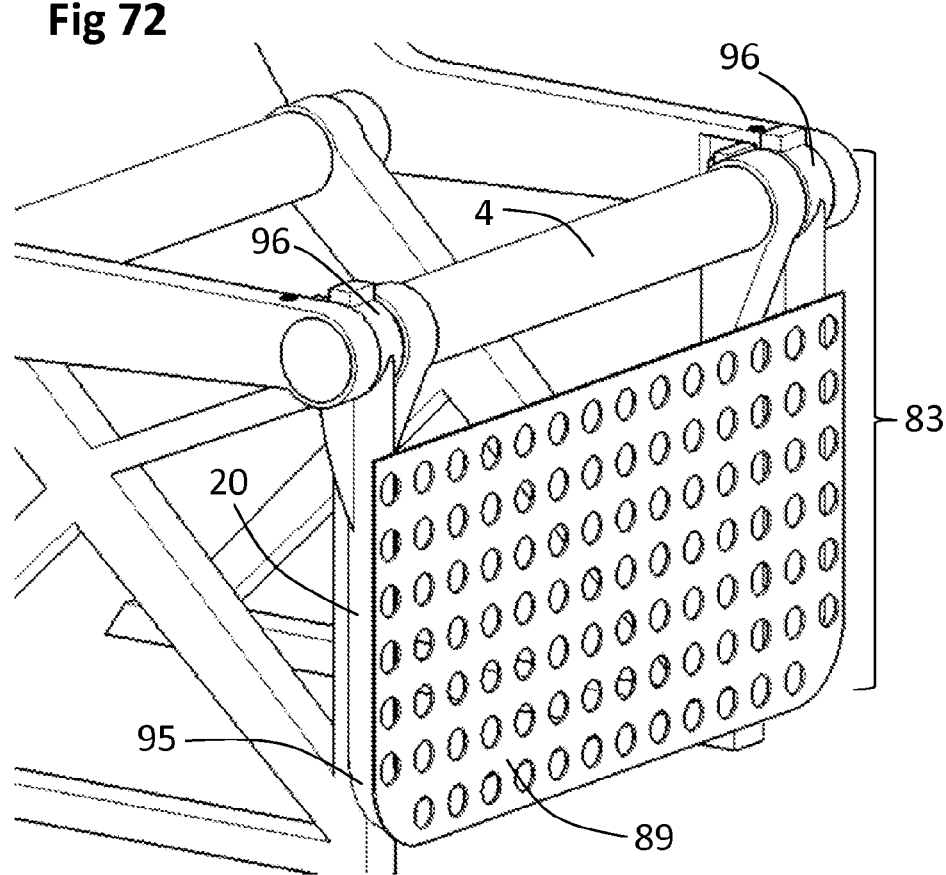
FIG. 72 is a front perspective view showing the seat according to another embodiment in which the deployable extension frame is in its lower stored position.
Figure 73:
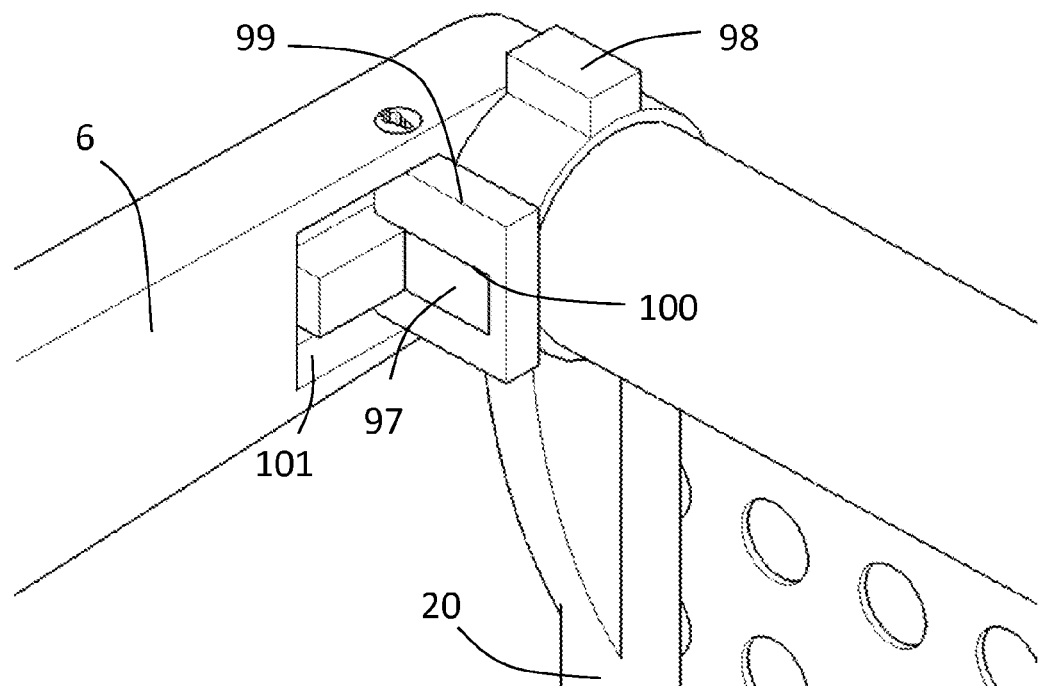
FIG. 73 is a rear perspective view showing the movable latching element locking the extension frame in its lower position.
Figure 74:
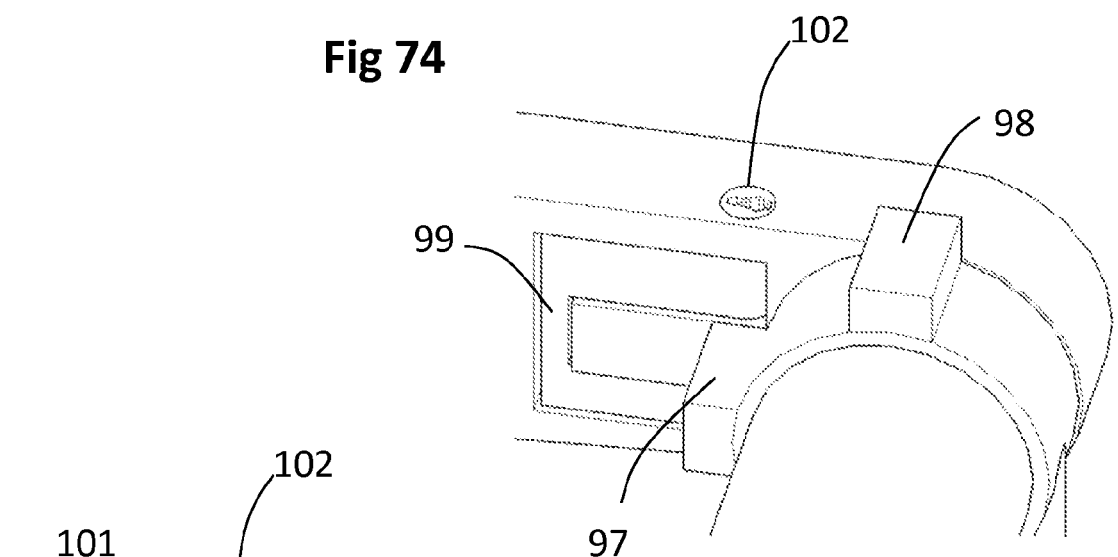
FIGS. 74 and 75 show the latching element in fully open and partially open positions.
Figure 75:
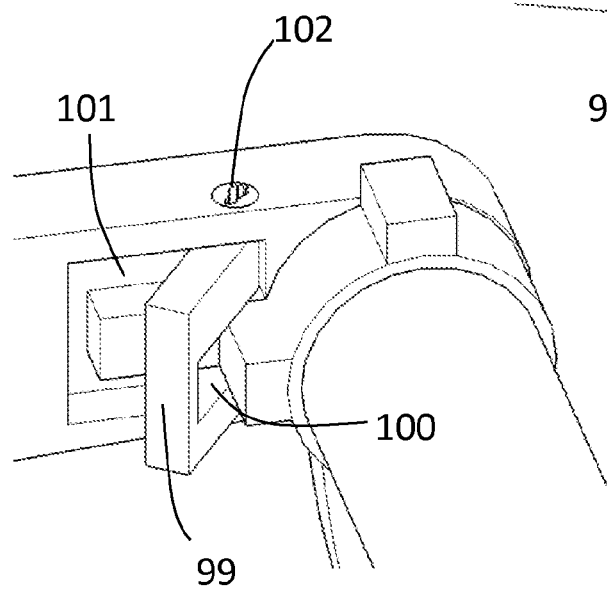
Figure 76:
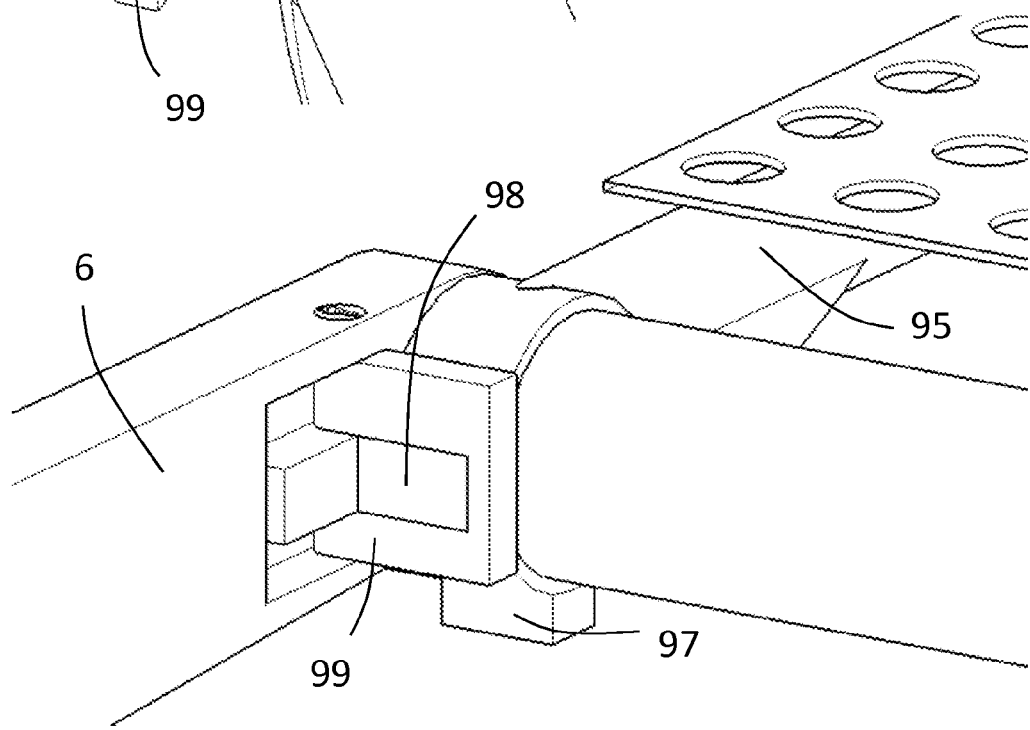
FIG. 76 is a rear perspective view showing extension frame locked in the fully extended position with the latching element in the closed locked position.

The extension frame 83 is pivotally attached around a spar 4 located at the front edge of the seat pan frame at each side thereof. Each side arm 20 of the subframe 95 terminates in a collar 96 surrounding the front spar 4 of the seat as shown in FIG. 72. The collars 96 may each be provided with two locking protrusions 97, 98, one 97, for a retracted extension frame position as shown in FIGS. 73 to 75 and the other 98 for a deployed extension frame position as shown in FIG. 76. At each side of the seat, the seat pan side frame members 6 include a movable latching element 99 having a recess 100 formed therein. The latching element is foldable into a housing 101 in the side frame members 6 to allow extension frame 83 to pivot between a folded position lying below the seat pan and an extended position lying substantially coplanar with the seat pan frame. As shown in FIG. 75, when the extension frame is folded or extended, the latching element 99 may be extended out of the housing 101, such that protrusions 97, 98 respectively locate in the recess 100 to lock the extension frame in position. The latching element 99 may comprise a key hole 102 such that only authorised cabin crew with the corresponding key can deploy the extension frame, In the extended position a deployable extension frame cushion 90 may then be placed on the backing plate 89 of the extension frame as described above, to form the extended bed surface.

A third embodiment in which the seat pan extension portion comprises a movable element comprising just a cushion is shown in FIGS. 77 to 82.

Figure 77:
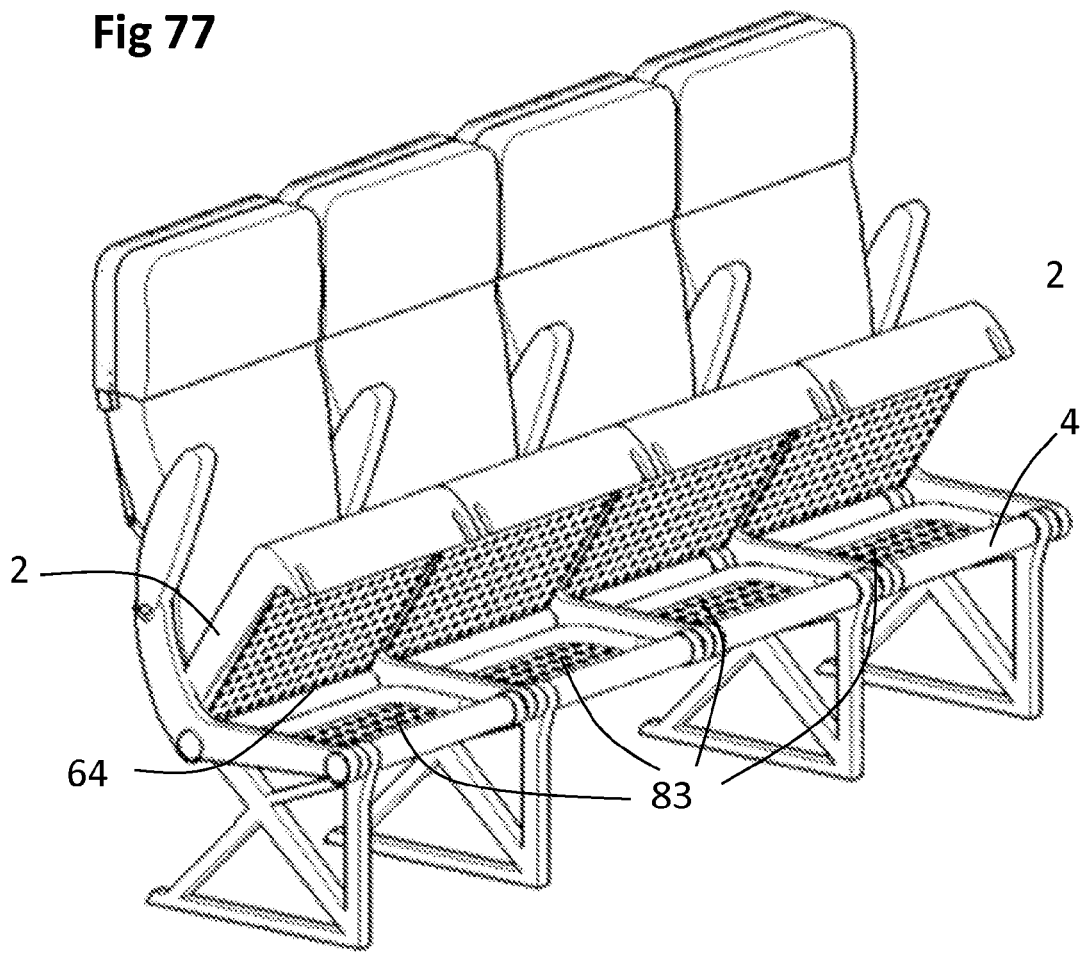
FIG. 77 is a front perspective view showing a further embodiment of the invention in which a quad seating unit is shown with the seat pans at an angle.
Figure 78:
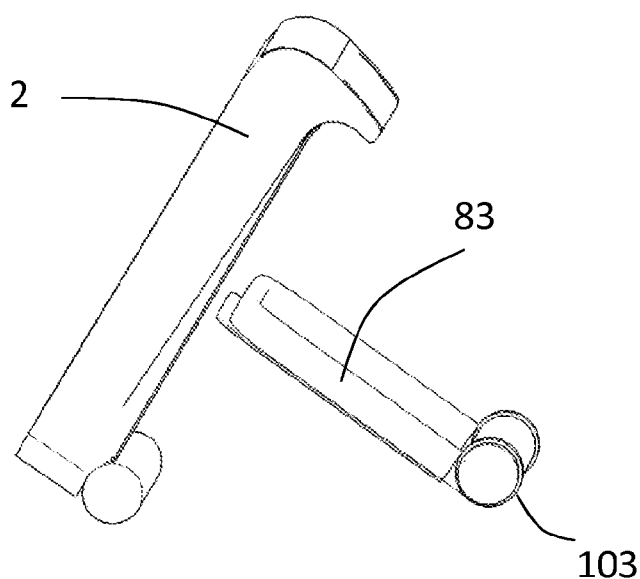
FIGS. 78 and 79 show extension frame in intermediate positions during deployment.
Figure 79:
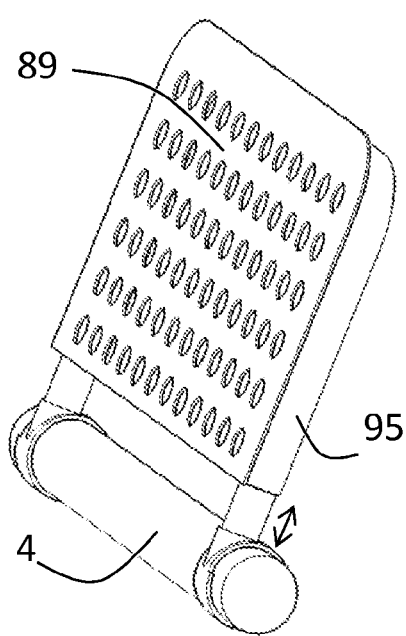
Figure 80:
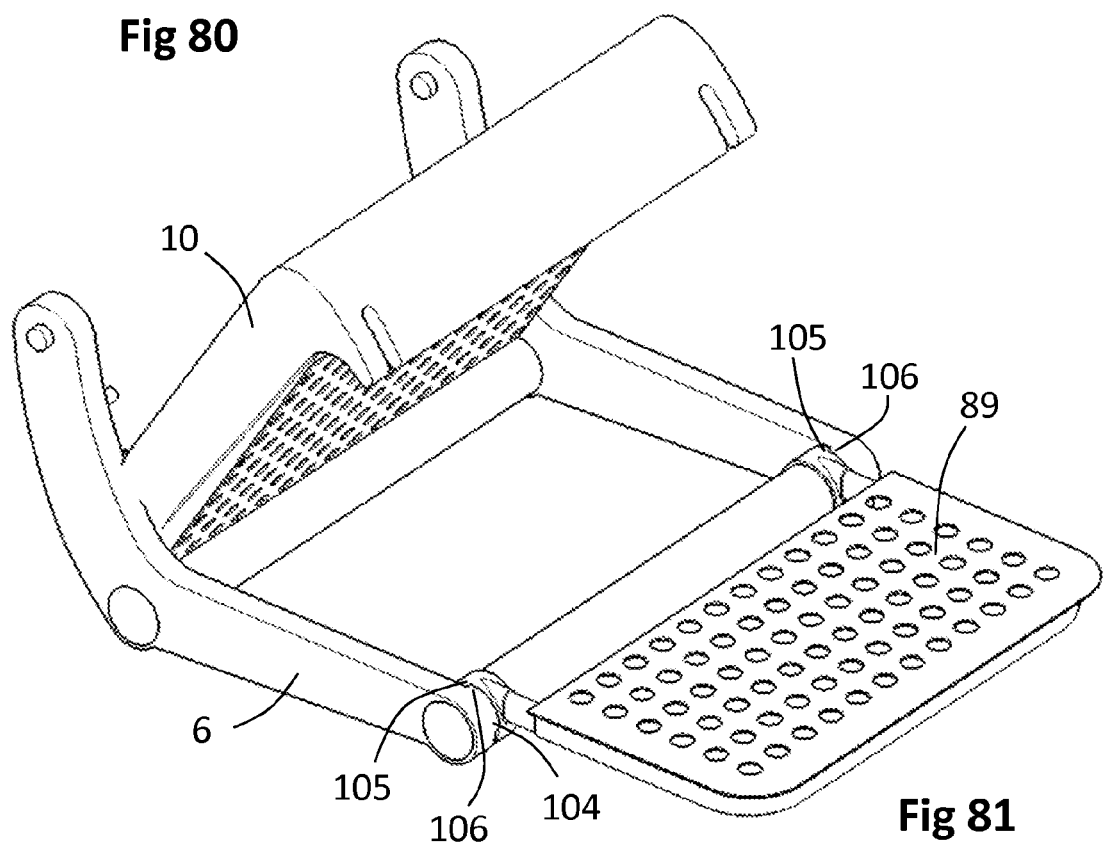
FIG. 80 is a perspective view showing the extension frame in the deployed position with the seat pan in an angled position.

When in seat mode the deployable extension frame 83 is stored under the seat pan 2 as shown in FIG. 77. In a similar way to the second embodiment in which the seat pan extension portion comprises a movable element comprising both a subframe and a cushion, the deployable extension frame 83 in the stored position is prevented from rotating any further under the seat pan due to a side protrusion 103 as shown in FIG. 78 on the deployable extension frame which abuts against a corresponding protrusion 104 on the seat pan frame side member 6 as shown in FIG. 80. When the seats are being converted to bed mode, the seat pan may pivot about a hinge 64 as shown in FIG. 77 located in a rearmost position on the seat pan 2 such that the front of the seat pan 2 may move in an upwards direction to allow the deployable extension frame 83 to rotate underneath the seat pan as shown in FIG. 78. Once the extension frame has rotated past the seat pan the extension subframe 95 may be telescopically extended away from the spar 4 as shown by the arrows in FIG. 79 such that the extension backing plate 89 clears the seat pan cushion 10 when in the deployed position as shown in FIG. 80. The movable element in its deployed position is prevented from rotating any further due to another side protrusion 105 on the extension frame which abuts against another protrusion 106 on the seat pan frame side member 6 as shown in FIG. 80.

Figure 81:
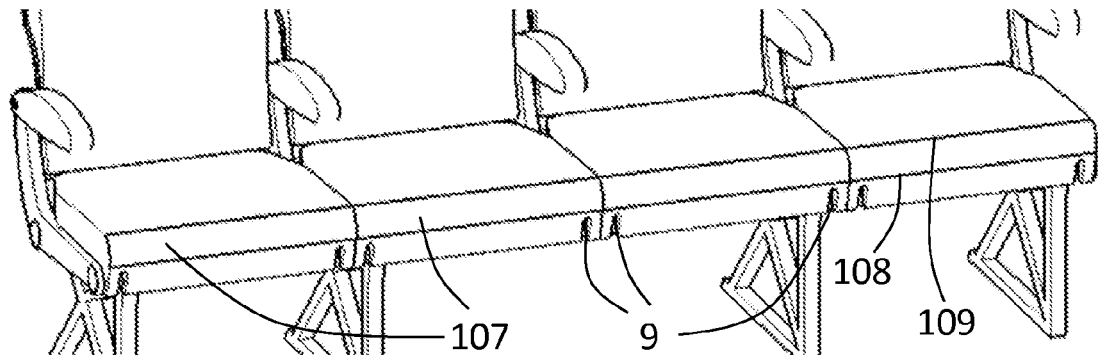
FIGS. 81 and 82 show the seats in seating mode with strips uncovering and covering respectively the seat pan cushion apertures.
Figure 82:
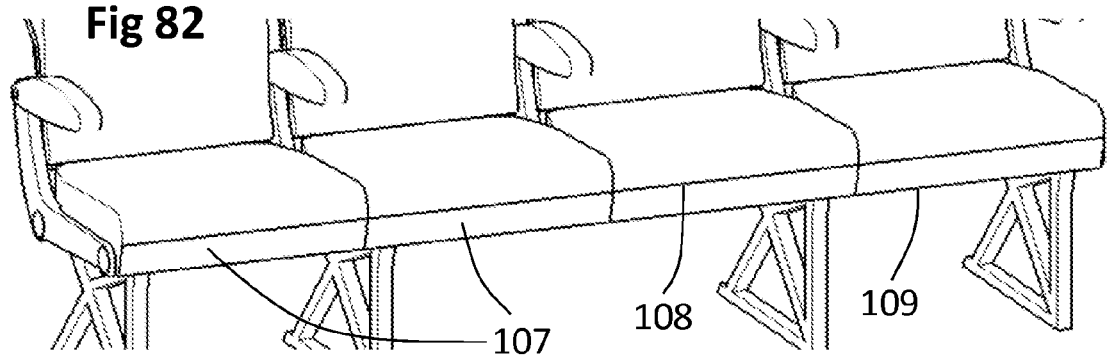

FIGS. 81 and 82 show a strip of seat fabric 107 used to cover seat pan apertures 9 in order to improve the external appearance of the seat when it is being used in seat mode. The strip 107 may be permanently fixed to the front edge of the seat pan cushion 10 along an edge 108 with the other edge 109 flipped in either an upper position during extension mode as shown in FIG. 81, or a lower position to hide apertures 9 during seat mode as shown in FIG. 82. It will be appreciated that the strip arrangement described above may also be used for any of the previous embodiments described in which the seat pan cushion 10 contains apertures.

A fourth embodiment in which the seat pan extension portion comprises a movable element comprising just a cushion is shown in FIGS. 83 to 88. This embodiment is almost identical to the third embodiment in which the seat pan extension portion comprises a movable element comprising both a subframe and a cushion described above. The key difference is that the movable element of the headrest comprises a cushion only and the structure which supports said cushion is deployable from within the seat pan frame.

Figure 85:
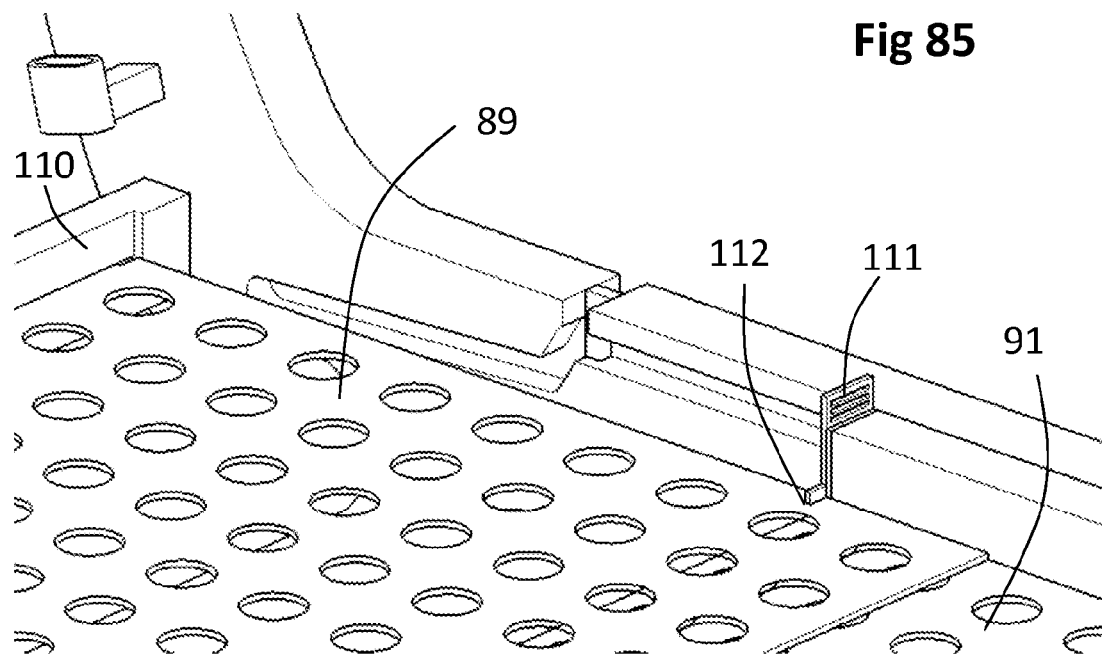
FIG. 85 shows the locking plate locking the extension frame in the extended position.
Figure 87A:
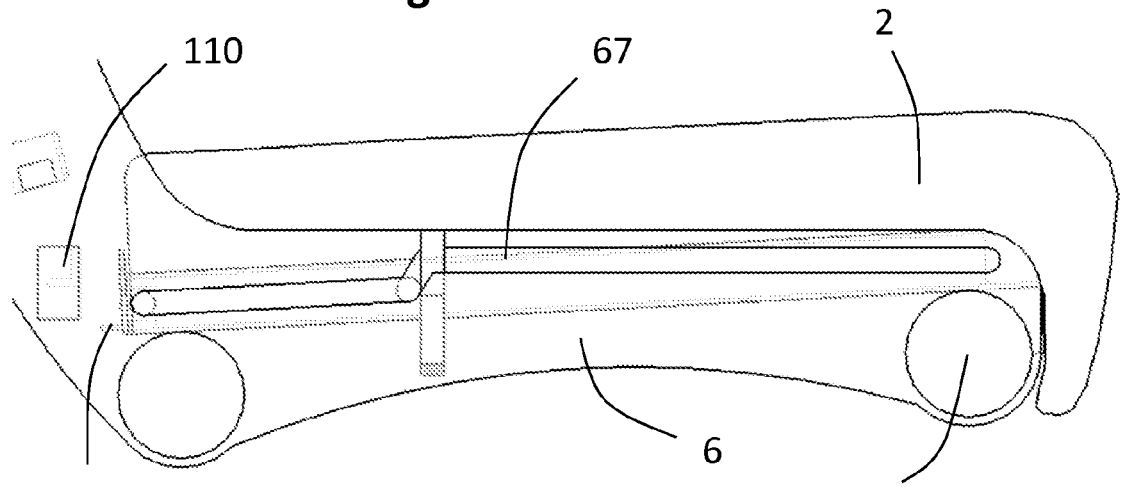
FIGS. 87a and 87b are semi-transparent side views showing the movement of the seat pan from the retracted position to the deployed position.
Figure 87B:
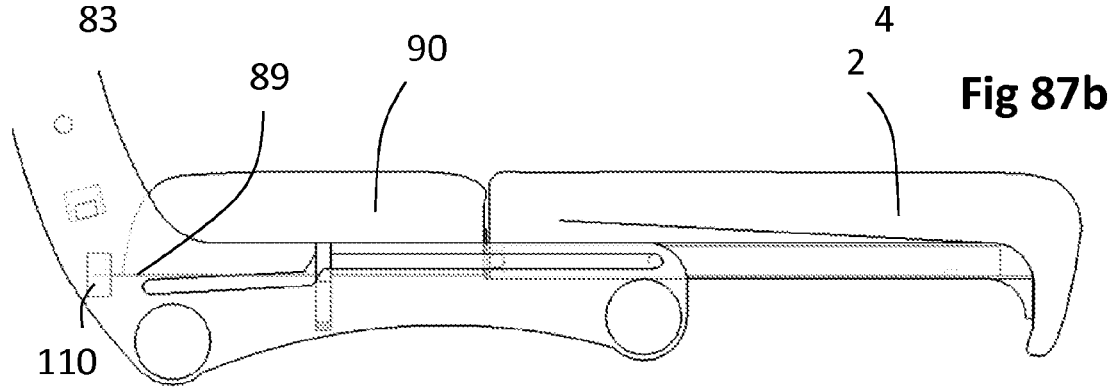
Figure 88:
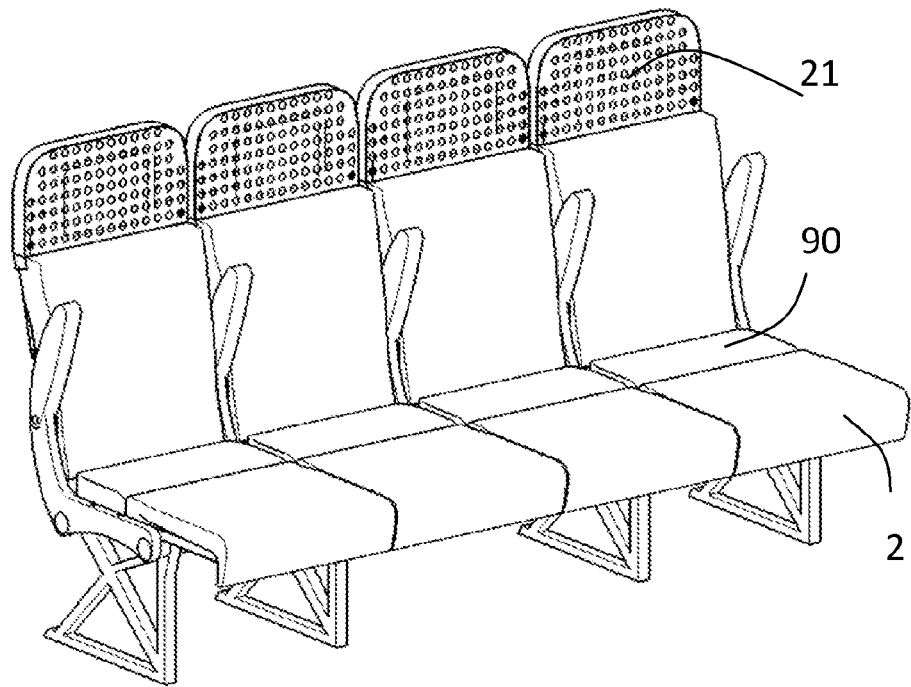
FIG. 88 is front perspective views of a quad seating unit according to the embodiment of FIGS. 83 to 87b in bed modes.

As shown in FIGS. 83 and 84, the seat pan 2 moves forwardly in guide channels 67 in a similar manner to that described above in relation to FIGS. 57 to 60c. The deployable extension frame 83 however, may comprise an extension backing plate 89 located directly above the seat pan cushion backing plate 91 as shown in FIG. 83. After the seat pan is moved to a forwardmost position as shown, the extension frame 83 may be exposed from under the seat pan cushion by pulling it in a rearward direction until it abuts and rests on an extension frame support 110 as shown in FIGS. 84 and 85. An extension cushion 90 may then be placed on top of the extension backing plate 89 to complete the extended seat pan surface as shown in FIGS. 87b and 88. The embodiment in seating mode is shown in FIG. 87a with the seat pan 2 in a rearmost position and the deployable extension frame 83 retracted within the seat pan.

Figure 86:
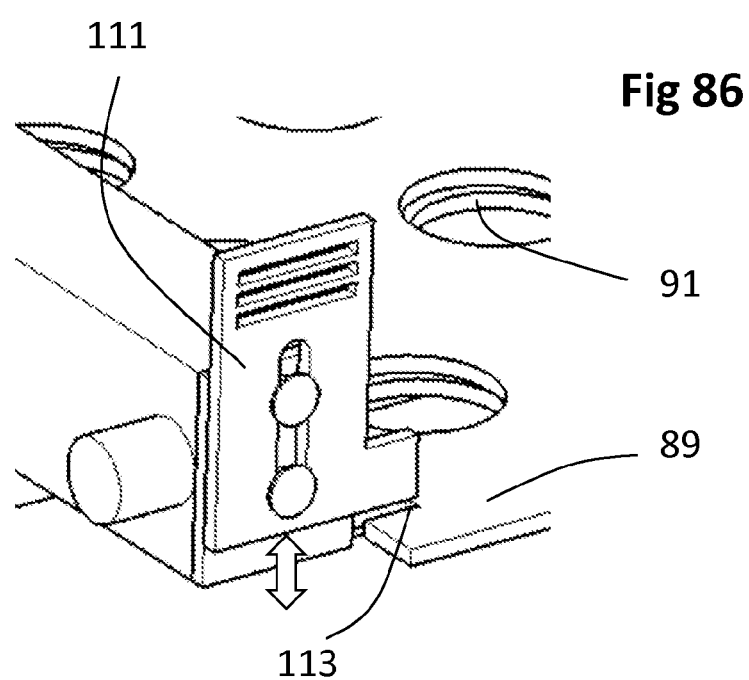
FIG. 86 shows the extension frame in the retracted position with the locking plate in the upper open and lower locked positions.

A locking plate 111 is movable to a lower position to locate in either a forwardmost recess 112 of the backing plate 89 to lock the extension frame 83 into the extended position as shown in FIG. 85 or a rearmost recess 113 to lock the extension frame into the retracted position as shown in FIG. 86. In order to allow the extension frame to move between extended and retracted positions, the locking plate 111 is movable to an upper position as shown in FIG. 86.

In use, the seats may be provided in rows of three or four, such as is common in the economy class section of a large aircraft such as is generally used for long haul flights. Convertible seats according to the invention may for example be provided in a separate area of the aircraft cabin, and may be sold as an enhanced class of seating.

Whilst the invention is of particular advantage in aircraft, it will be understood that a seat according to the invention could also be provided in other passenger vehicles, particularly where seats are provided in rows, such as buses or trains. A seat in accordance with the invention may also be used as a static seat, in an environment where conversion as described may be advantageous, such as waiting rooms or airport lounges for example.

It will be apparent to the skilled person that the features of the dependent claims may be provided in other combinations.

The invention claimed is:

1. A seat for a vehicle comprising:
   a seat pan;
   and a backrest, in which the backrest includes a movable element which is detachable from the backrest and deployable to extend the seat pan surface in a direction forwardly of the seat, said movable element being characterised in that its width is substantially a width of the seat pan and in that when deployed, a substantial proportion of the upper surface of said movable element lies in a position substantially coplanar with an upper surface of the seat pan so that the movable element and seat pan create a substantially continuous and horizontal surface, said movable element being further characterised in that when a plurality of seats are arranged side-by-side with their respective movable elements deployed to form a forwardly extended row of said seats, a substantially continuous and horizontal surface substantially free of gaps and differences in height, is created along a full length and breadth of said extended row.

2. A seat as claimed in claim 1, in which the movable element comprises a headrest part of the backrest.

3. A seat as claimed in claim 1, in which the movable element of the backrest comprises a subframe and a cushion.

4. A seat as claimed in claim 3, in which the seat pan comprises a seat pan frame, the subframe and the seat pan frame being provided with cooperating parts arranged for removably attaching the subframe onto the seat pan frame.

5. A seat as claimed in claim 4, in which the backrest comprises a main backrest frame, the subframe and the main backrest frame being provided with cooperating parts arranged for removably attaching the subframe onto the main backrest frame.

6. A seat as claimed in claim 5, comprising a locking arrangement for selectively locking the subframe to the seat pan frame or the main backrest frame, respectively.

7. A seat as claimed in claim 6, in which the cooperating parts respectively comprise a locking pin and a corresponding latch for engaging with the locking pin.

8. A seat as claimed in claim 7, in which the latch is electrically operated, for example by remote control.

9. A seat as claimed in claim 8 in which the latch is operated by a solenoid and/or is operated by a central servo.

10. A seat as claimed in claim 7 in which the latch is manually operated.

11. A seat as claimed in claim 7, in which the latch comprises a rotor latch.

12. A seat as claimed in claim 4, in which the cooperating parts respectively comprise an aperture and a corresponding retractable bolt for extending through the aperture.

13. A seat as claimed in claim 12, in which the bolt is electrically operated, for example by remote control.

14. A seat as claimed in claim 4, in which the cooperating parts respectively comprise a retractable locking pin and a corresponding aperture for receiving the retractable locking pin.

15. A seat as claimed in claim 14, in which the retractable locking pin is manually operated, for example by a push-button.

16. A seat as claimed in claim 1, in which the movable element is attachable to a front edge of the seat pan.

17. A seat as claimed in claim 16, in which the subframe comprises side arms each having a free end adjacent one edge of the movable element, the cooperating part being provided adjacent the free end of each of the side arms.

18. A seat as claimed in claim 17, in which the seat pan comprises a frame comprising a transversely extending front spar.

19. A seat as claimed in claim 18, in which the front spar comprises an aperture adjacent each side of the seat for receiving the free ends of the side arms.

* * * * *